(12) United States Patent
Friedman et al.

(10) Patent No.: US 12,743,497 B1
(45) Date of Patent: Sep. 22, 2026

(54) SYSTEM AND METHOD FOR GRANULAR PERMISSIONS AUDITING

(71) Applicant: MONDAY.COM LTD, Tel Aviv (IL)

(72) Inventors: Devorah Friedman, Efrat (IL); Niv Yahav, Tel Aviv-Jaffa (IL); Amichay Even Chen, London (GB); Vittorio Veneto, London (GB)

(73) Assignee: MONDAY.COM LTD, Tel Aviv (IL)

( * ) Notice: Subject to any disclaimer, the term of this patent is extended or adjusted under 35 U.S.C. 154(b) by 0 days.

(21) Appl. No.: 19/546,101

(22) Filed: Feb. 20, 2026

Related U.S. Application Data

(60) Provisional application No. 63/837,205, filed on Jul. 2, 2025.

(51) Int. Cl.
*G06F 21/31* (2013.01)

(52) U.S. Cl.
CPC .................................... *G06F 21/31* (2013.01)

(58) Field of Classification Search
CPC .... G06F 21/31; G06F 21/6218; G06F 40/186; G06F 40/177; G06F 40/174; H04L 67/02; H04L 67/34; H04L 51/046
See application file for complete search history.

(56) References Cited

U.S. PATENT DOCUMENTS

| | | | |
|---|---|---|---|
| 4,972,314 | A | 11/1990 | Getzinger et al. |
| 5,220,657 | A | 6/1993 | Bly et al. |
| 5,479,602 | A | 12/1995 | Baecker et al. |
| 5,517,663 | A | 5/1996 | Kahn |

(Continued)

FOREIGN PATENT DOCUMENTS

| | | | |
|---|---|---|---|
| CA | 2828011 | A1 | 9/2012 |
| CN | 103064833 | A | 4/2013 |

(Continued)

OTHER PUBLICATIONS

Sreenath et al., "Agent-based service selection," Journal of Web Semantics 1.3, Oct. 2003, 29 pages.

(Continued)

*Primary Examiner* — El Hadji M Sall
(74) *Attorney, Agent, or Firm* — FINNEGAN, HENDERSON, FARABOW, GARRETT & DUNNER L.L.P.

(57) ABSTRACT

Systems, methods, and computer readable medium are provided for an interactive graphical user interface (GUI) presenting multi-layered permissions in a collaborative software platform. A GUI presenting permissions includes a processor for: receiving a signal to access permission data associated with performance an action by a user of the collaborative software platform; accessing a multi-layered permission hierarchy linked to a centralized authorization manager and associated with the user and the action; traversing the hierarchy to identify permission levels associated with the performance of the action by the user; collecting the permission data from the identified permission levels; using the permission data to identify a restriction associated with the action; and in a first mode, visually indicating which action is restricted for the user, and which action is permitted; and in a second mode, for a particular action, visually indicating which permission level permits the action, and which restricts the action.

23 Claims, 16 Drawing Sheets

(56) References Cited

U.S. PATENT DOCUMENTS 5,632,009 A 5/1997 Rao et al.
5,657,437 A 8/1997 Bishop et al.
5,682,469 A 10/1997 Linnett et al.
5,696,702 A 12/1997 Skinner et al.
5,726,701 A 3/1998 Needham
5,734,837 A 3/1998 Flores et al.
5,787,411 A 7/1998 Groff et al.
5,844,555 A 12/1998 Menaker et al.
5,880,742 A 3/1999 Rao et al.
5,933,145 A 8/1999 Meek
5,987,469 A 11/1999 Lewis et al.
5,999,911 A 12/1999 Berg et al.
6,016,438 A 1/2000 Wakayama
6,016,553 A 1/2000 Schneider et al.
6,023,695 A 2/2000 Osborn et al.
6,034,681 A 3/2000 Miller et al.
6,049,622 A 4/2000 Robb et al.
6,088,707 A 7/2000 Bates et al.
6,108,573 A 8/2000 Debbins et al.
6,111,573 A 8/2000 Mccomb et al.
6,157,381 A 12/2000 Bates et al.
6,167,405 A 12/2000 Rosensteel et al.
6,169,534 B1 1/2001 Raffel et al.
6,182,127 B1 1/2001 Cronin, III et al.
6,185,582 B1 2/2001 Zellweger et al.
6,195,794 B1 2/2001 Buxton
6,222,541 B1 4/2001 Bates et al.
6,252,594 B1 6/2001 Xia et al.
6,266,067 B1 7/2001 Owen et al.
6,275,809 B1 8/2001 Tamaki et al.
6,330,022 B1 12/2001 Seligmann
6,377,965 B1 4/2002 Fries et al.
6,385,617 B1 5/2002 Malik
6,460,043 B1 10/2002 Tabbara et al.
6,496,832 B2 12/2002 Chi et al.
6,509,912 B1 1/2003 Moran et al.
6,510,459 B2 1/2003 Cronin et al.
6,522,347 B1 2/2003 Tsuji et al.
6,527,556 B1 3/2003 Koskinen
6,567,830 B1 5/2003 Madduri
6,606,740 B1 8/2003 Lynn et al.
6,626,959 B1 9/2003 Moise et al.
6,636,242 B2 10/2003 Bowman-Amuah
6,647,370 B1 11/2003 Fu et al.
6,661,431 B1 12/2003 Stuart et al.
6,874,010 B1 3/2005 Sargent
6,988,248 B1 1/2006 Tang et al.
7,027,052 B1 4/2006 Thorn et al.
7,027,997 B1 4/2006 Robinson et al.
7,034,860 B2 4/2006 Lia et al.
7,043,529 B1 5/2006 Simonoff
7,054,891 B2 5/2006 Cole
7,086,007 B1 8/2006 Bushey et al.
7,228,492 B1 6/2007 Graham
7,237,188 B1 6/2007 Leung
7,249,042 B1 7/2007 Doerr et al.
7,272,637 B1 9/2007 Himmelstein
7,274,375 B1 9/2007 David
7,379,934 B1 5/2008 Forman et al.
7,380,202 B1 5/2008 Lindhorst et al.
7,383,320 B1 6/2008 Silberstein et al.
7,389,473 B1 6/2008 Sawicki et al.
7,415,664 B2 8/2008 Aureglia et al.
7,417,644 B2 8/2008 Cooper et al.
7,461,077 B1 12/2008 Greenwood
7,464,366 B2 12/2008 Shukla et al.
7,489,976 B2 2/2009 Adra
7,565,270 B2 7/2009 Bramwell et al.
7,617,443 B2 11/2009 Mills et al.
7,685,152 B2 3/2010 Chivukula et al.
7,707,514 B2 4/2010 Forstall et al.
7,710,290 B2 5/2010 Johnson
7,747,782 B2 6/2010 Hunt et al.
7,770,100 B2 8/2010 Chamberlain et al.
7,827,476 B1 11/2010 Roberts et al.
7,827,615 B1 11/2010 Allababidi et al.
7,836,408 B1 11/2010 Ollmann et al.
7,885,847 B2 2/2011 Wodtke et al.
7,916,157 B1 3/2011 Kelley et al.
7,921,360 B1 4/2011 Sundermeyer et al.
7,933,952 B2 4/2011 Parker et al.
7,945,622 B1 5/2011 Pegg
7,954,043 B2 5/2011 Bera
7,954,064 B2 5/2011 Forstall et al.
8,046,703 B2 10/2011 Busch et al.
8,060,518 B2 11/2011 Timmons
8,078,955 B1 12/2011 Gupta
8,082,274 B2 12/2011 Steinglass et al.
8,108,241 B2 1/2012 Shukoor
8,136,031 B2 3/2012 Massand
8,151,213 B2 4/2012 Weitzman et al.
8,223,172 B1 7/2012 Miller et al.
8,286,072 B2 10/2012 Chamberlain et al.
8,365,095 B2 1/2013 Bansal et al.
8,375,327 B2 2/2013 Lorch et al.
8,386,960 B1 2/2013 Eismann et al.
8,407,217 B1 3/2013 Zhang
8,413,261 B2 4/2013 Nemoy et al.
8,423,909 B2 4/2013 Zabielski
8,543,566 B2 9/2013 Weissman et al.
8,548,997 B1 10/2013 Wu
8,560,942 B2 10/2013 Fortes et al.
8,566,732 B2 10/2013 Louch et al.
8,572,173 B2 10/2013 Briere et al.
8,578,399 B2 11/2013 Khen et al.
8,601,383 B2 12/2013 Folting et al.
8,620,703 B1 12/2013 Kapoor et al.
8,621,652 B2 12/2013 Slater
8,635,520 B2 1/2014 Christiansen et al.
8,660,881 B2 2/2014 Wood et al.
8,677,448 B1 3/2014 Kauffman et al.
8,689,131 B2 4/2014 Ali et al.
8,694,981 B2 4/2014 Federighi et al.
8,719,071 B2 5/2014 MacIntyre et al.
8,738,414 B1 5/2014 Nagar et al.
8,788,931 B1 7/2014 Chen et al.
8,812,471 B2 8/2014 Akita
8,819,042 B2 8/2014 Samudrala et al.
8,825,758 B2 9/2014 Bailor et al.
8,838,533 B2 9/2014 Kwiatkowski et al.
8,862,979 B2 10/2014 Hawking
8,863,022 B2 10/2014 Rhodes et al.
8,869,027 B2 10/2014 Louch et al.
8,910,062 B2 12/2014 Bangor
8,937,627 B1 1/2015 Otero et al.
8,938,465 B2 1/2015 Messer
8,954,871 B2 2/2015 Louch et al.
9,007,405 B1 4/2015 Eldar et al.
9,015,716 B2 4/2015 Fletcher et al.
9,021,118 B2 4/2015 John et al.
9,026,897 B2 5/2015 Zarras
9,043,362 B2 5/2015 Weissman et al.
9,063,958 B2 6/2015 Muller et al.
9,129,234 B2 9/2015 Campbell et al.
9,159,246 B2 10/2015 Rodriguez et al.
9,172,738 B1 10/2015 Dacosta
9,177,238 B2 11/2015 Windmueller et al.
9,183,303 B1 11/2015 Goel et al.
9,223,770 B1 12/2015 Ledet
9,239,719 B1 1/2016 Feinstein et al.
9,244,917 B1 1/2016 Sharma et al.
9,253,130 B2 2/2016 Zaveri
9,268,604 B1 2/2016 Herzberg et al.
9,286,246 B2 3/2016 Saito et al.
9,286,475 B2 3/2016 Li et al.
9,292,587 B2 3/2016 Kann et al.
9,336,502 B2 5/2016 Mohammad et al.
9,342,579 B2 5/2016 Cao et al.
9,361,287 B1 6/2016 Simon et al.
9,372,592 B1 6/2016 Goodspeed et al.
9,390,059 B1 7/2016 Gur et al.
9,395,959 B2 7/2016 Hatfield et al.
9,405,929 B1 * 8/2016 Van Rotterdam ... G06F 21/6218
9,424,287 B2 8/2016 Schroth

(56) References Cited

U.S. PATENT DOCUMENTS

| | | | |
|---|---|---|---|
| 9,424,333 | B1 | 8/2016 | Bisignani et al. |
| 9,424,545 | B1 | 8/2016 | Lee |
| 9,430,458 | B2 | 8/2016 | Rhee et al. |
| 9,449,031 | B2 | 9/2016 | Barrus et al. |
| 9,495,386 | B2 | 11/2016 | Tapley et al. |
| 9,501,751 | B1 | 11/2016 | Holler et al. |
| 9,519,699 | B1 | 12/2016 | Kulkarni et al. |
| 9,558,172 | B2 | 1/2017 | Rampson et al. |
| 9,569,511 | B2 | 2/2017 | Morin |
| 9,613,086 | B1 | 4/2017 | Sherman |
| 9,635,091 | B1 | 4/2017 | Laukkanen et al. |
| 9,659,284 | B1 | 5/2017 | Wilson et al. |
| 9,679,456 | B2 | 6/2017 | East |
| 9,686,086 | B1 | 6/2017 | Nguyen et al. |
| 9,720,602 | B1 | 8/2017 | Chen et al. |
| 9,727,376 | B1 | 8/2017 | Bills et al. |
| 9,760,271 | B2 | 9/2017 | Persaud |
| 9,779,150 | B1 | 10/2017 | Sherman et al. |
| 9,794,256 | B2 | 10/2017 | Kiang et al. |
| 9,798,829 | B1 | 10/2017 | Baisley |
| 9,811,676 | B1 | 11/2017 | Gauvin |
| 9,866,561 | B2 | 1/2018 | Psenka et al. |
| 9,870,136 | B2 | 1/2018 | Pourshahid |
| 9,911,092 | B2 | 3/2018 | Goja |
| 10,001,908 | B2 | 6/2018 | Grieve et al. |
| 10,043,296 | B2 | 8/2018 | Li |
| 10,057,246 | B1 | 8/2018 | Drozd et al. |
| 10,067,928 | B1 | 9/2018 | Krappe |
| 10,078,668 | B1 | 9/2018 | Woodrow et al. |
| 10,169,306 | B2 | 1/2019 | O'Shaughnessy et al. |
| 10,176,154 | B2 | 1/2019 | Ben-Aharon et al. |
| 10,235,441 | B1 | 3/2019 | Makhlin et al. |
| 10,255,609 | B2 | 4/2019 | Kinkead et al. |
| 10,282,405 | B1 | 5/2019 | Silk et al. |
| 10,282,406 | B2 | 5/2019 | Bissantz |
| 10,311,080 | B2 | 6/2019 | Folting et al. |
| 10,318,624 | B1 | 6/2019 | Rosner et al. |
| 10,327,712 | B2 | 6/2019 | Beymer et al. |
| 10,347,017 | B2 | 7/2019 | Ruble et al. |
| 10,372,706 | B2 | 8/2019 | Chavan et al. |
| 10,380,140 | B2 | 8/2019 | Sherman |
| 10,419,469 | B1 | 9/2019 | Singh et al. |
| 10,423,758 | B2 | 9/2019 | Kido et al. |
| 10,445,702 | B1 | 10/2019 | Hunt |
| 10,452,360 | B1 | 10/2019 | Burman et al. |
| 10,453,118 | B2 | 10/2019 | Smith et al. |
| 10,474,317 | B2 | 11/2019 | Ramanathan et al. |
| 10,489,391 | B1 | 11/2019 | Tomlin |
| 10,489,462 | B1 | 11/2019 | Rogynskyy et al. |
| 10,496,737 | B1 | 12/2019 | Sayre et al. |
| 10,505,825 | B1 | 12/2019 | Bettaiah et al. |
| 10,528,599 | B1 | 1/2020 | Pandis et al. |
| 10,534,507 | B1 | 1/2020 | Laukkanen et al. |
| 10,540,152 | B1 | 1/2020 | Krishnaswamy et al. |
| 10,540,434 | B2 | 1/2020 | Migeon et al. |
| 10,546,001 | B1 | 1/2020 | Nguyen et al. |
| 10,564,622 | B1 | 2/2020 | Dean et al. |
| 10,573,407 | B2 | 2/2020 | Ginsburg |
| 10,579,724 | B2 | 3/2020 | Campbell et al. |
| 10,581,675 | B1 | 3/2020 | Iyer et al. |
| 10,587,714 | B1 | 3/2020 | Kulkarni et al. |
| 10,602,332 | B2 | 3/2020 | Dong et al. |
| 10,628,002 | B1 | 4/2020 | Kang et al. |
| 10,649,739 | B2 | 5/2020 | Burges et al. |
| 10,698,594 | B2 | 6/2020 | Sanches et al. |
| 10,706,061 | B2 | 7/2020 | Sherman et al. |
| 10,719,220 | B2 | 7/2020 | Ouellet et al. |
| 10,719,311 | B2 | 7/2020 | Foskett et al. |
| 10,733,256 | B2 | 8/2020 | Fickenscher et al. |
| 10,740,117 | B2 | 8/2020 | Ording et al. |
| 10,747,764 | B1 | 8/2020 | Plenderleith |
| 10,747,950 | B2 | 8/2020 | Dang et al. |
| 10,748,312 | B2 | 8/2020 | Ruble et al. |
| 10,754,688 | B2 | 8/2020 | Powell |
| 10,761,691 | B2 | 9/2020 | Anzures et al. |
| 10,762,471 | B1 | 9/2020 | Wang et al. |
| 10,795,555 | B2 | 10/2020 | Burke et al. |
| 10,795,649 | B1 | 10/2020 | Drake et al. |
| 10,809,696 | B1 | 10/2020 | Principato |
| 10,817,660 | B2 | 10/2020 | Rampson et al. |
| D910,077 | S | 2/2021 | Naroshevitch et al. |
| 10,955,992 | B2 | 3/2021 | Hooton et al. |
| 10,963,578 | B2 | 3/2021 | More et al. |
| 10,997,531 | B2 | 5/2021 | Leonelli et al. |
| 11,010,371 | B1 | 5/2021 | Slomka et al. |
| 11,030,259 | B2 | 6/2021 | Mullins et al. |
| 11,042,363 | B1 | 6/2021 | Krishnaswamy et al. |
| 11,042,699 | B1 | 6/2021 | Sayre et al. |
| 11,044,257 | B1 | 6/2021 | Heuts et al. |
| 11,048,480 | B1 | 6/2021 | Bestfleisch et al. |
| 11,048,499 | B2 | 6/2021 | Foskett et al. |
| 11,048,714 | B2 | 6/2021 | Sherman et al. |
| 11,080,636 | B1 | 8/2021 | Son |
| 11,086,894 | B1 | 8/2021 | Srivastava et al. |
| 11,108,828 | B1 | 8/2021 | Curtis et al. |
| 11,128,464 | B1 | 9/2021 | Loladia |
| 11,144,854 | B1 | 10/2021 | Mouawad |
| 11,182,218 | B2 | 11/2021 | Sanchez et al. |
| 11,190,516 | B1 | 11/2021 | Loladia |
| 11,222,167 | B2 | 1/2022 | Gehrmann et al. |
| 11,231,862 | B1 | 1/2022 | Vig et al. |
| 11,240,278 | B1 | 2/2022 | Wang et al. |
| 11,243,688 | B1 | 2/2022 | Remy et al. |
| 11,301,623 | B2 | 4/2022 | Helft et al. |
| 11,341,705 | B1 | 5/2022 | Isaacs et al. |
| 11,356,485 | B2 | 6/2022 | Hegde et al. |
| 11,360,765 | B2 | 6/2022 | Miller et al. |
| 11,372,380 | B2 | 6/2022 | Iyer et al. |
| 11,405,504 | B1 | 8/2022 | Tripathy et al. |
| 11,429,384 | B1 | 8/2022 | Navert et al. |
| 11,443,390 | B1 | 9/2022 | Caligaris et al. |
| 11,481,228 | B2 | 10/2022 | Rangasamy et al. |
| 11,494,171 | B1 | 11/2022 | Acharya et al. |
| 11,513,772 | B1 | 11/2022 | Gross |
| 11,531,446 | B1 | 12/2022 | Kakaire |
| 11,570,182 | B1 | 1/2023 | Tran et al. |
| 11,593,096 | B1 | 2/2023 | Chaptini et al. |
| 11,593,477 | B1 | 2/2023 | Thimmegowda et al. |
| 11,620,615 | B2 | 4/2023 | Jiang et al. |
| 11,663,023 | B2 | 5/2023 | Syed et al. |
| 11,681,445 | B2 | 6/2023 | Vohra et al. |
| 11,682,091 | B2 | 6/2023 | Sukman et al. |
| 11,714,612 | B2 | 8/2023 | Accardo et al. |
| 11,720,410 | B2 | 8/2023 | Culp et al. |
| 11,750,475 | B1 | 9/2023 | Gonzalez et al. |
| 11,799,951 | B1 | 10/2023 | Maloo et al. |
| 11,823,269 | B2 | 11/2023 | Aisen et al. |
| 11,882,117 | B1 | 1/2024 | Kumar |
| 11,922,222 | B1 | 3/2024 | Chawla et al. |
| 11,962,546 | B1 | 4/2024 | Hattangady et al. |
| 11,977,858 | B2 | 5/2024 | Kulkarni et al. |
| 12,034,613 | B2 | 7/2024 | Gupta et al. |
| 12,056,255 | B1 | 8/2024 | Mystetskyi et al. |
| 12,056,664 | B2 | 8/2024 | Zionpour et al. |
| 12,094,018 | B1 | 9/2024 | O'Malley |
| 12,105,939 | B1 | 10/2024 | Rank et al. |
| 12,118,490 | B1 | 10/2024 | Hooks et al. |
| 12,287,906 | B1 | 4/2025 | Hinrichs et al. |
| 2001/0008998 | A1 | 7/2001 | Tamaki et al. |
| 2001/0032248 | A1 | 10/2001 | Krafchin |
| 2001/0039551 | A1 | 11/2001 | Saito et al. |
| 2002/0002459 | A1 | 1/2002 | Lewis et al. |
| 2002/0019827 | A1 | 2/2002 | Shiman et al. |
| 2002/0065848 | A1 | 5/2002 | Walker et al. |
| 2002/0065849 | A1 | 5/2002 | Ferguson et al. |
| 2002/0065880 | A1 | 5/2002 | Hasegawa et al. |
| 2002/0069207 | A1 | 6/2002 | Alexander et al. |
| 2002/0075309 | A1 | 6/2002 | Michelman et al. |
| 2002/0082892 | A1 | 6/2002 | Raffel et al. |
| 2002/0099777 | A1 | 7/2002 | Gupta et al. |
| 2002/0138528 | A1 | 9/2002 | Gong et al. |
| 2003/0004771 | A1 | 1/2003 | Yaung |
| 2003/0033196 | A1 | 2/2003 | Tomlin |
| 2003/0041113 | A1 | 2/2003 | Larsen |

(56) References Cited

U.S. PATENT DOCUMENTS

2003/0051377 A1 3/2003 Chirafesi
2003/0052912 A1 3/2003 Bowman et al.
2003/0058277 A1 3/2003 Bowman-Amuah
2003/0065662 A1 4/2003 Cosic
2003/0093408 A1 5/2003 Brown et al.
2003/0101416 A1 5/2003 McInnes et al.
2003/0135558 A1 7/2003 Bellotti et al.
2003/0137536 A1 7/2003 Hugh
2003/0187864 A1 10/2003 Mcgoveran
2003/0200215 A1 10/2003 Chen et al.
2003/0204490 A1 10/2003 Kasriel
2003/0233224 A1 12/2003 Marchisio et al.
2004/0010514 A1 1/2004 Agarwal et al.
2004/0032432 A1 2/2004 Baynger
2004/0078105 A1 4/2004 Moon et al.
2004/0078257 A1 4/2004 Schweitzer et al.
2004/0078373 A1 4/2004 Ghoneimy et al.
2004/0098284 A1 5/2004 Petito et al.
2004/0111666 A1 6/2004 Hollcraft
2004/0119713 A1 6/2004 Meyringer
2004/0133441 A1 7/2004 Brady et al.
2004/0138939 A1 7/2004 Theiler
2004/0139400 A1 7/2004 Allam et al.
2004/0162833 A1 8/2004 Jones et al.
2004/0168115 A1 8/2004 Bauernschmidt et al.
2004/0172592 A1 9/2004 Collie et al.
2004/0186762 A1 9/2004 Beaven et al.
2004/0212615 A1 10/2004 Uthe
2004/0215443 A1 10/2004 Hatton
2004/0230940 A1 11/2004 Cooper et al.
2004/0268227 A1 12/2004 Brid
2005/0010454 A1 1/2005 Falk et al.
2005/0034058 A1 2/2005 Mills et al.
2005/0034064 A1 2/2005 Meyers et al.
2005/0039001 A1 2/2005 Hudis et al.
2005/0039033 A1 2/2005 Meyers et al.
2005/0044486 A1 2/2005 Kotler et al.
2005/0060342 A1 3/2005 Farag
2005/0063615 A1 3/2005 Siegel et al.
2005/0066306 A1 3/2005 Diab
2005/0086360 A1 4/2005 Mamou et al.
2005/0091314 A1 4/2005 Blagsvedt et al.
2005/0091596 A1 4/2005 Anthony et al.
2005/0096973 A1 5/2005 Heyse et al.
2005/0114305 A1 5/2005 Haynes et al.
2005/0125395 A1 6/2005 Boettiger
2005/0149558 A1 7/2005 Zhuk
2005/0149908 A1 7/2005 Klianev
2005/0154785 A1 7/2005 Reed et al.
2005/0165600 A1 7/2005 Kasravi et al.
2005/0171881 A1 8/2005 Ghassemieh et al.
2005/0177816 A1 8/2005 Kudukoli et al.
2005/0210371 A1 9/2005 Pollock et al.
2005/0216830 A1 9/2005 Turner et al.
2005/0228250 A1 10/2005 Bitter et al.
2005/0251021 A1 11/2005 Kaufman et al.
2005/0257204 A1 11/2005 Bryant et al.
2005/0278297 A1 12/2005 Nelson
2005/0289170 A1 12/2005 Brown et al.
2005/0289342 A1 12/2005 Needham et al.
2005/0289453 A1 12/2005 Segal et al.
2006/0009960 A1 1/2006 Valencot et al.
2006/0013462 A1 1/2006 Sadikali
2006/0015499 A1 1/2006 Clissold et al.
2006/0015806 A1 1/2006 Wallace
2006/0031148 A1 2/2006 O'Dell et al.
2006/0031764 A1 2/2006 Keyser et al.
2006/0036568 A1 2/2006 Moore et al.
2006/0044307 A1 3/2006 Song
2006/0047553 A1 3/2006 Fuhrmann et al.
2006/0047811 A1 3/2006 Lau et al.
2006/0053096 A1 3/2006 Subramanian et al.
2006/0053194 A1 3/2006 Schneider et al.
2006/0069604 A1 3/2006 Leukart et al.
2006/0069635 A1 3/2006 Ram et al.
2006/0074735 A1 4/2006 Shukla et al.
2006/0074736 A1 4/2006 Shukla et al.
2006/0080594 A1 4/2006 Chavoustie et al.
2006/0085744 A1 4/2006 Hays et al.
2006/0090169 A1 4/2006 Daniels et al.
2006/0095276 A1 5/2006 Axelrod et al.
2006/0101324 A1 5/2006 Goldberg et al.
2006/0106642 A1 5/2006 Reicher et al.
2006/0107196 A1 5/2006 Thanu et al.
2006/0111953 A1 5/2006 Setya
2006/0112123 A1 5/2006 Clark et al.
2006/0129415 A1 6/2006 Thukral et al.
2006/0129913 A1 6/2006 Vigesaa et al.
2006/0136828 A1 6/2006 Asano
2006/0143570 A1 6/2006 Washington et al.
2006/0150090 A1 7/2006 Swamidass
2006/0173762 A1 8/2006 Clater
2006/0173908 A1 8/2006 Browning et al.
2006/0190313 A1 8/2006 Lu
2006/0212299 A1 9/2006 Law
2006/0224542 A1 10/2006 Yalamanchi
2006/0224568 A1 10/2006 Debrito
2006/0224946 A1 10/2006 Barrett et al.
2006/0236246 A1 10/2006 Bono et al.
2006/0250369 A1 11/2006 Keim
2006/0253205 A1 11/2006 Gardiner
2006/0271574 A1 11/2006 Villaron et al.
2006/0271859 A1 11/2006 Gorzela
2006/0282348 A1 12/2006 Greenfield et al.
2006/0287998 A1 12/2006 Folting et al.
2006/0294451 A1 12/2006 Kelkar et al.
2007/0027932 A1 2/2007 Thibeault
2007/0032993 A1 2/2007 Yamaguchi et al.
2007/0033531 A1 2/2007 Marsh
2007/0050322 A1 3/2007 Vigesaa et al.
2007/0050379 A1 3/2007 Day et al.
2007/0050710 A1 3/2007 Redekop
2007/0067373 A1 3/2007 Higgins et al.
2007/0073899 A1 3/2007 Judge et al.
2007/0092048 A1 4/2007 Chelstrom et al.
2007/0094607 A1 4/2007 Morgan et al.
2007/0101291 A1 5/2007 Forstall et al.
2007/0106754 A1 5/2007 Moore
2007/0118527 A1 5/2007 Winje et al.
2007/0118813 A1 5/2007 Forstall et al.
2007/0143169 A1 6/2007 Grant et al.
2007/0143736 A1 6/2007 Moriarty et al.
2007/0150389 A1 6/2007 Aamodt et al.
2007/0168861 A1 7/2007 Bell et al.
2007/0174228 A1 7/2007 Folting et al.
2007/0174760 A1 7/2007 Chamberlain et al.
2007/0186173 A1 8/2007 Both et al.
2007/0192729 A1 8/2007 Downs
2007/0220119 A1 9/2007 Himmelstein
2007/0233647 A1 10/2007 Rawat et al.
2007/0239746 A1 10/2007 Masselle et al.
2007/0256043 A1 11/2007 Peters et al.
2007/0261124 A1* 11/2007 Centonze ............ G06F 21/6227
726/27
2007/0282522 A1 12/2007 Geelen
2007/0282627 A1 12/2007 Greenstein et al.
2007/0283259 A1 12/2007 Barry et al.
2007/0294235 A1 12/2007 Millett
2007/0299795 A1 12/2007 Macbeth et al.
2007/0300174 A1 12/2007 Macbeth et al.
2007/0300185 A1 12/2007 Macbeth et al.
2008/0004929 A9 1/2008 Raffel et al.
2008/0005235 A1 1/2008 Hegde et al.
2008/0010615 A1 1/2008 Curtis et al.
2008/0033777 A1 2/2008 Shukoor
2008/0034307 A1 2/2008 Cisler et al.
2008/0034314 A1 2/2008 Louch et al.
2008/0040181 A1 2/2008 Freire et al.
2008/0046816 A1 2/2008 Cao et al.
2008/0052291 A1 2/2008 Bender
2008/0059312 A1 3/2008 Gern et al.
2008/0059539 A1 3/2008 Chin et al.
2008/0065460 A1 3/2008 Raynor
2008/0077530 A1 3/2008 Banas et al.

(56) References Cited

U.S. PATENT DOCUMENTS

2008/0088628 A1 4/2008 Lu et al.
2008/0097748 A1 4/2008 Haley et al.
2008/0104091 A1 5/2008 Chin
2008/0126389 A1 5/2008 Mush et al.
2008/0126945 A1 5/2008 Munkvold et al.
2008/0127205 A1 5/2008 Barros
2008/0133736 A1 6/2008 Wensley et al.
2008/0148140 A1 6/2008 Nakano
2008/0155547 A1 6/2008 Weber et al.
2008/0163075 A1 7/2008 Beck et al.
2008/0183593 A1 7/2008 Dierks
2008/0195948 A1 8/2008 Bauer
2008/0201690 A1 8/2008 Lovisa et al.
2008/0209318 A1 8/2008 Allsop et al.
2008/0216022 A1 9/2008 Lorch et al.
2008/0221946 A1 9/2008 Balon
2008/0222192 A1 9/2008 Hughes
2008/0256014 A1 10/2008 Gould et al.
2008/0256429 A1 10/2008 Penner et al.
2008/0270597 A1 10/2008 Tenenti
2008/0282189 A1 11/2008 Hofmann et al.
2008/0295038 A1 11/2008 Helfman et al.
2008/0301237 A1 12/2008 Parsons et al.
2009/0006171 A1 1/2009 Blatchley et al.
2009/0006283 A1 1/2009 Labrie et al.
2009/0007157 A1 1/2009 Ward et al.
2009/0013244 A1 1/2009 Cudich et al.
2009/0019383 A1 1/2009 Riley et al.
2009/0024944 A1 1/2009 Louch et al.
2009/0037875 A1 2/2009 Jones et al.
2009/0043814 A1 2/2009 Faris et al.
2009/0044090 A1 2/2009 Gur et al.
2009/0048896 A1 2/2009 Anandan
2009/0049372 A1 2/2009 Goldberg
2009/0075694 A1 3/2009 Kim et al.
2009/0077164 A1 3/2009 Phillips et al.
2009/0077217 A1 3/2009 Mcfarland et al.
2009/0083140 A1 3/2009 Phan
2009/0088875 A1 4/2009 Baier et al.
2009/0094514 A1 4/2009 Dargahi et al.
2009/0113310 A1 4/2009 Appleyard et al.
2009/0125879 A1 5/2009 Miloushev et al.
2009/0129596 A1 5/2009 Chavez et al.
2009/0132331 A1 5/2009 Cartledge et al.
2009/0132470 A1 5/2009 Vignet
2009/0150813 A1 6/2009 Chang et al.
2009/0174680 A1 7/2009 Anzures et al.
2009/0192787 A1 7/2009 Roon
2009/0198715 A1 8/2009 Barbarek
2009/0222760 A1 9/2009 Halverson et al.
2009/0234699 A1 9/2009 Steinglass et al.
2009/0248710 A1 10/2009 Mccormack et al.
2009/0256972 A1 10/2009 Ramaswamy et al.
2009/0262690 A1 10/2009 Breuer et al.
2009/0271696 A1 10/2009 Bailor et al.
2009/0276692 A1 11/2009 Rosner
2009/0292690 A1 11/2009 Culbert
2009/0313201 A1 12/2009 Huelsman et al.
2009/0313537 A1 12/2009 Fu et al.
2009/0313570 A1 12/2009 Po
2009/0319542 A1 12/2009 Le Brazidec et al.
2009/0319623 A1 12/2009 Srinivasan et al.
2009/0319882 A1 12/2009 Morrison et al.
2009/0327240 A1 12/2009 Meehan et al.
2009/0327301 A1 12/2009 Lees et al.
2009/0327851 A1 12/2009 Raposo
2009/0327875 A1 12/2009 Kinkoh
2010/0017699 A1 1/2010 Farrell et al.
2010/0031135 A1 2/2010 Naghshin et al.
2010/0070845 A1 3/2010 Facemire et al.
2010/0070895 A1 3/2010 Messer
2010/0077260 A1 3/2010 Pillai et al.
2010/0082705 A1 4/2010 Ramesh et al.
2010/0083164 A1 4/2010 Martin et al.
2010/0088636 A1 4/2010 Yerkes et al.
2010/0095219 A1 4/2010 Stachowiak et al.
2010/0095298 A1 4/2010 Seshadrinathan et al.
2010/0100427 A1 4/2010 Mckeown et al.
2010/0100463 A1 4/2010 Molotsi et al.
2010/0114926 A1 5/2010 Agrawal et al.
2010/0149005 A1 6/2010 Yoon et al.
2010/0169853 A1 7/2010 Jain et al.
2010/0174678 A1 7/2010 Massand
2010/0205521 A1 8/2010 Folting
2010/0228752 A1 9/2010 Folting et al.
2010/0241477 A1 9/2010 Nylander et al.
2010/0241948 A1 9/2010 Andeen et al.
2010/0241968 A1 9/2010 Tarara et al.
2010/0241972 A1 9/2010 Spataro et al.
2010/0241990 A1 9/2010 Gabriel et al.
2010/0251090 A1 9/2010 Chamberlain et al.
2010/0251386 A1 9/2010 Gilzean et al.
2010/0257015 A1 10/2010 Molander
2010/0262625 A1 10/2010 Pittenger
2010/0268705 A1 10/2010 Douglas et al.
2010/0268773 A1 10/2010 Hunt et al.
2010/0281462 A1 11/2010 Festa
2010/0287163 A1 11/2010 Sridhar et al.
2010/0287221 A1 11/2010 Battepati et al.
2010/0313119 A1 12/2010 Baldwin et al.
2010/0324964 A1 12/2010 Callanan et al.
2010/0332973 A1 12/2010 Kloiber et al.
2011/0010340 A1 1/2011 Hung et al.
2011/0016432 A1 1/2011 Helfman
2011/0028138 A1 2/2011 Davies-Moore et al.
2011/0041140 A1 2/2011 Harm et al.
2011/0047484 A1 2/2011 Mount et al.
2011/0055177 A1 3/2011 Chakra et al.
2011/0066933 A1 3/2011 Ludwig
2011/0071869 A1 3/2011 O'Brien et al.
2011/0106636 A1 5/2011 Spear et al.
2011/0119352 A1 5/2011 Perov et al.
2011/0154192 A1 6/2011 Yang et al.
2011/0179371 A1 7/2011 Kopycinski et al.
2011/0205231 A1 8/2011 Hartley et al.
2011/0208324 A1 8/2011 Fukatsu
2011/0208732 A1 8/2011 Melton et al.
2011/0209150 A1 8/2011 Hammond et al.
2011/0219321 A1 9/2011 Gonzalez Veron et al.
2011/0225500 A1 9/2011 Casalaina et al.
2011/0225525 A1 9/2011 Chasman et al.
2011/0231273 A1 9/2011 Buchheit
2011/0238716 A1 9/2011 Amir et al.
2011/0258040 A1 10/2011 Gnanasambandam
2011/0269424 A1 11/2011 Multer
2011/0288900 A1 11/2011 Mcqueen et al.
2011/0289397 A1 11/2011 Eastmond et al.
2011/0289439 A1 11/2011 Jugel
2011/0292046 A1 12/2011 Gotz
2011/0298618 A1 12/2011 Stahl et al.
2011/0302003 A1 12/2011 Shirish et al.
2012/0029962 A1 2/2012 Podgurny et al.
2012/0035974 A1 2/2012 Seybold
2012/0036423 A1 2/2012 Haynes et al.
2012/0036462 A1 2/2012 Schwartz et al.
2012/0050802 A1 3/2012 Masuda
2012/0066587 A1 3/2012 Zhou et al.
2012/0072821 A1 3/2012 Bowling
2012/0079408 A1 3/2012 Rohwer
2012/0081762 A1 4/2012 Yamada
2012/0084798 A1 4/2012 Reeves et al.
2012/0086716 A1 4/2012 Reeves et al.
2012/0086717 A1 4/2012 Liu
2012/0089610 A1 4/2012 Agrawal et al.
2012/0089914 A1 4/2012 Holt et al.
2012/0089992 A1 4/2012 Reeves et al.
2012/0096389 A1 4/2012 Flam et al.
2012/0096392 A1 4/2012 Ording et al.
2012/0102432 A1 4/2012 Breedvelt-Schouten et al.
2012/0102543 A1 4/2012 Kohli et al.
2012/0110515 A1 5/2012 Abramoff et al.
2012/0116834 A1 5/2012 Pope et al.
2012/0116835 A1 5/2012 Pope et al.
2012/0120086 A1 5/2012 Dang et al.

(56) References Cited

U.S. PATENT DOCUMENTS

2012/0124749 A1 5/2012 Lewman
2012/0130907 A1 5/2012 Thompson et al.
2012/0131445 A1 5/2012 Oyarzabal et al.
2012/0137238 A1 5/2012 Abeln
2012/0151173 A1 6/2012 Shirley et al.
2012/0158744 A1 6/2012 Tseng et al.
2012/0166980 A1 6/2012 Yosef et al.
2012/0192050 A1 7/2012 Campbell et al.
2012/0198322 A1 8/2012 Gulwani et al.
2012/0210252 A1 8/2012 Fedoseyeva et al.
2012/0215574 A1 8/2012 Driessnack et al.
2012/0215578 A1 8/2012 Swierz et al.
2012/0229867 A1 9/2012 Takagi
2012/0233150 A1 9/2012 Naim et al.
2012/0233533 A1 9/2012 Yucel et al.
2012/0234907 A1 9/2012 Clark et al.
2012/0236368 A1 9/2012 Uchida et al.
2012/0239454 A1 9/2012 Taix et al.
2012/0244891 A1 9/2012 Appleton
2012/0246170 A1 9/2012 Iantorno
2012/0254252 A1 10/2012 Jin et al.
2012/0254770 A1 10/2012 Ophir
2012/0260190 A1 10/2012 Berger et al.
2012/0278117 A1 11/2012 Nguyen et al.
2012/0284197 A1 11/2012 Sitrick et al.
2012/0284643 A1 11/2012 Sitrick et al.
2012/0297307 A1 11/2012 Rider et al.
2012/0300931 A1 11/2012 Ollikainen et al.
2012/0303262 A1 11/2012 Alam et al.
2012/0304098 A1 11/2012 Kuulusa
2012/0311496 A1 12/2012 Cao et al.
2012/0311672 A1 12/2012 Connor et al.
2012/0324348 A1 12/2012 Rounthwaite
2013/0015954 A1 1/2013 Thorne et al.
2013/0018952 A1 1/2013 Mcconnell et al.
2013/0018953 A1 1/2013 Mcconnell et al.
2013/0018960 A1 1/2013 Knysz et al.
2013/0024418 A1 1/2013 Sitrick et al.
2013/0024760 A1 1/2013 Vogel et al.
2013/0036369 A1 2/2013 Mitchell et al.
2013/0041958 A1 2/2013 Post et al.
2013/0054514 A1 2/2013 Barrett-Kahn et al.
2013/0055113 A1 2/2013 Chazin et al.
2013/0059598 A1 3/2013 Miyagi et al.
2013/0063490 A1 3/2013 Zaman et al.
2013/0086460 A1 4/2013 Folting et al.
2013/0090969 A1 4/2013 Rivere
2013/0097490 A1 4/2013 Kotler et al.
2013/0103417 A1 4/2013 Seto et al.
2013/0104035 A1 4/2013 Wagner et al.
2013/0111320 A1 5/2013 Campbell et al.
2013/0117268 A1 5/2013 Smith et al.
2013/0117729 A1 5/2013 Ectors et al.
2013/0158964 A1 6/2013 Hall et al.
2013/0159832 A1 6/2013 Ingargiola et al.
2013/0159907 A1 6/2013 Brosche et al.
2013/0179209 A1 7/2013 Milosevich
2013/0211866 A1 8/2013 Gordon et al.
2013/0212197 A1 8/2013 Karlson
2013/0212234 A1 8/2013 Bartlett et al.
2013/0215475 A1 8/2013 Noguchi
2013/0238363 A1 9/2013 Ohta et al.
2013/0238968 A1 9/2013 Barrus
2013/0246384 A1 9/2013 Victor
2013/0262527 A1 10/2013 Hunter et al.
2013/0268331 A1 10/2013 Bitz et al.
2013/0297468 A1 11/2013 Hirsch et al.
2013/0307997 A1 11/2013 O'Keefe et al.
2013/0318424 A1 11/2013 Boyd
2013/0339051 A1 12/2013 Dobrean
2014/0002863 A1 1/2014 Hasegawa et al.
2014/0006326 A1 1/2014 Bazanov
2014/0012616 A1 1/2014 Moshenek
2014/0019842 A1 1/2014 Montagna et al.
2014/0032480 A1 1/2014 Lesage
2014/0033307 A1 1/2014 Schmidtler
2014/0040874 A1 2/2014 Wilson et al.
2014/0043331 A1 2/2014 Makinen et al.
2014/0046638 A1 2/2014 Peloski
2014/0052749 A1 2/2014 Rissanen
2014/0058801 A1 2/2014 Deodhar et al.
2014/0059017 A1 2/2014 Chaney et al.
2014/0068403 A1 3/2014 Bhargav et al.
2014/0074545 A1 3/2014 Minder et al.
2014/0075301 A1 3/2014 Mihara
2014/0078557 A1 3/2014 Hasegawa et al.
2014/0082525 A1 3/2014 Kass et al.
2014/0095237 A1 4/2014 Ehrler et al.
2014/0100884 A1 4/2014 Hamilton et al.
2014/0101527 A1 4/2014 Suciu
2014/0108985 A1 4/2014 Scott et al.
2014/0109012 A1 4/2014 Choudhary et al.
2014/0111516 A1 4/2014 Hall et al.
2014/0115515 A1 4/2014 Adams et al.
2014/0115518 A1 4/2014 Abdukalykov et al.
2014/0129960 A1 5/2014 Wang et al.
2014/0136972 A1 5/2014 Rodgers et al.
2014/0137003 A1 5/2014 Peters et al.
2014/0137144 A1 5/2014 Jarvenpaa et al.
2014/0143047 A1 5/2014 Carter et al.
2014/0143252 A1 5/2014 Silverstein et al.
2014/0172475 A1 6/2014 Olliphant et al.
2014/0173401 A1 6/2014 Oshlag et al.
2014/0181155 A1 6/2014 Homsany
2014/0188546 A1 7/2014 Goja
2014/0188748 A1 7/2014 Cavoue et al.
2014/0195933 A1 7/2014 Rao Dv
2014/0214404 A1 7/2014 Kalia et al.
2014/0215303 A1 7/2014 Grigorovitch et al.
2014/0229816 A1 8/2014 Yakub
2014/0240735 A1 8/2014 Salgado
2014/0249877 A1 9/2014 Hull et al.
2014/0257568 A1 9/2014 Czaja et al.
2014/0278638 A1 9/2014 Kreuzkamp et al.
2014/0278720 A1 9/2014 Taguchi
2014/0280287 A1 9/2014 Ganti et al.
2014/0280377 A1 9/2014 Frew
2014/0281868 A1 9/2014 Vogel et al.
2014/0281869 A1 9/2014 Yob
2014/0282417 A1 9/2014 Paveza et al.
2014/0289223 A1 9/2014 Colwell et al.
2014/0297828 A1 10/2014 Voltmer et al.
2014/0304174 A1 10/2014 Scott et al.
2014/0306837 A1 10/2014 Hauck
2014/0310345 A1 10/2014 Megiddo et al.
2014/0324497 A1 10/2014 Verma et al.
2014/0324501 A1 10/2014 Davidow et al.
2014/0325552 A1 10/2014 Evans et al.
2014/0337085 A1 11/2014 Li et al.
2014/0359580 A1 12/2014 Boissy et al.
2014/0365938 A1 12/2014 Black et al.
2014/0372856 A1 12/2014 Radakovitz et al.
2014/0372932 A1 12/2014 Rutherford et al.
2015/0032686 A1 1/2015 Kuchoor
2015/0033131 A1 1/2015 Peev et al.
2015/0033149 A1 1/2015 Kuchoor
2015/0035918 A1 2/2015 Matsumoto et al.
2015/0039387 A1 2/2015 Akahoshi et al.
2015/0046209 A1 2/2015 Choe
2015/0046900 A1 2/2015 Eldridge et al.
2015/0058619 A1 2/2015 Sweet et al.
2015/0067556 A1 3/2015 Tibrewal et al.
2015/0074721 A1 3/2015 Fishman et al.
2015/0074728 A1 3/2015 Chai et al.
2015/0088822 A1 3/2015 Raja et al.
2015/0095752 A1 4/2015 Studer et al.
2015/0100336 A1 4/2015 Ford et al.
2015/0106736 A1 4/2015 Torman et al.
2015/0125834 A1 5/2015 Mendoza Tascon
2015/0135257 A1 5/2015 Shah et al.
2015/0142676 A1 5/2015 Mcginnis et al.
2015/0142829 A1 5/2015 Lee et al.
2015/0153943 A1 6/2015 Wang
2015/0154660 A1 6/2015 Weald et al.

(56) References Cited

U.S. PATENT DOCUMENTS

2015/0169514 A1 6/2015 Sah et al.
2015/0169531 A1 6/2015 Campbell et al.
2015/0178657 A1 6/2015 Kleehammer et al.
2015/0188964 A1 7/2015 Sharma et al.
2015/0205830 A1 7/2015 Bastide et al.
2015/0212717 A1 7/2015 Nair et al.
2015/0213397 A1 7/2015 Arena
2015/0220491 A1 8/2015 Cochrane et al.
2015/0227960 A1 8/2015 Chetan et al.
2015/0234887 A1 8/2015 Greene et al.
2015/0242091 A1 8/2015 Lu et al.
2015/0248214 A1 9/2015 Gilger et al.
2015/0249864 A1 9/2015 Tang et al.
2015/0261796 A1 9/2015 Gould et al.
2015/0262121 A1 9/2015 Riel-Dalpe et al.
2015/0278699 A1 10/2015 Danielsson
2015/0281292 A1 10/2015 Kim et al.
2015/0293954 A1 10/2015 Hsiao et al.
2015/0295779 A1 10/2015 Ching et al.
2015/0295877 A1 10/2015 Roman et al.
2015/0310126 A1 10/2015 Steiner et al.
2015/0317590 A1 11/2015 Karlson
2015/0324453 A1 11/2015 Werner
2015/0331846 A1 11/2015 Guggilla et al.
2015/0363478 A1 12/2015 Haynes
2015/0370540 A1 12/2015 Coslovi et al.
2015/0370776 A1 12/2015 New
2015/0370904 A1 12/2015 Joshi et al.
2015/0378542 A1 12/2015 Saito et al.
2015/0378556 A1 12/2015 Ramanathan et al.
2015/0378711 A1 12/2015 Cameron et al.
2015/0378979 A1 12/2015 Hirzel et al.
2015/0379472 A1 12/2015 Gilmour et al.
2016/0012111 A1 1/2016 Pattabhiraman et al.
2016/0018962 A1 1/2016 Low et al.
2016/0026939 A1 1/2016 Schiffer et al.
2016/0027076 A1 1/2016 Jackson et al.
2016/0035546 A1 2/2016 Platt et al.
2016/0041736 A1 2/2016 Schulz
2016/0055134 A1 2/2016 Sathish et al.
2016/0055374 A1 2/2016 Zhang et al.
2016/0057163 A1 2/2016 Boffa et al.
2016/0063435 A1 3/2016 Shah et al.
2016/0068960 A1 3/2016 Jung et al.
2016/0078368 A1 3/2016 Kakhandiki et al.
2016/0088480 A1 3/2016 Chen et al.
2016/0092557 A1 3/2016 Stojanovic et al.
2016/0098574 A1 4/2016 Bargagni
2016/0117308 A1 4/2016 Haider et al.
2016/0170586 A1 6/2016 Gallo
2016/0173122 A1 6/2016 Akitomi et al.
2016/0196310 A1 7/2016 Dutta
2016/0210572 A1 7/2016 Shaaban et al.
2016/0216948 A1 7/2016 Mcpherson et al.
2016/0224532 A1 8/2016 Miller et al.
2016/0224676 A1 8/2016 Miller et al.
2016/0224939 A1 8/2016 Chen et al.
2016/0231915 A1 8/2016 Nhan et al.
2016/0232489 A1 8/2016 Skaaksrud
2016/0246490 A1 8/2016 Cabral
2016/0253061 A1 9/2016 Nitsan et al.
2016/0253982 A1 9/2016 Cheung et al.
2016/0259856 A1 9/2016 Ananthapur Bache et al.
2016/0275150 A1 9/2016 Bourbonnais et al.
2016/0292206 A1 10/2016 Ruiz Velazquez et al.
2016/0299655 A1 10/2016 Migos et al.
2016/0308963 A1 10/2016 Kung
2016/0321235 A1 11/2016 He et al.
2016/0321604 A1 11/2016 Imaeda et al.
2016/0335302 A1 11/2016 Wright et al.
2016/0335303 A1 11/2016 Madhalam et al.
2016/0335604 A1 11/2016 Reminick et al.
2016/0335731 A1 11/2016 Hall
2016/0335903 A1 11/2016 Mendoza Tascon
2016/0344828 A1 11/2016 Hausler et al.
2016/0350950 A1 12/2016 Ritchie et al.
2016/0381099 A1 12/2016 Keslin et al.
2017/0017779 A1 1/2017 Huang et al.
2017/0031967 A1 2/2017 Chavan et al.
2017/0038919 A1 2/2017 Moss et al.
2017/0041296 A1 2/2017 Ford et al.
2017/0052937 A1 2/2017 Sirven et al.
2017/0061342 A1 3/2017 Lore et al.
2017/0061360 A1 3/2017 Rucker et al.
2017/0061820 A1 3/2017 Firoozbakhsh
2017/0063722 A1 3/2017 Cropper et al.
2017/0075557 A1 3/2017 Noble et al.
2017/0076101 A1 3/2017 Kochhar et al.
2017/0090734 A1 3/2017 Fitzpatrick
2017/0090736 A1 3/2017 King et al.
2017/0091337 A1 3/2017 Patterson
2017/0093876 A1 3/2017 Feng et al.
2017/0109499 A1 4/2017 Doshi et al.
2017/0111327 A1 4/2017 Wu
2017/0116552 A1 4/2017 Deodhar et al.
2017/0124042 A1 5/2017 Campbell et al.
2017/0124048 A1 5/2017 Campbell et al.
2017/0124055 A1 5/2017 Radakovitz et al.
2017/0124740 A1 5/2017 Campbell et al.
2017/0126772 A1 5/2017 Campbell et al.
2017/0132296 A1 5/2017 Ding
2017/0132652 A1 5/2017 Kedzlie et al.
2017/0139874 A1 5/2017 Chin
2017/0139884 A1 5/2017 Bendig et al.
2017/0139891 A1 5/2017 Ah-Soon et al.
2017/0139992 A1 5/2017 Morin
2017/0140047 A1 5/2017 Bendig et al.
2017/0140219 A1 5/2017 King et al.
2017/0153771 A1 6/2017 Chu
2017/0161246 A1 6/2017 Klima
2017/0177556 A1 6/2017 Fay et al.
2017/0177888 A1 6/2017 Arora et al.
2017/0185575 A1 6/2017 Sood et al.
2017/0185592 A1 6/2017 Frei et al.
2017/0185668 A1 6/2017 Convertino et al.
2017/0200122 A1 7/2017 Edson et al.
2017/0201428 A1 7/2017 Normandin
2017/0206366 A1 7/2017 Fay et al.
2017/0212924 A1 7/2017 Semlani et al.
2017/0220813 A1 8/2017 Mullins et al.
2017/0221072 A1 8/2017 Athulurutlrumala et al.
2017/0221238 A1 8/2017 Limberger
2017/0228421 A1 8/2017 Sharma et al.
2017/0228445 A1 8/2017 Chiu et al.
2017/0228460 A1 8/2017 Amel et al.
2017/0229152 A1 8/2017 Loganathan et al.
2017/0236081 A1 8/2017 Grady Smith et al.
2017/0242921 A1 8/2017 Rota
2017/0257517 A1 9/2017 Panda
2017/0262786 A1 9/2017 Khasis
2017/0269805 A1 9/2017 Demaris et al.
2017/0270970 A1 9/2017 Ho et al.
2017/0272316 A1 9/2017 Johnson et al.
2017/0272331 A1 9/2017 Lissack
2017/0277620 A1 9/2017 Kadioglu
2017/0277669 A1 9/2017 Sekharan
2017/0285879 A1 10/2017 Pilkington et al.
2017/0285890 A1 10/2017 Dolman
2017/0289619 A1 10/2017 Xu et al.
2017/0300545 A1 10/2017 Lee et al.
2017/0301039 A1 10/2017 Dyer et al.
2017/0315683 A1 11/2017 Boucher et al.
2017/0315714 A1 11/2017 Shyamsundar et al.
2017/0315974 A1 11/2017 Kong et al.
2017/0315979 A1 11/2017 Boucher et al.
2017/0316215 A1* 11/2017 Hadzic .................. G06F 21/604
2017/0316355 A1 11/2017 Shrestha et al.
2017/0322963 A1 11/2017 Ramamurthi et al.
2017/0324692 A1 11/2017 Zhou
2017/0329479 A1 11/2017 Rauschenbach et al.
2017/0336940 A1 11/2017 Townsend et al.
2017/0337287 A1 11/2017 Gill
2017/0344895 A1 11/2017 Roy
2017/0351252 A1 12/2017 Kleifges et al.

(56) References Cited

U.S. PATENT DOCUMENTS

2017/0351974 A1 12/2017 Rose et al.
2017/0372442 A1 12/2017 Mejias
2017/0374205 A1 12/2017 Panda
2018/0011827 A1 1/2018 Avery et al.
2018/0025084 A1 1/2018 Conlan et al.
2018/0026954 A1 1/2018 Toepke et al.
2018/0032492 A1 2/2018 Altshuller et al.
2018/0032570 A1 2/2018 Miller et al.
2018/0039651 A1 2/2018 Tobin et al.
2018/0055434 A1 3/2018 Cheung et al.
2018/0068470 A1 3/2018 Croft
2018/0075104 A1 3/2018 Oberbreckling et al.
2018/0075115 A1 3/2018 Murray et al.
2018/0075413 A1 3/2018 Culver et al.
2018/0075560 A1 3/2018 Thukral et al.
2018/0077143 A1 3/2018 Sridharan et al.
2018/0081505 A1 3/2018 Ron et al.
2018/0081863 A1 3/2018 Bathla
2018/0081868 A1 3/2018 Willcock et al.
2018/0082072 A1 3/2018 Hosie et al.
2018/0088753 A1 3/2018 Viegas et al.
2018/0088989 A1 3/2018 Nield et al.
2018/0089299 A1 3/2018 Collins et al.
2018/0095938 A1 4/2018 Monte
2018/0096417 A1 4/2018 Cook et al.
2018/0109760 A1 4/2018 Metter et al.
2018/0121028 A1 5/2018 Kuscher et al.
2018/0121994 A1 5/2018 Matsunaga et al.
2018/0128636 A1 5/2018 Zhou
2018/0129651 A1 5/2018 Latvala et al.
2018/0143967 A1 5/2018 Anbazhagan et al.
2018/0157455 A1 6/2018 Troy et al.
2018/0157467 A1 6/2018 Stachura
2018/0157468 A1 6/2018 Stachura
2018/0157633 A1 6/2018 He et al.
2018/0173715 A1 6/2018 Dunne
2018/0174104 A1 6/2018 Schikora et al.
2018/0181650 A1 6/2018 Komatsuda et al.
2018/0181716 A1 6/2018 Mander et al.
2018/0189734 A1 7/2018 Newhouse et al.
2018/0210936 A1 7/2018 Reynolds et al.
2018/0213286 A1 7/2018 Roman et al.
2018/0225270 A1 8/2018 Bhide et al.
2018/0225365 A1 8/2018 Altaf et al.
2018/0232422 A1 8/2018 Park et al.
2018/0260371 A1 9/2018 Theodore et al.
2018/0260435 A1 9/2018 Xu
2018/0262705 A1 9/2018 Park et al.
2018/0276417 A1 9/2018 Cerezo Sanchez
2018/0285149 A1 10/2018 Bhandari et al.
2018/0285918 A1 10/2018 Staggs
2018/0293217 A1 10/2018 Callaghan
2018/0293587 A1 10/2018 Oda
2018/0293669 A1 10/2018 Jackson et al.
2018/0329930 A1 11/2018 Eberlein et al.
2018/0330320 A1 11/2018 Kohli
2018/0357047 A1 12/2018 Brown et al.
2018/0357305 A1 12/2018 Kinast et al.
2018/0365429 A1 12/2018 Segal
2018/0367484 A1 12/2018 Rodriguez et al.
2018/0373434 A1 12/2018 Switzer et al.
2018/0373757 A1 12/2018 Schukovets et al.
2018/0374479 A1 12/2018 Hall et al.
2019/0004773 A1 1/2019 Hoberman
2019/0005094 A1 1/2019 Yi et al.
2019/0011310 A1 1/2019 Turnbull et al.
2019/0012306 A1 1/2019 Dvorak
2019/0012342 A1 1/2019 Cohn
2019/0028360 A1 1/2019 Douglas et al.
2019/0034395 A1 1/2019 Curry et al.
2019/0036989 A1 1/2019 Eirinberg et al.
2019/0042628 A1 2/2019 Rajpara
2019/0050445 A1 2/2019 Griffith et al.
2019/0050466 A1 2/2019 Kim et al.
2019/0050812 A1 2/2019 Boileau
2019/0056856 A1 2/2019 Simmons et al.
2019/0065545 A1 2/2019 Hazel et al.
2019/0068703 A1 2/2019 Vora et al.
2019/0073350 A1 3/2019 Shiotani
2019/0079751 A1 3/2019 Foskett et al.
2019/0095413 A1 3/2019 Davis et al.
2019/0095533 A1 3/2019 Levine et al.
2019/0097909 A1 3/2019 Puri et al.
2019/0102425 A1 4/2019 Obeidat
2019/0108046 A1 4/2019 Spencer-Harper et al.
2019/0108417 A1 4/2019 Talagala et al.
2019/0113935 A1 4/2019 Kuo et al.
2019/0114308 A1 4/2019 Hancock
2019/0114589 A1 4/2019 Voss et al.
2019/0123924 A1 4/2019 Embiricos et al.
2019/0130413 A1 5/2019 Nelson et al.
2019/0130611 A1 5/2019 Black et al.
2019/0138583 A1 5/2019 Silk et al.
2019/0138588 A1 5/2019 Silk et al.
2019/0138653 A1 5/2019 Roller et al.
2019/0147030 A1 5/2019 Stein et al.
2019/0155577 A1 5/2019 Prabha et al.
2019/0155821 A1 5/2019 Dirisala
2019/0166110 A1 5/2019 Miu
2019/0179501 A1 6/2019 Seeley et al.
2019/0199823 A1 6/2019 Underwood et al.
2019/0208058 A1 7/2019 Dvorkin et al.
2019/0213557 A1 7/2019 Dotan-Cohen et al.
2019/0220161 A1 7/2019 Loftus et al.
2019/0236188 A1 8/2019 Mckenna
2019/0238636 A1 8/2019 Li et al.
2019/0243879 A1 8/2019 Harley et al.
2019/0251884 A1 8/2019 Burns et al.
2019/0258461 A1 8/2019 Li et al.
2019/0258706 A1 8/2019 Li et al.
2019/0286839 A1 9/2019 Mutha et al.
2019/0306009 A1 10/2019 Makovsky et al.
2019/0312899 A1 10/2019 Shulman et al.
2019/0324840 A1 10/2019 Malamut et al.
2019/0325012 A1 10/2019 Delaney et al.
2019/0327294 A1 10/2019 Subramani Nadar et al.
2019/0340550 A1 11/2019 Denger et al.
2019/0347077 A1 11/2019 Huebra
2019/0349447 A1 11/2019 Adams et al.
2019/0361879 A1 11/2019 Rogynskyy et al.
2019/0361971 A1 11/2019 Zenger et al.
2019/0364009 A1 11/2019 Joseph et al.
2019/0371442 A1 12/2019 Schoenberg
2019/0377791 A1 12/2019 Abou Mahmoud et al.
2019/0391707 A1 12/2019 Ristow et al.
2020/0005248 A1 1/2020 Gerzi et al.
2020/0005295 A1 1/2020 Murphy
2020/0012629 A1 1/2020 Lereya et al.
2020/0019548 A1 1/2020 Agnew et al.
2020/0019595 A1 1/2020 Azua Garcia
2020/0026352 A1 1/2020 Wang et al.
2020/0026397 A1 1/2020 Wohlstadter et al.
2020/0042648 A1 2/2020 Rao
2020/0050696 A1 2/2020 Mowatt et al.
2020/0051675 A1 2/2020 Nelson et al.
2020/0053176 A1 2/2020 Jimenez Salgado et al.
2020/0065857 A1 2/2020 Lagi et al.
2020/0117908 A1 4/2020 Pavetic et al.
2020/0125574 A1 4/2020 Ghoshal et al.
2020/0134002 A1 4/2020 Tung et al.
2020/0142546 A1 5/2020 Breedvelt-Schouten et al.
2020/0151630 A1 5/2020 Shakhnovich
2020/0159558 A1 5/2020 Bak et al.
2020/0175094 A1 6/2020 Palmer
2020/0176089 A1 6/2020 Jones et al.
2020/0192646 A1 6/2020 Yerramreddy et al.
2020/0192785 A1 6/2020 Chen
2020/0193388 A1 6/2020 Tran-Kiem et al.
2020/0234205 A1 7/2020 Apps et al.
2020/0236110 A1 7/2020 Metzler et al.
2020/0247661 A1 8/2020 Rao et al.
2020/0250259 A1 8/2020 Nanavati et al.
2020/0265112 A1 8/2020 Fox et al.
2020/0279315 A1 9/2020 Manggala

(56) References Cited

U.S. PATENT DOCUMENTS

2020/0293337 A1 9/2020 Rangasamy et al.
2020/0293616 A1 9/2020 Nelson et al.
2020/0301678 A1 9/2020 Burman et al.
2020/0301902 A1 9/2020 Maloy et al.
2020/0310835 A1 10/2020 Momchilov
2020/0310888 A1 10/2020 Gopalan et al.
2020/0326824 A1 10/2020 Magahern et al.
2020/0327244 A1 10/2020 Blass et al.
2020/0334019 A1 10/2020 Bosworth et al.
2020/0335188 A1 10/2020 Ozeran
2020/0341947 A1 10/2020 Aziz et al.
2020/0348809 A1 11/2020 Drescher
2020/0349320 A1 11/2020 Owens
2020/0356740 A1 11/2020 Principato
2020/0356873 A1 11/2020 Nawrocke et al.
2020/0372055 A1 11/2020 Joko et al.
2020/0374146 A1 11/2020 Chhabra et al.
2020/0380212 A1 12/2020 Butler et al.
2020/0380449 A1 12/2020 Choi
2020/0387664 A1 12/2020 Kusumura et al.
2020/0401382 A1 12/2020 Briggs et al.
2020/0401581 A1 12/2020 Eubank et al.
2020/0401583 A1 12/2020 Church et al.
2020/0409949 A1 12/2020 Saxena et al.
2020/0410395 A1 12/2020 Ray et al.
2021/0014136 A1 1/2021 Rath
2021/0019287 A1 1/2021 Prasad et al.
2021/0019374 A1 1/2021 Donaldson et al.
2021/0021603 A1 1/2021 Gibbons
2021/0026598 A1 1/2021 Zinsmeyer et al.
2021/0034058 A1 2/2021 Subramanian et al.
2021/0034443 A1 2/2021 Lowin et al.
2021/0035069 A1 2/2021 Parikh
2021/0042662 A1 2/2021 Pu et al.
2021/0042796 A1 2/2021 Khoury et al.
2021/0049524 A1 2/2021 Nachum et al.
2021/0049555 A1 2/2021 Shor
2021/0055955 A1 2/2021 Yankelevich et al.
2021/0056509 A1 2/2021 Lindy
2021/0065203 A1 3/2021 Billigmeier et al.
2021/0072883 A1 3/2021 Migunova et al.
2021/0073526 A1 3/2021 Zeng et al.
2021/0075870 A1 3/2021 Kempf et al.
2021/0081404 A1 3/2021 Kempf et al.
2021/0084120 A1 3/2021 Fisher et al.
2021/0096852 A1 4/2021 Stump et al.
2021/0117864 A1 4/2021 Weast et al.
2021/0117893 A1 4/2021 Sohum et al.
2021/0124749 A1 4/2021 Suzuki et al.
2021/0124872 A1 4/2021 Lereya
2021/0136027 A1 5/2021 Barbitta et al.
2021/0141923 A1 5/2021 Wu et al.
2021/0149553 A1 5/2021 Lereya et al.
2021/0149688 A1 5/2021 Newell et al.
2021/0149925 A1 5/2021 Mann et al.
2021/0150489 A1 5/2021 Haramati et al.
2021/0157978 A1 5/2021 Haramati et al.
2021/0158214 A1 5/2021 Witt et al.
2021/0165782 A1 6/2021 Deshpande et al.
2021/0166196 A1 6/2021 Lereya et al.
2021/0166339 A1 6/2021 Mann et al.
2021/0173682 A1 6/2021 Chakraborti et al.
2021/0174006 A1 6/2021 Stokes
2021/0192126 A1 6/2021 Gehrmann et al.
2021/0203549 A1 7/2021 Snehashis et al.
2021/0232484 A1 7/2021 Keneally et al.
2021/0248311 A1 8/2021 Helft et al.
2021/0257065 A1 8/2021 Mander et al.
2021/0264220 A1 8/2021 Wei et al.
2021/0271726 A1 9/2021 Trainor
2021/0273957 A1 9/2021 Boyer et al.
2021/0281428 A1 9/2021 Kempf et al.
2021/0304020 A1 9/2021 Kaplan
2021/0319135 A1 10/2021 Hwang
2021/0326519 A1 10/2021 Lin et al.
2021/0328888 A1 10/2021 Rath
2021/0342145 A1 11/2021 Miller et al.
2021/0342785 A1 11/2021 Mann et al.
2021/0357579 A1 11/2021 Lereya et al.
2021/0365446 A1 11/2021 Srivastava et al.
2021/0374197 A1 12/2021 Chauhan
2021/0382611 A1 12/2021 Gan
2021/0397585 A1 12/2021 Seward
2022/0011732 A1 1/2022 Hall
2022/0036153 A1 2/2022 O'Malia et al.
2022/0066847 A1 3/2022 Liu et al.
2022/0099454 A1 3/2022 Decrop et al.
2022/0103589 A1 3/2022 Shen et al.
2022/0114044 A1 4/2022 Singh
2022/0121325 A1 4/2022 Roberts et al.
2022/0121478 A1 4/2022 Chivukula et al.
2022/0122183 A1 4/2022 Jacob et al.
2022/0129257 A1 4/2022 Touati et al.
2022/0129283 A1 4/2022 Sharma et al.
2022/0138004 A1 5/2022 Nandakumar et al.
2022/0147934 A1 5/2022 Chandrashekar et al.
2022/0159010 A1 5/2022 Bandarupalli et al.
2022/0191251 A1 6/2022 Gavish et al.
2022/0206864 A1 6/2022 Nadathur et al.
2022/0221591 A1 7/2022 Smith et al.
2022/0222242 A1 7/2022 Spranger et al.
2022/0222427 A1 7/2022 Mann et al.
2022/0229928 A1 7/2022 Shachar et al.
2022/0237550 A1 7/2022 Jennings et al.
2022/0245328 A1 8/2022 Tsabba
2022/0253347 A1 8/2022 Jones et al.
2022/0261288 A1 8/2022 Viswanathan et al.
2022/0269957 A1 8/2022 Rangan
2022/0291666 A1 9/2022 Cella et al.
2022/0292180 A1 9/2022 Chauhan
2022/0300850 A1 9/2022 Mendez et al.
2022/0308918 A1 9/2022 Pandey et al.
2022/0335362 A1 10/2022 Nikain et al.
2022/0343010 A1 10/2022 Ghafoor et al.
2022/0343258 A1 10/2022 Wilde et al.
2022/0351564 A1 11/2022 Sahani et al.
2022/0357905 A1 11/2022 Dohmae
2022/0358190 A1 11/2022 Baghani et al.
2022/0375145 A1 11/2022 Herath et al.
2022/0382522 A1 12/2022 Heynemann Nascentes Da Silva et al.
2022/0413846 A1 12/2022 Clarke et al.
2022/0414228 A1 12/2022 Difonzo et al.
2023/0004832 A1 1/2023 Sahasi et al.
2023/0004900 A1 1/2023 Gleave
2023/0014233 A1 1/2023 Xiang et al.
2023/0016946 A1 1/2023 Wouhaybi et al.
2023/0030187 A1 2/2023 Shankar et al.
2023/0035600 A1 2/2023 Holzman et al.
2023/0036114 A1 2/2023 Whitehill et al.
2023/0046891 A1 2/2023 Mao et al.
2023/0067222 A1 3/2023 Filji et al.
2023/0075183 A1 3/2023 Copty et al.
2023/0081880 A1 3/2023 Mathur et al.
2023/0083891 A1 3/2023 Achin et al.
2023/0093470 A1 3/2023 Dvornik et al.
2023/0107316 A1 4/2023 Ripa et al.
2023/0108808 A1 4/2023 Lerman
2023/0113369 A1 4/2023 Wang et al.
2023/0121307 A1 4/2023 Benchetrit et al.
2023/0142774 A1 5/2023 Hashemi et al.
2023/0153651 A1 5/2023 Bi et al.
2023/0153724 A1 5/2023 Thampy et al.
2023/0171241 A1 6/2023 Amichay et al.
2023/0186203 A1 6/2023 Kulkarni et al.
2023/0188516 A1 6/2023 Danilov et al.
2023/0195885 A1 6/2023 Khurana et al.
2023/0214461 A1 7/2023 Brooks
2023/0230006 A1 7/2023 Bosch et al.
2023/0245651 A1 8/2023 Wang
2023/0252224 A1 8/2023 Tran
2023/0259390 A1 8/2023 Howley et al.
2023/0259705 A1 8/2023 Tunstall-Pedoe et al.
2023/0259839 A1 8/2023 Manalo et al.

(56) References Cited

U.S. PATENT DOCUMENTS

2023/0281023 A1 9/2023 Bienfait et al.
2023/0281040 A1 9/2023 Cao
2023/0297889 A1 9/2023 Lopez, Jr.
2023/0316382 A1 10/2023 Faricy et al.
2023/0385042 A1 11/2023 Obando Chacon et al.
2023/0385085 A1 11/2023 Singh
2023/0385814 A1 11/2023 Gauthier et al.
2023/0393832 A1 12/2023 Touati et al.
2023/0396641 A1 12/2023 Hebbagodi et al.
2023/0401467 A1 12/2023 Ferrucci et al.
2023/0419161 A1 12/2023 Dines
2024/0046142 A1 2/2024 Marks et al.
2024/0053727 A1 2/2024 Timisescu et al.
2024/0054035 A1 2/2024 Bhargav
2024/0054526 A1 2/2024 Horwitz et al.
2024/0070439 A1 2/2024 Segars et al.
2024/0078724 A1 3/2024 Brehmer et al.
2024/0094861 A1 3/2024 Chou et al.
2024/0112114 A1 4/2024 Decker et al.
2024/0154967 A1 5/2024 Mcguinness et al.
2024/0169519 A1 5/2024 Tjon
2024/0193418 A1 6/2024 Guillame-Bert et al.
2024/0202405 A1 6/2024 Lang et al.
2024/0250977 A1 7/2024 Shulman et al.
2024/0256588 A1 8/2024 Bischof et al.
2024/0265211 A1 8/2024 Mihai et al.
2024/0265408 A1 8/2024 Singh et al.
2024/0281600 A1 8/2024 Brown et al.
2024/0283759 A1 8/2024 Adams
2024/0333705 A1 10/2024 Sanchala et al.
2024/0345807 A1 10/2024 Duggal et al.
2024/0354567 A1 10/2024 Duggal et al.
2024/0361995 A1 10/2024 Somasundaram et al.
2024/0362743 A1 10/2024 Jung et al.
2024/0370479 A1 11/2024 Hudetz et al.
2024/0370708 A1 11/2024 Raghavan et al.
2024/0378515 A1 11/2024 Nakamura et al.
2024/0394945 A1 11/2024 Orozco et al.
2024/0403328 A1 12/2024 Hecht et al.
2024/0419423 A1 12/2024 Chen et al.
2025/0016128 A1 1/2025 Wheeler et al.
2025/0028743 A1 1/2025 Massoudian et al.
2025/0063083 A1 2/2025 Grinberg et al.
2025/0094884 A1 3/2025 Sigwart et al.
2025/0103566 A1 3/2025 Underwood, Jr. et al.
2025/0130705 A1 4/2025 Kimhi et al.
2025/0148115 A1 5/2025 Ghafoor et al.
2025/0173162 A1 5/2025 Mystetskyi et al.
2025/0173450 A1 5/2025 Mystetskyi et al.
2025/0245030 A1 7/2025 Cyjon et al.
2025/0251847 A1 8/2025 Pham
2025/0287077 A1 9/2025 Miglani
2025/0324019 A1 10/2025 Huang et al.
2025/0370777 A1 12/2025 Luo
2026/0017035 A1* 1/2026 Menon ...................... G06F 8/38
2026/0024037 A1 1/2026 Mystetskyi et al.

FOREIGN PATENT DOCUMENTS

CN 107123424 A 9/2017
CN 107422666 A 12/2017
CN 107623596 A 1/2018
CN 107885656 A 4/2018
CN 108717428 A 10/2018
CN 112929172 A 6/2021
DE 102013104892 A1 11/2014
EP 3443466 B1 12/2021
JP H0756821 A 3/1995
KR 1020150100760 A 9/2015
KR 1020220016276 A 2/2022
WO 2004100015 A2 11/2004
WO 2006116580 A2 11/2006
WO 2008109541 A1 9/2008
WO 2014088393 A1 6/2014
WO 2017202159 A1 11/2017
WO 2018023798 A1 2/2018
WO 2018042424 A1 3/2018
WO 2020139865 A1 7/2020
WO 2020187408 A1 9/2020
WO 2020215123 A1 10/2020
WO 2021096944 A1 5/2021
WO 2021144656 A1 7/2021
WO 2021161104 A1 8/2021
WO 2021183312 A1 9/2021
WO 2021220058 A1 11/2021
WO 2022153122 A1 7/2022
WO 2023186048 A1 10/2023
WO 2024101001 A1 5/2024
WO 2025037311 A1 2/2025
WO 2025037312 A1 2/2025
WO 2025037313 A1 2/2025

OTHER PUBLICATIONS

Stancu et al., "SecCollab-Improving Confidentiality for Existing Cloud-Based Collaborative Editors," In: 2017 21st International Conferences on Control Systems and Computer Science, 2017, pp. 324-331.

Stohr, E., "Workflow Automation: Overview and Research Issues," Information Systems Frontiers, 2001, pp. 281-296.

Sun et al., "Geoweaver: Advanced Cyberinfrastructure for Managing Hybrid Geoscientific AI Workflows," International Journal of Geo-Information, Feb. 2020, vol. 9, 20 pages.

Switch Presenter While Using ShowMyPC, ShowMyPC, Aug. 2016, Retrieved from <The Wayback Machine>, 1 page.

Using Filters in Overview, Published Mar. 7, 2017, Retrieved from <https://www.youtube.com/watch?v=hycANhz7gww> 1 page.

Veenendaal, A. "How to Use Generative AI for Document Extraction & Processing." SS&C Blue Prism. (2023): 1-8.

Wilson et al., "Beyond Social Graphs: User Interactions in Online Social Networks and their Implications," ACM Transactions on the Web, Nov. 2012, vol. 6, No. 4, 31 pages.

Yamada et al., "A Software Tag Generation System to Realize Software Traceability," 2010 Asia Pacific Software Engineering Conference, pp. 423-432.

Zhang et al. "Artificial intelligence in recommender systems." Complex & intelligent systems 7.1 (2021): 439-457.

Zhang et al., "Integrating semantic NLP and logic reasoning into a unified system for fully-automated code checking," Automation in Construction, 2017, vol. 73, 2017, pp. 45-57.

Abor Jr., C., "Low-Code and No-Code AI: New AI Development—What is code anymore?!?!" Linkedin, Published Jul. 15, 2023, Retrieved from <https://www.linkedin.com/pulse/ low-code-no-code-ai-new-development-what-code-anymore-c-l-abor-jr>, 15 pages.

Anupam et al., "Personalizing the Web Using Site Descriptions," In: Proceedings of the Tenth International Workshop on Database and Expert Systems Applications, Sep. 1999, 7 pages.

Aylward, Grant, "Drag-and-Drop AI Enables Digital Workforce Deployment at Scale Share," Blue Prism, Mar. 19, 2020, Retrieved from <https://www.blueprism.com/resources/ blog/drag-and-drop-ai-enables-digital-workforce-deployment-at-scale/>, 10 pages.

Baarslag et al., "Negotiation as an Interaction Mechanism for Deciding App Permissions," In: Proceedings of the 2016 CHI Conference Extended Abstracts on Human Factors in Computing Systems, 2016, pp. 2012-2019.

Bahrebar et al., "A Novel Type-2 Fuzzy Logic for Improved Risk Analysis of Proton Exchange Membrane Fuel Cells in Marine Power Systems Application," Energies, Mar. 22, 2018, vol. 11, No. 721, pp. 1-16.

Barai et al., "Image Annotation System Using Visual and Textual Features," In: Proceedings of the 16th International Conference on Distributed Multi-media Systems, 2010, 8 pages.

Basic Walkthrough, Aug. 9, 2019, Retrieved from <https://www.youtube.com/watch?v=VpbgWyPf74g>, 16 pages.

Breitgand et al., "Serverless Data Analytics Platform: D3.1 Intital specs of the Serverless Compute and Execution Engine," CloudButton, Jul. 22, 2019, Retrieved from <https://cloudbutton.eu/docs/deliverables/CloudButton_D3.1_Public.pdf>, 56 pages.

(56) References Cited

OTHER PUBLICATIONS

Chen et al., "Artificial Intelligence in Education: A Review," IEEEAccess, Apr. 2020, vol. 8, pp. 75264-75278.
Demonstracion en espanol de Monday.com, Published Feb. 20, 2019, Retrieved from <https://www.youtube.com/watch?v=zOqydTgof1A>, 53 pages.
Desmedt et al., "Function-Based Access Control (FBAC) From Access Control Matrix to Access Control Tensor," In: Proceedings of the 8th ACM CCS International Workshop on Managing Insider Security Threats, 2016, 12 pages.
Donath, Judith, "Interfaces Make Meaning," Chapter 3 from the Social Machine: Designs for Living Online, 2014, pp. 41-76.
Dorn et al., "Efficient Full-Field Vibration Measurements and Operational Modal Analysis Using Neuromorphic Event-Based Imaging," Journal of Engineering Mechanics, Jul. 1, 2018, vol. 144, No. 7, 25 pages.
Features, daPulse, Nov. 2021, Retrieved from <web.archive.org/web/20140918184 21/https://dapulse.com/features>, 22 pages.
Freund, Karl, "SiMa.ai Creates Drag-And-Drop Platform for Building AI Workflows," Forbes, Sep. 12, 2023, Retrieved from <https://www.forbes.com/sites/karlfreund/2023/09/12/simaai-creates-drag-and-drop-platform-for-building-ai-workflows/?sh=789de8466046>, 6 pages.
Genfer et al. "Visualizing metric trends for software portfolio quality management." 2021 Working Conference on Software Visualization (VISSOFT). IEEE, 2021, 12 pages.
Gutwin et al., "Supporting Informal Collaboration in Shared-Workspace Groupware," Journal of Universal Computer Science, 2008, vol. 14, No. 9, pp. 1411-1434.
High Level Overview, daPulse, 2016, Retrieved from <https://web.archive.org/web/20161104170936/https://dapulse.com>, 12 pages.
Hupfer et al., "Introducing collaboration into an application development environment," In: Proceedings of the 2004 ACM Conference on Computer Supported Cooperative Work, Nov. 2004, vol. 6, No. 3, pp. 21-24.
International Search Report and Written Opinion in PCT/IB2020/000024, mailed Jun. 9, 2020, 10 pages.
International Search Report and Written Opinion in PCT/IB2020/000658, mailed Nov. 11, 2020, 8 pages.
International Search Report and Written Opinion in PCT/IB2020/000974, mailed May 3, 2021, 15 pages.
International Search Report and Written Opinion in PCT/IB2021/000090, mailed Jul. 27, 2021, 12 pages.
International Search Report and Written Opinion in PCT/IB2021/000297, mailed Oct. 12, 2021, 17 pages.
International Search Report and Written Opinion in PCT/IB2023/061991, mailed Feb. 26, 2024, 6 pages.
International Search Report and Written Opinion in PCT/IB2023/061992, mailed Mar. 19, 2024, 7 pages.
International Search Report and Written Opinion in PCT/IB2023/061994, mailed Apr. 25, 2024, 11 pages.
International Search Report and Written Opinion in PCT/IL2024/050820, mailed Dec. 18, 2024, 11 pages.
International Search Report and Written Opinion in PCT/IL2024/050821, mailed Dec. 19, 2024, 16 pages.
International Search Report and Written Opinion in PCT/IL2024/050822, mailed Dec. 30, 2024, 9 pages.
Interntional Search Report and Written Opinion in PCT/IB2024/055803, mailed Sep. 30, 2024, 13 pages.
Ionescu et al., "A chat-centric collaborative environment for web-based real-time collaboration," 2015 IEEE 10th Jubilee International Symposium on Applied Computational Intelligence and Informatics, May 21-23, 2015, pp. 105-110.
Janbi et al. "Distributed artificial intelligence-as-a-service (DAIaaS) for smarter IoE and 6G environments." Sensors 20.20 (2020): 5796.
Kantorovitz, Isaiah, "Lexical Analysis Tool," May 2004, Retrieved from <https://dl.acm.org/doi/pdf/10.1145/997140.997147>, vol. 39, No. 5, pp. 66-74.
Kavaz et al. "Chatbot-based natural language interfaces for data visualisation: A scoping review." Applied Sciences 13.12 (2023): 7025, 34 pages.
Kollmann, Franz, "Realizing Fine-Granular Read and Write Rights on Tree Structured Documents," in: The Second International Conference on Availability, Reliability and Security, 2007, 7 pages.
Larson, Stephen, "Introducing Data Mining Concepts Using Microsoft Excel's Table Analysis Tools," Oct. 2015, Retrieved from <https://dl.acm.org/doi/pdf/10.5555/2831373.2831394>, pp. 127-129.
Lins et al., "Artificial Intelligence as a Service," Business & Information Systems Engineering, vol. 63, 2021, pp. 441-456.
List et al., "An Evaluation of Conceptual Business Process Modelling Languages," In: Proceedings of the 2006 ACM symposium on Applied Computing, Apr. 2006, pp. 1532-1539.
Monday.com Walkthrough 2018/All Features, Platforms & Thoughts, Transcription Provided, Mar. 1, 2018, pp. 1-55.
Ni et al., "Asynchronous Event-Based Visual Shape Tracking for Stable Haptic Feedback in Microrobotics," IEEE Transactions on Robotics, vol. 28, No. 5, Oct. 1, 2012, pp. 1081-1089.
Notice of Allowance in U.S. Appl. No. 19/179,061, mailed Sep. 22, 2025, 12 pages.
Notice of Allowance in U.S. Appl. No. 19/179,092, mailed Jun. 30, 2025, 9 pages.
Oey et al. "Developing integrated performance dashboards with Power BI—a case study in a medium-size Manufacturer." 2021 International Conference on Information Management and Technology (ICIMTech). vol. 1. IEEE, (2021): 265-270.
Office Action in U.S. Appl. No. 19/179,061, mailed May 19, 2025, 9 pages.
Pedersen et al., "Tivoli: an electronic whiteboard for informal workgroup meetings," Conference on Human Factors in Computing Systems: Proceedings of the INTERACT '93 and CHI '93 conference on Human factors in computing systems, Apr. 24-29, 1993, pp. 391-398.
Peltier, J., "Clustered and Stacked Column and Bar Charts," Peltier Technical Services, Inc., Aug. 2011, 128 pages.
Pivot table, Wikipedia, Jul. 2021, Retrieved from <https://en.wikepedia .org/w/index.php?title=Pivottable&oldid=857163289>, 5 pages.
Rodrigo, A., "Project Management with Monday.com: A 101 Introduction," Envato Tuts+, Jul. 22, 2019, Retrieved from <https://business.tutsplus.com/tutorials/project-management-with-mondaycom--cms-33586>, 11 pages.
Singh et al., "A Theoretical Framework of a BIM-based Multi-Disciplinary Collaboration Platform," Automation in Construction, Nov. 2011, vol. 20, pp. 134-144.
Alam et al. "A cross tenant access control (CTAC) model for cloud computing: formal specification and verification." IEEE Transactions on Information Forensics and Security 12.6 (2016): 1259-1268.
Zhao et al. "The Model of Cross-Tenant Information Access Control in SAAS Cloud." 2022 International Conference on Computing, Communication, Perception and Quantum Technology (CCPQT). IEEE (2022): 174-180.
Zou et al. "A fine-grained multi-tenant permission management framework for SDN and NFV." IEEE Access 6 (2018): 25562-25572.

* cited by examiner

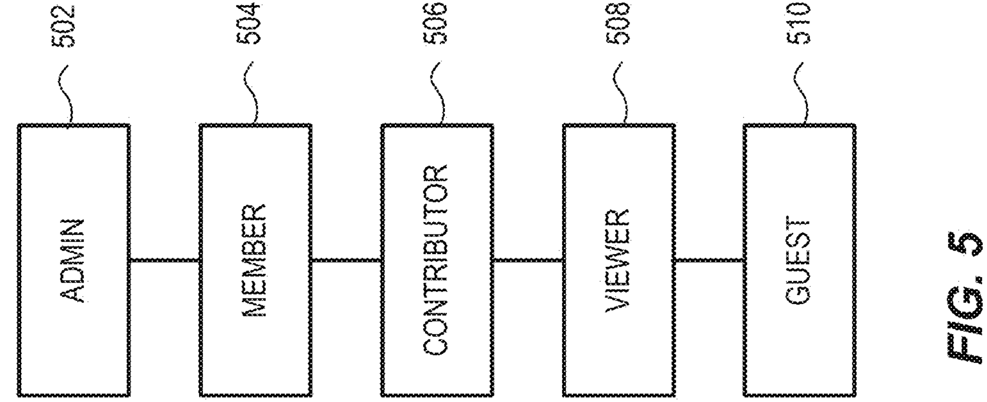
FIG. 5
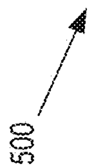

SYSTEM AND METHOD FOR GRANULAR PERMISSIONS AUDITING

PRIORITY CLAIM

This application also claims the benefit of priority of U.S. Provisional Patent Application No. 63/837,205, filed on Jul. 2, 2025, which is incorporated herein by reference in its entirety.

TECHNICAL FIELD

The present disclosure generally relates to multi-user collaborative software environments, such as Software-as-a-Service (SaaS) platforms, and more specifically to systems for managing, displaying, and auditing user permissions within such environments.

BACKGROUND

Collaborative software platforms have become an integral part of modern business operations, enabling multiple users to interact, share information, and perform tasks simultaneously within a unified environment. As organizations increasingly rely on such platforms to manage sensitive data and streamline workflows, the need for robust, flexible, and transparent permission management systems has grown significantly. Traditional permission models often lack the flexibility to accommodate complex organizational structures and diverse user roles, leading to potential security vulnerabilities and operational inefficiencies.

Furthermore, auditing user permissions and understanding the specific restrictions or privileges associated with individual actions may be challenging task for administrators and end-users. To address such challenges and improve existing solutions, it may be valuable to provide companies with tools that allow them to manage permissions at multiple levels and permit visualizing and auditing access rights within collaborative environments. The present disclosure presents solutions aimed at overcoming the aforementioned challenges and addressing other limitations of existing solutions in this context.

SUMMARY

Some disclosed embodiments may include a system for providing an interactive graphical user interface (GUI) to enable presentation of multi-layered permissions in a collaborative software platform. The system includes at least one processor configured to receive a signal to access permission data associated with performance of at least one action by a user of the collaborative software platform. The at least one processor is further configured to access a multi-layered permission hierarchy associated with the user and the at least one action, wherein the multi-layered permission hierarchy is linked to a centralized authorization manager of the software platform. The at least one processor is also configured to traverse the multi-layered permission hierarchy to identify a plurality of permission levels in the multi-layered permission hierarchy associated with the performance of at least one action by the user. The at least one processor is further configured to collect the permission data from the identified permission levels associated with the performance of at least one action by the user in the multi-layered permission hierarchy. The at least one processor is also configured to use the permission data to identify at least one restriction associated with performance of the at least one action. In a first mode of operation, the at least one processor is configured to visually indicate which of the at least one action is associated with the at least one restriction thereby being restricted for performance by the user, and which of the at least one action is unassociated with the at least one restriction thereby being permitted for performance by the user. In a second mode of operation, for a particular action of the at least one action, the at least one processor is configured to visually indicate which of the identified permission levels permit the user to perform the particular action, and which of the identified permission levels restrict the user from performing the particular action.

The foregoing general description of the illustrative embodiments and the following detailed description thereof are merely exemplary aspects of the teachings of this disclosure and are not restrictive.

BRIEF DESCRIPTION OF THE FIGURES

The accompanying drawings, which are incorporated in and constitute a part of this disclosure, illustrate various disclosed embodiments. In the drawings:

FIG. 5 is another exemplary schematic diagram of a multi-layered permissions hierarchy for a collaborative software platform, consistent with some disclosed embodiments.

DETAILED DESCRIPTION

Figure 1:
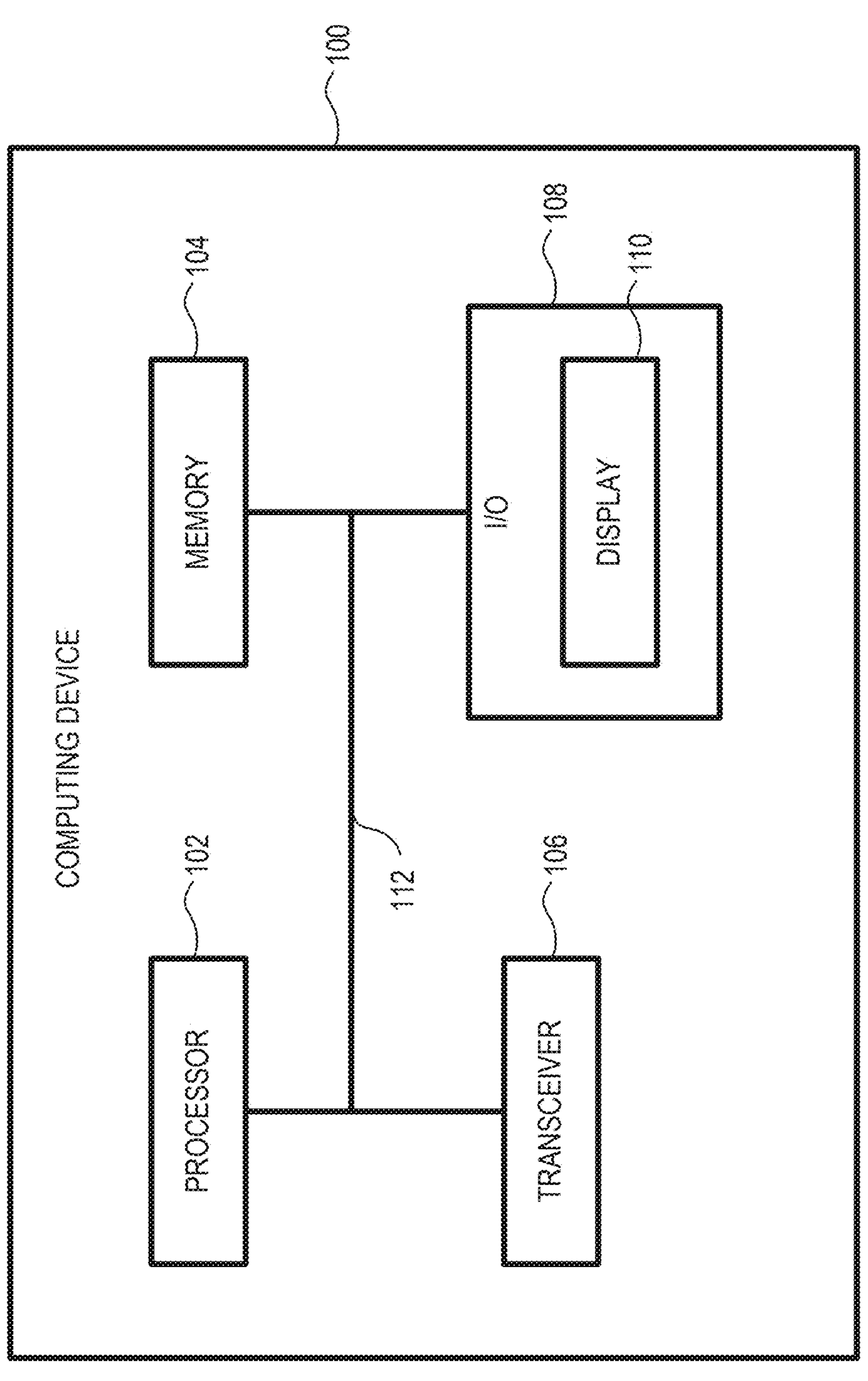
FIG. 1 is an exemplary schematic diagram of a computing device, consistent with some disclosed embodiments.

The following detailed description includes references to the accompanying drawings. Wherever possible, the same reference numbers are used in the drawings and the description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Various terms used in the specification and claims may be defined or summarized differently when discussed in connection with differing disclosed embodiments. It is to be understood that the definitions, summaries, and explanations of terminology in each instance apply to all instances, even when not repeated, unless the transitive definition, explanation, or summary would result in inoperability of an embodiment. It is also to be understood that once a term is defined herein, in the absence of an inherent inconsistency, that definition applies to all other uses of the term herein. Moreover, the exemplary embodiments of the figures and their description are not to be considered definitions of claim terms, but rather are non-limiting examples used to illustrate specific embodiments.

Throughout, this disclosure mentions "embodiments" and "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may," and other open-ended terminology, is intended to indicate that although not every embodiment may employ the specific disclosed feature, at least one embodiment employs the specific disclosed feature.

Some embodiments may involve a computing device. A computing device as used herein may include any type of device capable of executing instructions using at least one processor. Such a computing device may include a smartphone, a tablet, a smartwatch, a personal digital assistant, a desktop computer, a laptop computer, an IoT device, a dedicated terminal, a wearable computing device, a client device, a server, and/or any other electronic device that enables computation. A computing device may include at least one processor, at least one memory, a transceiver, and an input/output unit, all interconnected via one more buses.

The at least one processor may include any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all, or part of a central processing unit (CPU), graphics processing unit (GPU), digital signal processor (DSP), field-programmable gate array (FPGA), server, virtual server, or other circuits suitable for executing instructions or performing logic operations. In some embodiments, the at least one processor may include a remote processing unit (e.g., a "cloud computing" resource) accessible via a communications network.

The at least one memory may include a Random Access Memory (RAM), a Read-Only Memory (ROM), a hard disk, an optical disk, a magnetic medium, a flash memory, other permanent, fixed, or volatile memory, or any other mechanism capable of storing instructions. Such a memory may be pre-loaded with instructions for execution by at least one processor. In some embodiments, the at least one memory may include a remote storage (e.g., "cloud" storage) accessible via a communications network.

In some embodiments, a computing device may include a communications device capable of exchanging data using a wired and/or wireless communications network. Such a communications network may include one or more of a digital communications network, an analog communication network, and/or any other communications network configured to convey data. Some examples of communications networks may include the Internet, a private data network, a virtual private network using a public network, a Wi-Fi network, a LAN, or WAN network, and/or any combination thereof. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Differing embodiments of this disclosure may involve systems, methods, and/or computer readable media containing instructions. A system refers to at least two interconnected or interrelated components or parts that work together to achieve a common objective, function, or subfunction. A method refers to at least two steps, actions, or techniques to be followed in order to complete a task or a sub-task, to reach an objective, or to arrive at a next step. Computer-readable media containing instructions refers to any storage mechanism that contains program code instructions, for example to be executed by a computer processor. Examples of computer-readable media are further described elsewhere in this disclosure. Instructions may be written in any type of computer programming language, such as an interpretive language (e.g., scripting languages such as HTML and JavaScript), a procedural or functional language (e.g., C or Pascal that may be compiled for converting to executable code), an object-oriented programming language (e.g., Java or Python), a logical programming language (e.g., Prolog or Answer Set Programming), and/or any other programming language. Instructions executed by at least one processor may include implementing one or more program code instructions in hardware, in software (including in one or more signal processing and/or application specific integrated circuits), in firmware, or in any combination thereof, as described earlier. Causing a processor to perform operations may involve causing the processor to calculate, execute, or otherwise implement one or more arithmetic, mathematic, logic, reasoning, or inference steps.

In some embodiments, one or more neural networks may be configured to analyze inputs and generate corresponding outputs. Some non-limiting examples of such neural networks may include shallow artificial neural networks, deep artificial neural networks, feedback artificial neural networks, feed-forward artificial neural networks, autoencoder artificial neural networks, probabilistic artificial neural networks, time-delay artificial neural networks, convolutional artificial neural networks, recurrent artificial neural networks, long/short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Some disclosed embodiments involve applying AI functionality to perform one or more procedures disclosed herein. AI functionality may refer to any kind of capability or feature exhibited by an artificial intelligence system. It involves the ability of AI systems to perform tasks that usually require human intelligence. Examples of those tasks may include comprehension of natural language, recognition of patterns or structures in a data set, or the generation of predictions/forecasts. AI functionality incorporates different techniques and technologies such as Natural Language Processing (NLP), Natural Language Generation (NLG), Machine Learning (ML), Neural Network (NN), Deep Learning (DL), Large Language Model (LLM), or Computer Vision. AI functionalities empower applications to analyze, interpret, and generate data, automate processes, optimize performance, and offer intelligent solutions for intricate problems.

Different categories of AI functionality exist, and the exact definitions of these categories remain an open question as categories of Artificial intelligence are not mutually exclusive. AI systems may possess multiple functionalities simultaneously, and their capabilities may span across different areas of AI. For instance, an AI system may have both generative AI functionality to produce new content, such as text or images, and analytical AI functionality to analyze existing data, detect patterns, make decisions, or identify anomalies. These functionalities may be intertwined within a single AI system, allowing it to generate new content while also performing analysis on that content or other data. The field of AI is highly interconnected, and advancements in one area may influence and enhance capabilities in other areas. As AI technologies continue to evolve, the lines between different functionalities may become even more blurred, leading to increasingly integrated and versatile AI systems that combine various capabilities. Therefore, when discussing AI functionalities, it is important to recognize their potential overlap and interplay, as AI systems may exhibit a wide range of capabilities that are not limited to a single category or functionality.

AI assistants may be powered by AI agents, also referred to as AI engines or AI core technology, i.e., components responsible for understanding user inputs, generating appropriate responses, and performing tasks on behalf of the user. An AI agent utilizes artificial intelligence technologies, such as NLP, ML, decision-making algorithms or any of the above-listed AI technologies, to interpret user queries, process information, and provide relevant and context-aware assistance. AI agents within AI assistants may incorporate various components, including perception to understanding user inputs (e.g., speech recognition or text parsing), reasoning and decision-making to generate appropriate responses, and action to execute tasks or interact with external systems. It may also involve learning capabilities to improve performance over time through user interactions and feedback. The AI agent acts as the intelligent core of the AI assistant, enabling it to understand user intent, provide accurate and helpful responses, and perform tasks or services on behalf of the user. It drives the conversational and interactive capabilities of the AI assistant, making it capable of simulating human-like interactions and assisting users with their requests. Non-limiting examples of AI assistants include Apple Siri™, Amazon Alexa™, Microsoft Cortana™, IBM Watson™ OpenAI ChatGPT-4™ and Bard™ Google's Assistant. The specific name or brand of the AI agent behind an AI assistant may vary depending on the developer or company that created it, some may not be publicly disclosed, like Siri's AI agent for example, while others are known, like Google's AI agent that powers Bard™, called Language Model for Dialogue Application (LaMDA). Communication and data exchange between a SaaS platform and an AI agent may be performed in various ways. For example, an AI communication module may be included in the SaaS platform to establish a connection between the SaaS platform and one or more AI agents.

AI agents may specialize in different types of operations or data processing based on their training, the AI technologies employed and their design. Accordingly, AI agents may be programmed and trained to specialize in specific domains, tasks, or industries. For example, different AI agents may specialize in the generation of different types of content such as text, images, and/or code. In another example, different AI agents may be labelled by a specific type of data used in their training set, for example, a first AI agent may be specialized and trained in code generation, a second AI agent may be specialized in predicting compatibility between different software modules, and a third AI agent may specialize in automatically generating a software product based on a requirement specification. Despite the existence of these specialized AI agents, more general and versatile AI agents may handle different types of operations or data. These agents possess broader capabilities and may perform a variety of tasks across different domains. For example, an AI agent may be able to generate both text and visual presentations. It could be trained and programmed to understand natural language and then generate written content. Additionally, it could utilize its visual processing capabilities to create visual presentations or even generate images based on a given input.

Disclosed embodiments may include and/or access a data structure or data. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, servers that may be owned or operated by the same or different entities. Thus, the term "data structure" as used herein in the singular is inclusive of plural data structures.

Structured data may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. As used herein, the term "data structure" may include a data pool or may be included in a data pool. A data pool may include a data structure, a data set, a database, a data lake, a data pool, or any other form of information storage whether distributed or undistributed and whether structured or unstructured. It is further to be understood that the term "data structure" as used herein in the singular is inclusive of plural data structures. A data structure may also include any hardware, software, firmware, or combination thereof for storing and facilitating the retrieval of information.

By way of a non-limiting example, reference is made to FIG. 1 illustrating an exemplary schematic diagram of a computing device 100, consistent with some disclosed embodiments. Computing device 100 may include at least one processor 102, at least one memory 104 (e.g., a non-transitory computer readable medium), a transceiver 106, and an input/output (I/O) unit 108. At least one processor 102, at least one memory 104, transceiver 106, and input/output unit 108 may be interconnected via a bus 112. In some embodiments, input/output unit 108 may include a display 110. Display 110 may include one or more touch sensitive surfaces, permitting computing device 100 to receive inputs from a user, and present outputs to a user. Computing device 100 may be configured to perform one or more of the operations disclosed herein.

Figure 2:
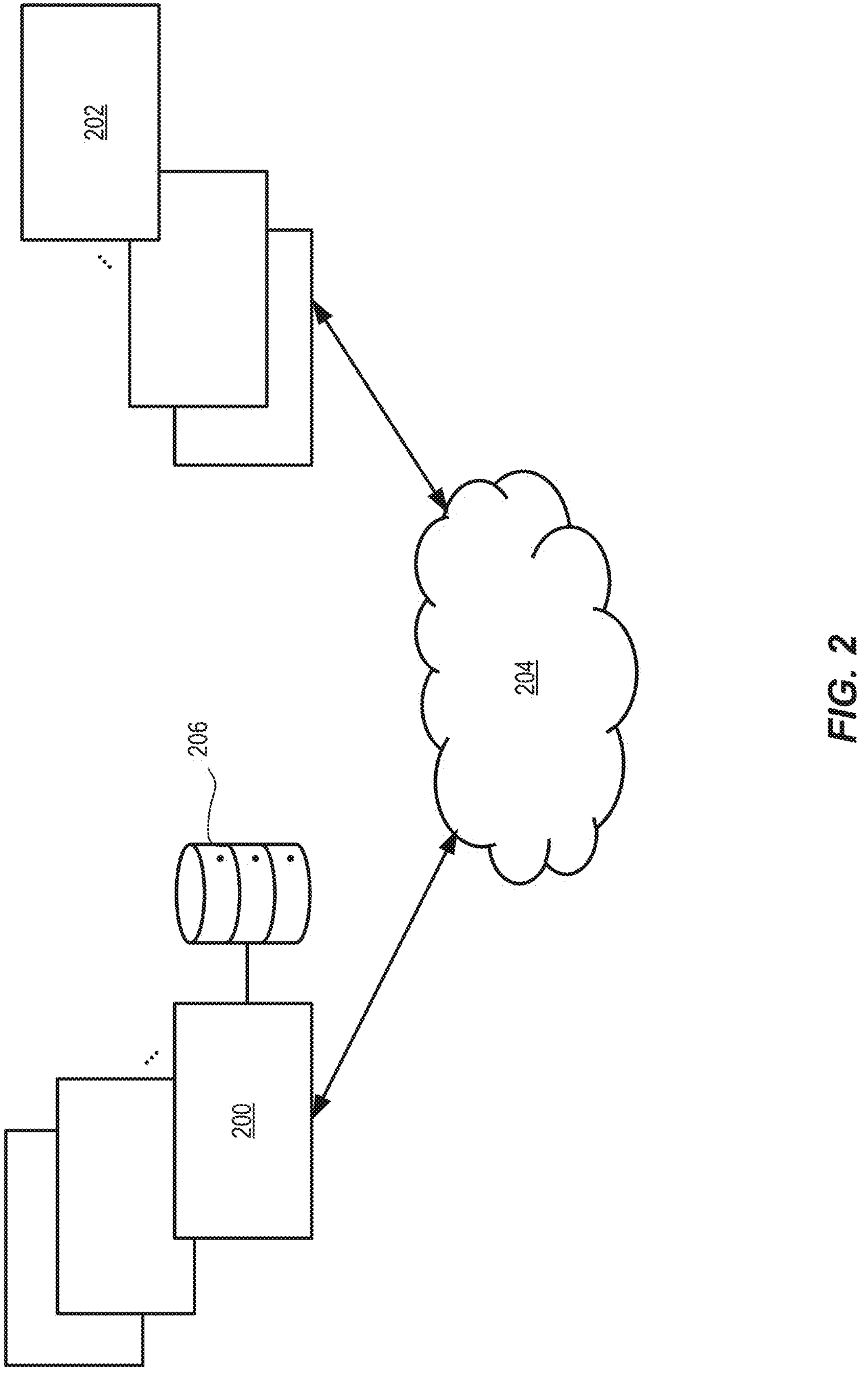
FIG. 2 is an exemplary schematic diagram of a plurality of first computing devices in communication with a plurality of second computing devices over a communications network, consistent with some disclosed embodiments.

By way of another non-limiting example, reference is made to FIG. 2 illustrating an exemplary schematic diagram of a plurality of first computing devices 200 in communication with a plurality of second computing devices 202 over a communications network 204, consistent with some disclosed embodiments. First and second computing devices 200 and 202 may correspond to different instances of computing device 100 and may exchange data via network 204. In some embodiments, at least some of the data exchanged via network 204 may be stored in at least one data structure 206 (e.g., a data structure). In some embodiments, one or more of first computing devices 200 may be server devices and second computing devices 202 may be client devices. In some embodiments, one or more of first computing device 200 may provide cloud services in conjunction with data structure 206. Computing devices 200 and 202 may be configured to perform one or more of the operations disclosed herein, e.g., in a distributed manner via network 204.

In collaborative software platforms, user permissions are often determined by a complex, multi-layered hierarchy of settings (e.g., Account, Product, Workspace, and Board). Consequently, this complexity may hinder end-users and/or administrators in managing permissions to perform necessary tasks that may be restricted at differing levels in the hierarchy. This may lead to frustration, friction, and a poor user experience as users encounter unexpected restrictions without understanding why they are blocked or how to resolve the issue. Managing complex, multi-layered permissions may also lead to significant investment in administrative time and effort troubleshooting permission issues. Systems that lack a robust audit trail linking user actions to a specific permission grant may hinder assessment of over-privileged access, detection of permission misuse, and/or justifying why access was granted in the first place, potentially introducing gaps in security and compliance Some disclosed embodiments involve providing an interactive graphical user interface (GUI) to enable presentation of multi-layered permissions in a collaborative software platform. Providing refers to making available, supplying, and/or offering a service, feature, or functionality for use. Providing may include sending, transmitting, deploying, and/or delivering data (e.g., over a network). Providing may additionally include querying and/or retrieving data from a data structure and/or from an AI (artificial intelligence) engine. An interactive graphical user interface (GUI) refers to a visual mechanism for enabling human interactions with a computer or electronic device and/or software system using graphical elements, such as, for example, icons, buttons, menus, and windows. A GUI may allow users to interact with electronic devices through visual indicators and/or graphical icons rather than text-based interfaces and/or command-line syntax, and may enable user inputs using one or more input devices (e.g., a touch-sensitive display, an electronic mouse, a keyboard, and/or stylus) enabling users to manipulate and control the software's functions and features. For instance, a GUI may display icons visually representing different actions, statuses, and/or resources, selectable buttons to trigger actions, drop-down menus presenting lists of options for selection, windows and/or dialog boxes for presenting information and/or prompting user inputs. A GUI may additionally present drag-and-drop components permitting users to move and/or rearrange items within a workspace, text boxes for entering and/or viewing information, interactive tables organizing data in columns and rows, visual indications using color coding, font style, and/or shading, navigation to access different areas within the collaborative platform, and/or pop-up windows displaying notifications. In some instances, a GUI may provide chatbox and/or microphone input permitting users to interact with one or more AI agents using natural language via text or voice.

To enable presentation refers to facilitating a display, visualization, and/or communication of information in a manner that is accessible and comprehensible to users. This may involve organizing, formatting, and/or structuring data to improve clarity, accessibility, and/or usability within a graphical user interface. For instance, a GUI may present a permission hierarchy as a graphical tree structure enabling users to visualize differing layers in the hierarchy. Multi-layered permissions refers to a hierarchical and/or nested structure of access controls and/or authorization levels within a software system. Multi-layered permissions may include differing tiers, classifications, and/or categories of user rights governing what actions a user may perform and/or what resources may be accessed. Higher levels in a hierarchy may override and/or encompass lower levels in the hierarchy. Lower levels in the hierarchy may depend on higher levels, such that changing a setting in a higher hierarchical level may have a cascading effect on lower levels. For instance, changes to user rights in higher level of a multi-layered permission hierarchy may potentially influence and/or override user rights in lower levels. A software platform refers to an environment, foundation, and/or ecosystem for building, running, and/or managing software applications. A software platform may provide one or more core functionalities and/or services allowing users to create and/or run software applications (e.g., apps). Such functionalities may include an operating system, a suite of Application Programming Interfaces (APIs), authentication and/or security protocols, and/or any other type of functionality. In some embodiments, a software platform may include a SaaS platform. A collaborative software platform refers to a digital environment or system designed to facilitate cooperation, communication, and shared work among multiple users. Such platforms may include features for document sharing, real-time editing, task management, or project coordination, often accessible via web browsers or dedicated applications. Providing an interactive graphical user interface to enable presentation of multi-layered permissions in a collaborative software platform may include producing and/or presenting a visual, user-friendly interactive system permitting users to view, understand, and potentially manage complex permission structures within a shared digital workspace. Such an interface may allow users to navigate through different levels of permissions, visualize how various authorization layers may interact, and assess access rights across different aspects of the collaborative environment.

In some disclosed embodiments, the collaborative software platform is a SaaS platform. A Software as a Service (SaaS) platform refers to a network- or cloud-based software delivery model where service providers may host software applications and make them accessible to users over the Internet. Instead of installing, managing, and maintaining the software locally, users access and utilize it through a web browser or thin client interface. SaaS platforms offer a wide range of applications and services to meet various business needs such as customer relationship management (CRM), human resources management (HRM), project management, accounting, marketing automation, and more. In most scenarios, these platforms operate on a subscription basis, with customers paying recurring fees for software access and usage. Some non-limiting examples of SaaS platforms include Monday.com™ for project management, Salesforce™ for CRM, Slack™ for team collaboration, Dropbox™ for file hosting and sharing, Microsoft 365™ for productivity tools, Google Workspace™ apps for productivity and collaboration tools, Zendesk™ for customer support, HubSpot™ for marketing, and Shopify™ for e-commerce. SaaS may include a plurality of SaaS Platform elements which may correspond to key components of the platform that work together to deliver software applications and services over the Internet. A SaaS platform may provide centralized management of user accounts, roles, and/or permissions across an entire organization, and may implement real-time updates to permission structures across all users and projects. When a user's role changes or a new permission level is introduced, these updates may be immediately reflected in the interactive GUI for all affected users, regardless of their location or device. Additionally, the SaaS model may facilitate integration of AI-powered permission management and/or cross-organization collaboration, as these can be rolled out centrally by the vendor without requiring individual customer updates.

Some disclosed embodiments involve receiving a signal to access permission data associated with performance of at least one action by a user of the collaborative software platform. A signal refers to any detectable transmission of information, typically in the form of an electrical, electromagnetic, or digital impulse. For example, a signal may be a user input, a system event, or a data packet transmitted between components of a software system. Receiving a signal refers to obtaining, acquiring, and/or otherwise gaining access to information (e.g., via a wired and/or wireless channel). It may include obtaining, accepting, capturing, and/or acquiring data, information, and/or input from an external source or system component, detecting sensor readings, and/or obtaining data transmitted over a network. Receiving may involve connecting to a network, detecting an incoming signal at a receiver (e.g., an input port and/or antenna), and/or formatting and/or decrypting data content for storage in memory. It may include detecting and/or capturing a user input via an input device (e.g., a touch sensitive screen, electronic mouse, keyboard, stylus, microphone). To access refers to retrieve, read, or obtain information from a storage location and/or data structure, and/or interact with a resource. For example, accessing may involve querying a database, reading from memory, or retrieving data from a file system. Permission data refers to information defining and/or describing rights, privileges, and/or authorizations granted to a user, role, and/or entity within a software system. For example, permission data may include access control lists, role-based permissions, and/or user-specific authorization flags. Permission data may include, for example, role-based permissions specifying permitted actions and/or resources based on an assigned role (e.g., administrator, editor, owner, contributor, viewer), group membership permissions granted based on inclusion in specific groups and/or teams, individual user permissions which may override role-based and/or group-level permissions, resource-specific permissions related to particular documents, projects, and/or regions within a platform, global platform permissions governing what users may do across the entire platform, time-limited and/or temporary permission granted for a specific period or under certain conditions, and inherited permissions passed down through hierarchical structures, such as from a parent workspace to boards or folders contained therein.

Associated with refers to a relationship, dependency, correlation, and/or connection between two or more elements, concepts, or entities. Performance refers to the execution, carrying out, and/or completion of a task, action, or operation. For example, performance may include generating, reading, editing, and/or deleting data, executing a function, and/or accessing a software and/or hardware resource. An action refers to any operation, task, and/or function that may be executed or initiated within a software system. For example, actions may include viewing, editing, and/or deleting data, modifying records, installing, updating, and/or removing software, accessing resources, establishing a network connection, generating reports, and/or initiating one or more procedures. A user of a collaborative software platform refers to an individual and/or entity associated with an account and/or access credentials permitting to interact with and/or utilize one or more features and/or resources provided by the collaborative software platform. A user may include an end-user and/or administrator. In some embodiments, a user may include an automated agent, such as an AI agent. Permission data associated with performance of at least one action by a user may include information that defines and/or describes one or more rights and privileges granted to a specific user for executing one or more operations within a collaborative software platform. Such permission data may govern which actions a user may perform and under what circumstances. For instance, permission data may define whether a user may generate, view, edit, and/or delete specific content and under what circumstances, if a user may access particular features, applications, and/or resources, and/or connect and/or interact with other users, resources, and/or systems.

For instance, at least one processor may receive a signal associated with a keyboard stroke indicative of an attempt by a user to edit a shared document, or a signal associated with a mouse click to access a restricted project area. Alternatively, at least one processor may receive a signal associated with a touch sensitive screen indicative of a request by a user and/or administrator to view one or more permissions to assess which actions the user may perform. In response to the signal, at least one processor may access permission data including information about a user role, group memberships, and/or specific granted permissions stored in a centralized and/or distributed data structure.

In some disclosed embodiments, the signal is received in a context of a software application implemented on the collaborative platform. A context refers to the specific circumstances, environment, and/or situation in which an event occurs or an action is performed. A context may include a current state of an application, including active user sessions, open documents, or ongoing processes. To implement refers to operate, execute, and/or instantiate. A software application refers to a program or group of programs designed for end-users to perform specific tasks or functions. Some examples of software applications may include a word processor, an email client, a spreadsheet, and a photo editor. A software platform may provide an environment, including foundational services, tools, APIs, protocols, and/or libraries, for hosting one or more software applications. A software application implemented on a collaborative platform refers to operationalization, execution, integration, and/or deployment of a software application within an ecosystem of the collaborative software platform. A software platform may provide one or more core functionalities and/or services allowing users to create and/or run software applications (e.g., apps). Such functionalities may include an operating system, a suite of Application Programming Interfaces (APIs), authentication, permission, and/or security protocols, and/or any other type of functionality. The software application may be installed, configured, deployed, integrated, and/or activated within the collaborative platform, and may utilized resources of the software platform, such as a permission management system. Some examples of software applications implemented on a collaborative platform may include project management boards, workflow automation tools, time tracking modules, and collaborative document editors. Some additional examples may include integrations with third-party applications such as calendar tools, Customer Relationship Management (CRM) systems, and messaging, conferencing, and communication platforms. In response to receiving a signal in the context of a software application implemented on the collaborative platform, at least one processor may apply a user's overall permissions within the platform and additionally, specific rights and restrictions for the particular software application.

For example, in response an attempt by a user to perform an action within a project management application hosted on the collaborative platform, at least one processor use contextual information such as the specific project, task, or document that the user is interacting with to evaluate permissions not just based on the user's global role on the platform, but also within the specific application. At least one processor may display permission information and call-to-actions (CTAs described herein below) via an interactive GUI that are relevant to the user's current activity, improving usability and reducing confusion about why certain actions may be restricted in specific contexts. A user may be permitted to perform certain actions within one software application on the platform and restricted from performing similar actions on a different software application implemented on the platform.

In some disclosed embodiments, the software application includes a board presenting data accessible via the collaborative software platform. A board refers to a visual workspace for organizing, displaying, and/or interacting with information, tasks, and/or projects. A board may include a table having customizable columns and rows, allowing teams of users to track progress, assign responsibilities, and manage workflows in real time through an interactive interface. Presenting refers displaying, showing, and/or making information visible and accessible to users through a graphical user interface. For example, presenting data may include rendering charts, tables, or interactive elements on a screen. Data accessible via the collaborative software platform refers to information, content, and/or resources that users may view, interact with, and/or manipulate within an ecosystem of the collaborative platform, subject to associated permissions and access rights. Such data may be stored in a data structure and accessed by one or more client devices over a network concurrently to conduct collaborative teamwork. A board may serve as a focal point for interactions by multiple different users via multiple different client devices, each user associated with differing permissions and restrictions that may need to be managed to enable collaboration.

For example, a project management board may display tasks, deadlines, and team member assignments. When users interact with the board, at least one processor may visually indicate which elements each user may view, edit, or reassign based on the permissions for each user. For instance, for some users, at least one processor may display actions in gray or marked with lock icons indicating disabled or restricted status, for other users, display the same actions in black indicating they are fully interactive and non-restricted. At least one processor may display permission-related CTAs directly on the board, such as by displaying a "Request Access" button when a user attempts to move a task for which they lack permission to modify. Integrating permission visualization and management within the context of the board may permit users to assess their access rights and streamlines the process of resolving permission-related issues without leaving a current workflow.

In some disclosed embodiments, at least one processor is configured to identify an additional software application on the collaborative platform associated with the at least one action, and communicate with the additional software application, detect an association between the software application and the additional software application, retrieve data associated with the additional software application, and visually indicate the additional software application. An additional software application refers to a separate program, module, or set of functionalities within the collaborative platform that is distinct from but potentially related to the primary software application being used. An additional software application may include a third party software application operating independent of a software platform. A software application hosted on a platform may depend on an additional (e.g., third party) software application or the revers (e.g., the software may require data and/or processing by an additional software application to operate). For example, an additional software application may include a calendar tool, a document editor, or a project management system that complements the main application's features. Some additional examples of additional software applications may include an integration registry, an event bus subscription, and/or an external application associated with an application hosted on a software platform using one or more shared identifiers and/or keys (e.g., using foreign key mapping, and/or common object identifiers), webhooks, integration connectors, and/or any other type of mechanism for integrating two or more software applications. In some embodiments, access to data and/or resources across multiple applications may be subject to additional permissions associated with accessing data and/or resources stored external to a software platform hosting one of the applications.

To identify an additional software application associated with an action refers to discover and/or detect another software application running on the collaborative software platform that is affected and/or influenced by the action. For instance, an action on a first software application (e.g., display a weather forecast) may prompt another action on a second software application (e.g., access a weather database). To communicate with the additional software application refers to exchange information with the additional software application. Such information may be associated with the at least one actions, one or more permissions, and/or any other type of information. Communicating with an additional software application may involve calling one or more APIs and/or establishing network connections with one or more external servers. To detect refers to sensing, perceiving, discovering, recognizing, and/or identifying. Detecting may include identifying, recognizing, and/or discovering something by monitoring for patterns, signals, and/or anomalies that indicate certain events and/or conditions. To detect an association between the software application and the additional software application refers to sensing or otherwise determining a relationship, connection, and/or link between the two software applications. Such an association may include data dependencies, shared resources, and/or functional integrations that permit the software applications to work together seamlessly. To visually indicate the additional software application refers to presenting a graphical representation and/or notification informing a user about the presence, relevance, or association with the additional software application in relation to the current context or action being performed.

For example, when a user is working on a project management board and attempts to assign a task, at least one processor may identify an additional software application, such as a team calendar tool, associated with scheduling tasks. At least one processor may detect the association between the project management application and the calendar application, based on shared team member data, project timelines, registry data, identifiers, events, and/or any other type of data. At least one processor may retrieve availability data from the calendar application and visually indicate the calendar application by displaying a small calendar icon next to the task assignment field of the board. The visual indication may be interactive, allowing a user to quickly access the calendar data without leaving their current workflow, thereby streamlining the task assignment process and improving coordination across different aspects of the collaborative platform.

Figure 3:
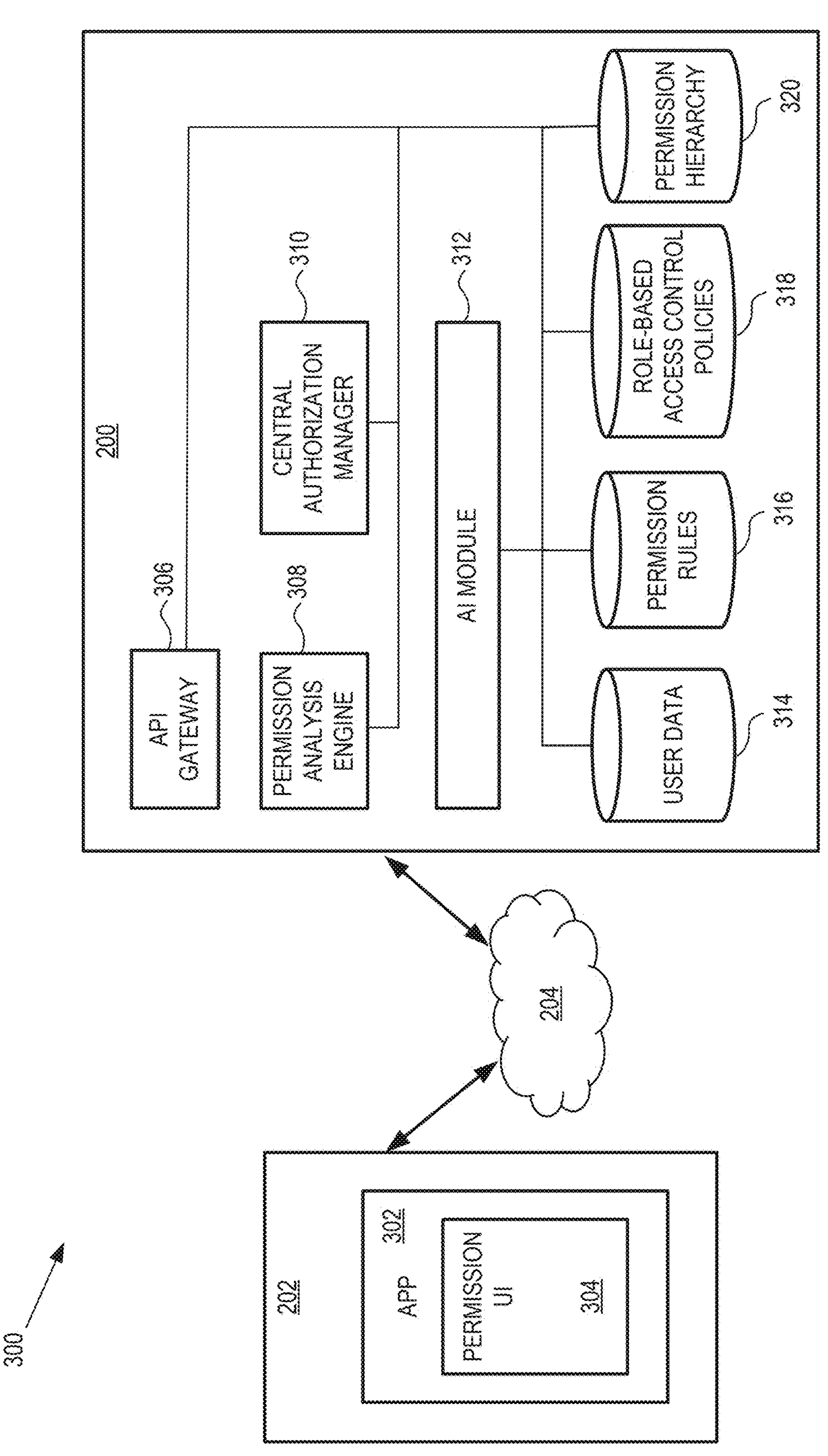
FIG. 3 is an exemplary schematic diagram of a collaborative software platform for managing permissions, consistent with some disclosed embodiments.

By way of a non-limiting example, reference is made to FIG. 3, which illustrates an exemplary schematic diagram of a collaborative software platform 300 for managing permissions, consistent with some disclosed embodiments. Collaborative software platform 300 may enable a plurality of users associated with client devices 202 (see FIG. 2) in different locations to seamlessly share and edit documents in real time over network 204, fostering efficient collaboration across distributed teams. For illustrative purposes only, collaborative software platform 300 shows a single instance of client device 202 and server 200 connected via network 204. However, collaborative software platform 300 may include multiple instances of client device 202 connected to one or more instances of server 200 concurrently. In some embodiments, collaborative software platform 300 is a SaaS platform. Client device 202 may have a software application 302 installed thereon presenting an interactive graphical user interface (GUI) 304 for managing permissions in the collaborative software platform. Server 200 may include an Application Programming Interface (API) Gateway 306 for managing and/or controlling API traffic associated with a permission analysis engine 308. Server 200 may additionally include a central authorization manager 310, an AI module 312, and a plurality of data structures, such as user data 314, permission rules 316, roles-based access control (RBAC) policies 318, and a permission hierarchy data structure 320.

At least one processor (e.g., processor 102 in FIG. 1) may receive a signal to access permission data associated with performance of at least one action by a user of collaborative software platform 300. For instance, the signal may be indicative of a mouse-click by a user of client device 202 via GUI 304 requesting to view which actions are permitted for performance by the user and which actions are denied. Based on an identity of the user, at least one processor may determine that the user is assigned a role of contributor and belongs to a group "Marketing Team," which allows the user to view and edit project boards and shared documents, but restricts the user from removing users from a workspace, or changing how boards are grouped.

Figure 8:
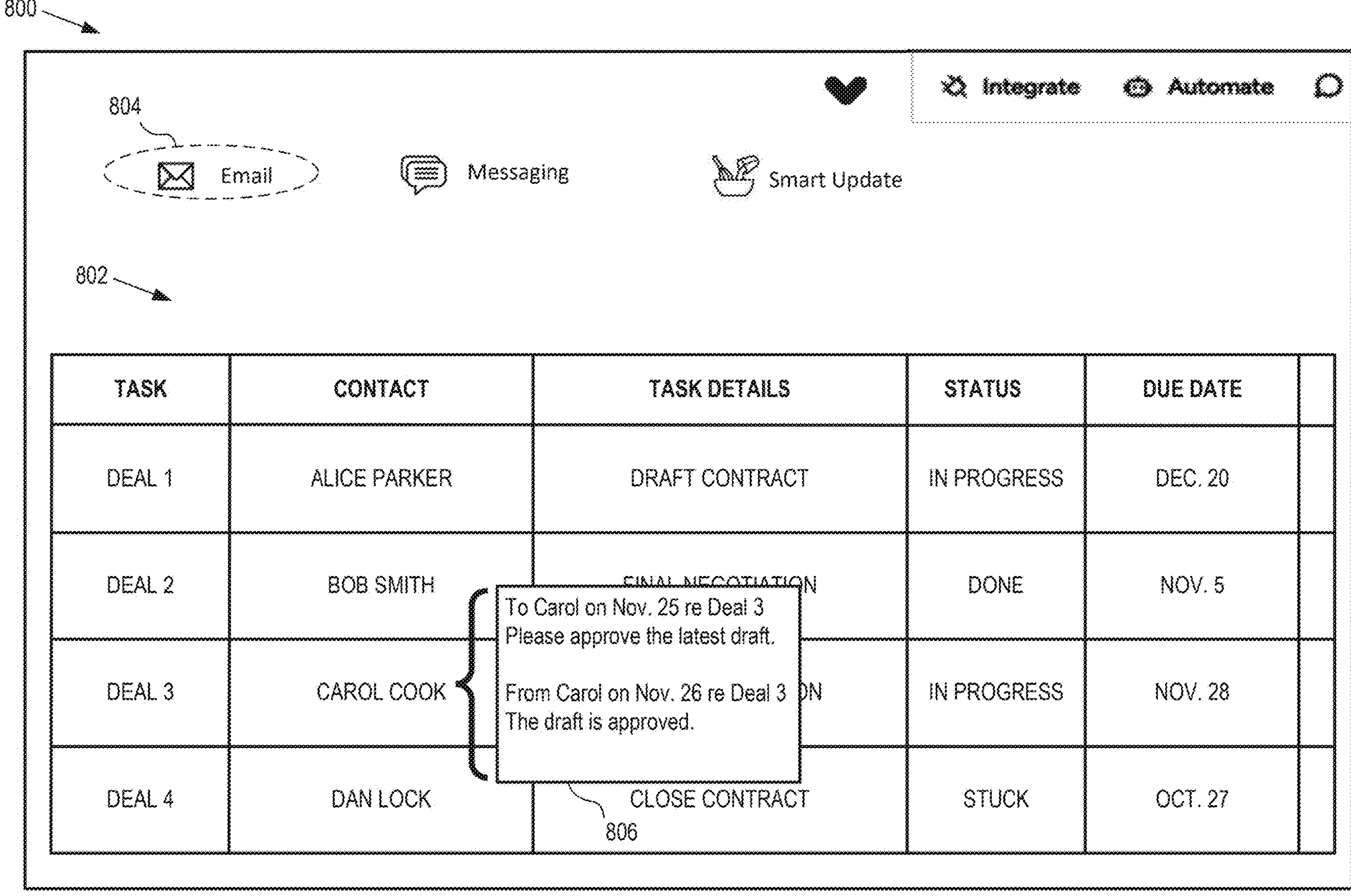
FIG. 8 illustrates an exemplary software application implemented on a collaborative software platform 300, consistent with some disclosed embodiments, consistent with some disclosed embodiments.

By way of a non-limiting example, reference is made to FIG. 8 which illustrates an exemplary software application 800 implemented on collaborative software platform 300 (see FIG. 3), consistent with some disclosed embodiments. Software application 800 may permit multiple users of multiple instances of client device 202 (see FIG. 2) to share data to perform collaborative teamwork over network 204. For instance, data presented on an instance of client device 202 via software application may be stored in data structure 206 and managed by one or more instances of servers 200. In some disclosed embodiments, at least one processor (e.g., processor 102 in FIG. 1) may receive a signal in a context of software application 800 implemented on collaborative software platform 300. In some disclosed embodiments, software application 800 includes a board 802 presenting data accessible via collaborative software platform 300. Board 802 may be associated with board level 408 of hierarchy 400 in FIG. 4. Board 802 may present data organized in tabular form with multiple rows and columns. Each column and/or row of board may be associated with column level 412 and row level 414 of hierarchy 400, respectively. At least one processor may receive a signal associated with a keyboard stroke for editing an item on board 802.

In some disclosed embodiments, at least one processor may identify an email client 804 (e.g., an additional software application) on collaborative software platform 300 associated with the editing action. For instance, a user may request to edit an item of board 802 (e.g., to update a status) based on content from email client 804. At least one processor may communicate with email client 804 (e.g., via network 204), detect an association between board 802 and email client 804 (e.g., based on a contact name in the contact column), retrieve data associated with email client 804, and visually indicate email client 804 in a window 806 displayed over board 802.

Some disclosed embodiments involve accessing a multi-layered permission hierarchy associated with the user and the at least one action. To access may be understood as described elsewhere herein. A hierarchy refers to an organization in which elements may be arranged according to levels of importance, priority, and/or dependency. A hierarchy may include differing forms, such as a tree—where each element (or node) has one parent and potentially multiple children, resulting in a branching structure—or a network, where elements may have multiple connections and relationships, allowing for more complex interdependencies. Hierarchies may visually and functionally represent the relationships and authority among differing components and/or members within an organization. Higher levels in a hierarchy may be applied over a broader scope than lower levels in the hierarchy, and settings associated with higher levels may override settings associated with lower levels. Lower levels may inherit one or more settings from higher levels. A multi-layered permission hierarchy refers to a hierarchy (as described above) storing permission data in multiple levels or tiers. Such a hierarchy may include differing categories of permissions (e.g., user roles and/or group memberships), and granted permissions, each permission potentially influencing and/or overriding other permission to govern what actions a user may perform and/or what resources may be accessed within a software platform. This hierarchy may include various levels of permissions, such as global platform permissions, application-specific permissions, role-based permissions, and/or individual user permissions. A layer in a hierarchy (i.e., a level and/or a tier) refers to a rank and/or position within a hierarchy that elements may share based on common characteristics, functionality, and/or relationship to other elements located above or below a particular layer. Hierarchies may be structured like a pyramid or tree, having layers organized in a clear order of authority, importance, and/or complexity. Elements positioned at higher layers may be associated with greater authorization and/or control than elements positioned at lower levels. A layer in a hierarchy may group elements that are at the same relative level within the hierarchy, e.g., elements having similar rank and/or scope. Accessing a multi-layered permission hierarchy associated with a user and an action may include establishing a network connection with a data structure, querying and/or navigating the hierarchy, and/or retrieving permission data specific to the user and the action. A permission hierarchy may include a single hierarchy or a plurality of hierarchies. The plurality of hierarchies may be associated and/or linked with each other.

In some disclosed embodiments, the multi-layered permission hierarchy is linked to a centralized authorization manager of the software platform. A centralized authorization manager refers to a core administrator, administration tool, and/or (e.g., software and/or hardware) overseer for governing and/or enforcing access controls and permissions across differing components of a software platform. A centralized authorization manager may include software and/or hardware for concentrating, clustering, unifying, and/or aggregating access controls and/or permissions for differing users, roles, and/or contexts across a distributed platform in a specific location accessible over a network by differing and/or distributed components. Such a centralized approach for storing permissions may ensure that permission policies are applied in a consistent and streamlined manner for differing applications or modules within a software platform. Linked refers to connected, associated, and/or in communication with something. or association between two or more components, systems, or data structures within a software environment. A multi-layered permission hierarchy linked to a centralized authorization manager of the software may involve implementation of one or more protocols, or use of one or more data references, integrations, and/or Application Programming Interface (API) connections to permit sharing and/or synchronizing data between the linked entities. Linking a permission hierarchy to a centralized authorization manager may ensure that the hierarchy is consistently applied across the entire software platform. Such a centralized approach may improve efficiency in managing permission, enables real-time updates to access rights across a distributed platform, and reduce risk of inconsistencies.

By way of a non-limiting example, in FIG. 3, at least one processor (e.g., processor 102 in FIG. 1) may access multi-layered permission hierarchy 320 associated with the user and the at least one action. Multi-layered permission hierarchy may be linked to centralized authorization manager 310 of the software platform.

Figure 4:
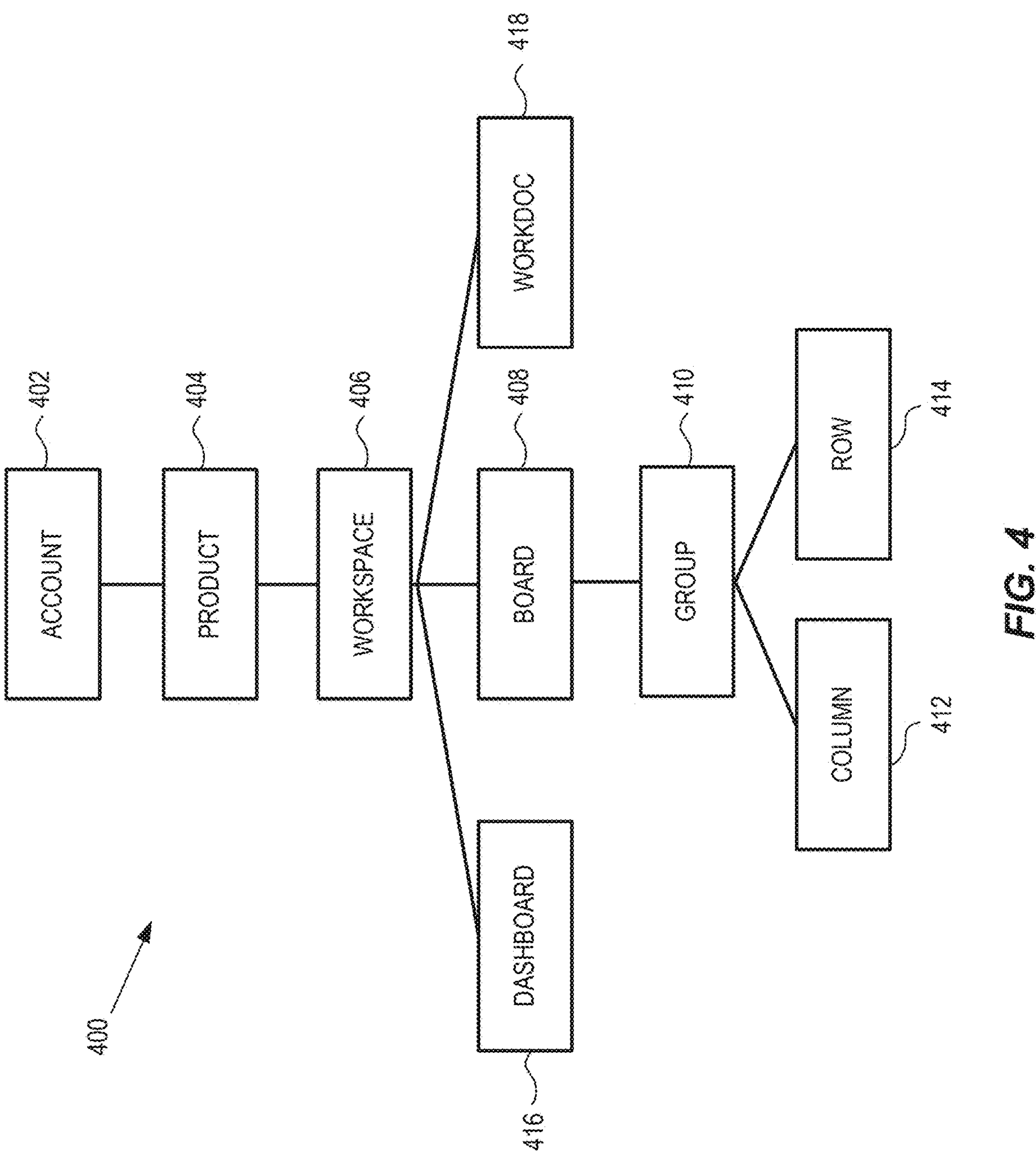
FIG. 4 is an exemplary schematic diagram of a multi-layered permissions hierarchy for a collaborative software platform, consistent with some disclosed embodiments.

By way of another non-limiting example reference is made to FIG. 4, which illustrates an exemplary schematic diagram of a multi-layered permissions hierarchy 400 for a collaborative software platform, consistent with some disclosed embodiments. Permissions hierarchy 400 may be organized into multiple distinct levels, each level governing permissions (e.g., access and user rights) within a workspace. The highest level in permission hierarchy 400 may include an account level 402 which may control global permissions for all users in a workspace (e.g., account administration, security setting, and proprietary data such as financial data). Below account level 402 may be a product level 404, followed by a workspace level 406 governing permissions for specific workspaces and any boards contained therein. This workspace level 406 may allow an administrator to control who can join or view a workspace. Below workspace level 406 may be a board level 408 for managing permission for individual boards within a workspace. Users assigned to different roles (e.g., owner, editor, viewer, guest) may each have a different set of capabilities to create, modify and/or delete board content. In some instances, board permissions may override broader workspace permissions to provide finer control over collaboration and data security. Alongside board level 408, permission hierarchy 400 may include a dashboard level 416 and a workdoc level 418. Below board level 408 may be a group level 410. Below group level 410 may be a column level 412 and a row level 414 enabling to manage permissions for specific items within a board, such as to limit visibility or editing rights for sensitive information, and may ensure that only authorized users have access. By moving downward through hierarchy 400, users may access permissions at increasingly detailed levels of granularity, from the least granular account level 402 to the most granular column level 412 or row level 414. Together, hierarchical levels 402 to 416 may form a multi-layered permission hierarchy 400 to support flexible and secure collaboration across teams and projects within the collaborative software platform.

By way of another non-limiting example reference is made to FIG. 5, which illustrates another exemplary schematic diagram of a multi-layered permissions hierarchy 500 for a collaborative software platform, consistent with some disclosed embodiments. The highest level in permission hierarchy 500 may be an administrative level 502, followed by a member level 504, a contributor level 506, a viewer level 508, and a guest level 510. Each level in hierarchy 500 may be associated with a smaller set of permissions, with administrative level 502 associated with the largest set of permissions, and guest level 510 associated with the smallest set of permissions. Hierarchies 400 and/or 500 may be stored in permission hierarchy data structure 320 and may be linked to central authorization manager 310.

Some disclosed embodiments involve traversing the multi-layered permission hierarchy to identify a plurality of permission levels in the multi-layered permission hierarchy associated with the performance of at least one action by the user. Traversing refers to moving through and/or navigating a data structure. For example, traversing may involve visiting each node in a tree structure, following links in a graph, and/or iterating through levels in a hierarchical system in a systematic manner (e.g., breadth first or depth first) to ensure no nodes and/or edges are omitted. To traverse a multi-layered permission hierarchy may include systematically navigating through a data structure to examine and/or inspect various permissions. It may include analyzing relationships between different permission tiers, roles, and/or specific user rights to produce an access landscape for a given user or action. It may include filtering based on a user identity, role, application type, and/or other contextual information. By traversing the multi-layered permission hierarchy, at least one processor may identify and compile a comprehensive set of permissions relevant to performance of a specific action by a specific user. The at least one processor may examine global permissions, role-based access controls, group memberships, and/or individual user rights. The at least one processor may start at the highest level of the hierarchy, such as organization-wide permissions, and progressively move through more specific levels, such as department-level permissions, project-specific access rights, and finally, individual user grants or restrictions. To identify refers to recognizing, ascertaining, and/or discovering. Identifying may include recognizing, determining, and/or distinguishing specific elements, features, patterns, or characteristics within a set of data or information. For example, identifying may involve pattern matching, classification, or selection of relevant components from a larger dataset, determining a match (e.g., within a threshold) between two or more items, and/or associating an item with an (e.g., uniquely) identifying code and/or index. A permission level within a hierarchy refers to a distinct tier, layer, and/or category of access rights governing what actions a user may perform and/or what resources a user may access and under what conditions. Each permission level in hierarchy may be associated with a specific scope of permissions. Some examples of permission levels within a hierarchy may include (e.g., account, workspace, board, group, or individual item). Elements belonging to the same layer of a hierarchy may be associated with a similar scope of privileges and access rights, and may override and/or inherit settings from other levels in the hierarchy.

A plurality of permission levels in the multi-layered permission hierarchy associated with the performance of an action by a user refers to multiple distinct tiers and/or categories of access rights within a permission hierarchy affecting and/or influencing the ability of a particular user to perform a particular action. The plurality of permission levels may include, for example, permissions associated with a particular user, role, and/or group to which the user belongs, permissions associated with a particular action and/or context, permissions associated with one or more resources associated with performance of the requested action, and/or any other permission affecting and/or influencing the capability of the particular user to perform the particular action.

For example, when a user attempts to edit a shared document, at least one processor may access a multi-layered permission hierarchy and check the user's global permissions, followed by role-based permissions for a specific application, followed by group-level permissions, and finally individual permissions for the particular document. The centralized authorization manager may ensure that any recent changes to the user's permissions are reflected in the hierarchy within a time threshold, permitting dynamic and fine-grained control over user actions while maintaining a consistent and secure authorization framework across the collaborative software platform. A comprehensive and systematic traversal may ensure that all relevant permission levels are identified and considered when determining a user's ability to perform a requested action.

By way of a non-limiting example, in FIGS. 4-5, at least one processor (e.g., processor 102 in FIG. 1) may traverse multi-layered permission hierarchies 400 and/or 500 to identify a plurality of permission levels in multi-layered permission hierarchies 400 and/or 500 associated with the performance of at least one action by the user. The traversal may be a depth-first traversal, breadth-first traversal, or any other type of graph traversal. For instance, at least one processor may identify the user as being assigned a contributor role and may associate contributor level 506 with the user. In addition, at least one processor may identify the user as belonging to a specific group and may associated group level 410 with the user.

Some disclosed embodiments involve collecting the permission data from the identified permission levels associated with the performance of at least one action by the user in the multi-layered permission hierarchy. Collecting refers to gathering, assembling, and/or aggregating data from various sources and/or locations. For example, collecting may involve retrieving data from multiple data structures, compiling information from different system components, and/or aggregating permissions from various hierarchical levels. Permission data may be understood as described elsewhere herein. The identified permission levels associated with the performance of at least one action by the user in the multi-layered permission hierarchy refers to tiers and/or categories of access rights within a permission hierarchy determined to affect and/or influence the ability of a particular user to perform a particular action. These permission levels may include global permission levels, role-based permission levels, group permission levels, individual user permission levels, and/or any other type of permission. Collecting the permission data from the identified permission levels, in the above context, refers to gathering, compiling, and/or aggregating relevant permission information from various levels of the permission hierarchy that are applicable to a particular user attempting to perform a particular action within the collaborative software platform. Collecting permission data may involve filtering the permission data based on contextual information, such as user identity, role, or any other contextual information. Collecting the permission data may ensure that pertinent permission data is considered when determining whether the particular user has the necessary rights to perform the requested action.

By way of a non-limiting example, after traversing the multi-layered permission hierarchy to identify relevant permission levels for a user attempting to edit a shared document, at least one processor may gather permission data from each identified level. This may include retrieving global account permissions from a central database, extracting role-based permissions from an application-specific permission table, gathering group-level permissions associated with the document from a project management system, and/or compiling individual permissions granted specifically for the document from a separate access control list. At least one processor may aggregate the permission data to create a comprehensive view of the user's rights and restrictions related to the specific action of editing the shared document.

By way of a non-limiting example, in FIGS. 4-5, at least one processor (e.g., processor 102 in FIG. 1) may collect permission data from contributor level 506 and from board level 408 in multi-layered permission hierarchies 500 and 400, upon identifying these levels as being associated with the user and the performance of at least one action (e.g., to edit an item on board 802 in FIG. 8). In some instances, at least one processor may additionally collect global permissions specifying general access rights for all users and/or individual permissions for the particular user. In some instances, to collect the permission data, at least one processor may query one or more data structures (e.g., user data 314, permission rules 316, and/or role-based-access-control policies 318) associated with hierarchies 400 and/or 500 using an identifier for the user and/or identifiers for contributor level 506 and the specific group ("Marketing Team") to which the user belongs. For instance, at least one processor may collect permission data associated with the contributor role from RBAC and permission data associated with the "Marketing Team" group from permission rules 316. At least one processor may cross-reference and/or aggregate the permission data collected from hierarchies 400 and/or 500 and/or user data 314, permission rules 316, and/or RBAC Policies 318 in association with the user to determine rights and/or restrictions for the user. In some instances, at least one processor may additionally gather document and/or resource-specific limitations that may further tailor the user's access rights within the collaborative platform.

Some disclosed embodiments involve using the permission data to identify at least one restriction associated with performance of the at least one action. A restriction refers to a limitation, constraint, policy, and/or condition that prevents, limits, and/or controls one or more actions, capabilities, and/or behaviors. A restriction may prevent, block, and/or limit a user from performing an action. It may present a barrier for protecting resources from unauthorized access and/or manipulation. A restriction may include a hard deny and/or a conditional permit. A "hard deny" refers to a strict restriction that completely prevents a user from performing a specific action, regardless of other permissions that may be present. When a hard deny is in place, an action may be categorically blocked, and no exceptions or additional conditions may override this prohibition. For example, if a user is subject to a hard deny on deleting files, they will never be able to delete files, regardless of their role or other granted permissions. By contrast, a "conditional permit" may permit a user to perform an action, but only if certain conditions are met. A conditional permit may grant access on a case-by-case basis, depending on factors such as the user's role, the time of access, or specific contextual requirements and/or conditions. For instance, a user may be permitted to edit a document only during business hours or after receiving approval from an administrator. Conditional permits may enable finer control over access, providing flexibility while still enforcing necessary security constraints. Thus, a restriction may include an absolute block on an action, or may permit an action only under when specific conditions are met. In some embodiments, a restriction may be based on constraints associated with a plurality of applications (e.g., internal and/or external to the software platform). For instance, a restriction against adding a weather forecast to a scheduling board hosted by a software platform may be based on restrictions associated with editing the scheduling board and/or restrictions associated with accessing a weather forecast application (e.g., an additional application), external to the software platform.

functionalities for certain user roles, and/or impose constraints on data manipulation. A restriction associated with performance of the at least one action refers to a restriction affecting and/or influencing a capability to execute and/or complete the action. Using the permission data to identify at least one restriction associated with performance of the at least one action may include employing, utilizing, and/or applying the collected permission data to determine any limitations and/or constraints that may prevent or constrain an ability to perform a specific action. This may include analyzing, interpreting and/or evaluating the aggregated permission data collected from differing levels of the permission hierarchy to identify any rules, policies, and/or settings that may restrict and/or limit performance of the particular action by the particular user.

By way of a non-limiting example, after collecting permission data for a user attempting to edit a shared document, at least one processor may analyze the permission data to identify any restrictions, by checking global account permissions to see if the user has general editing rights, examining role-based permissions to determine if the user's role allows document editing, and reviewing document-specific permissions to identify any restrictions on editing the particular file. The at least one processor may identify restrictions such as read-only access, time-limited editing privileges, and/or a prior-approval requirement before changes can be made. The at least one processor may apply any identified restrictions to determine whether the user may proceed with the editing action and, if so, under what conditions or limitations.

By way of a non-limiting example, in FIGS. 4-5, at least one processor (e.g., processor 102 in FIG. 1) may use the permission data to identify at least one restriction associated with performance of the at least one action. For instance, based on permission data retrieved from contributor level 506 in hierarchy 500, group level 410 in hierarchy 400, and cross-referenced with additional permission-related data stored in user data 314, permission rules 316, and/or RBAC policies 318, at least one processor may determine that the user may edit certain items of a particular board (e.g., items specifically assigned to the user), but cannot edit other items (e.g., not assigned to the user). In addition, at least one processor may determine that the user is restricted from adding or removing users and/or boards to the "Marketing Team" group.

Some disclosed embodiments involve in a first mode of operation, visually indicate which of the at least one action is associated with the at least one restriction thereby being restricted for performance by the user, and which of the at least one action is unassociated with the at least one restriction thereby being permitted for performance by the user. A mode of operation may refer to a specific state, context, and/or configuration for performing one or more procedures. Differing modes of operations may provide differing sets of functionalities depending on context. For instance, a first mode of operation may be associated with a first set of conditions for performing a first set of tasks and a second mode of operations may be associated with a second set of conditions for performing a second set of tasks. The first mode of operation may be incompatible with or otherwise unsuitable for the second set of conditions and the second mode of operation may be incompatible with or unsuitable for the first set of conditions. Each mode of operation may be associated with a different context, interface layout, available features, and/or processing behaviors tailored for specific use cases or user needs. At least one processor may invoke a first mode of operation in response to a user input via a user interface, e.g., a selection from a menu, or a selection of a button. In some embodiments, at least one processor may automatically invoke a first mode of operation based on a context of a user input (e.g., an attempt by the user to perform a particular action). To visually indicate refers to displaying, portraying, illustrating, and/or otherwise presenting information graphically. A visual indication may include applying one or more colors, shapes, frames, icons, text formatting, and/or other graphical elements to convey a status and/or state, and/or draw attention to one or more particular data items presented on a user interface. An action associated with a restriction refers to an action (as described elsewhere herein) whose performance may be affected and/or influenced by the restriction. It may include denied actions, or actions that a user may only be able to perform in a limited manner due to one or more restrictions. Actions being restricted for performance by a user refers to procedures and/or functions that the user may be limited, constrained, and/or prohibited from implementing. Such actions may include for example, write operations on documents set to read-only, and/or access operations requiring administrative authorization.

To visually indicate which of the at least one action is associated with the at least one restriction thereby being restricted for performance by the user refers to visibly portraying actions that the user is not allowed to perform due to identified restrictions or limitations in their permissions. It may include visibly distinguishing restricted actions from permitted actions, e.g., by using different display characteristics for restricted versus permitted actions. It may include highlighting text depicting restricted actions, displaying the text using a different format (e.g., color, bold, italic, larger font), and/or displaying a box or circle around the text. The visual indication may help users quickly identify which actions are off-limits based their current access rights or a role within the collaborative software platform. Unassociated refers to unrelated, unaffiliated, independent, and/or unaffected by something. An action unassociated with a restriction refers to an action that is not influenced, affected, and/or subject to any restrictions. It may include actions available for performance by a user. Actions permitted for performance refers to actions that may be allowed, enabled, and/or authorized to carry out based on assigned permissions and/or access rights. For example, permitted actions may include creating a new document, modifying existing data, or accessing one or more resources in response to successful user authentication. Visually indicating which actions are permitted for performance by a user versus which actions are restricted may facilitate in identifying what capabilities are available to a particular user, and which operations a user may freely execute without encountering permission-based limitations. Thus, the first mode of operation may be user-based in that it may permit a user and/or administrator to view which actions are available for performance by the user and/or which actions are unavailable. It may facilitate in conveying what actions are available for performance by the user and what actions are unavailable.

For example, in response to a selection of a "first mode" item from a menu, at least one processor may display a list of available actions for a user. The at least one processor may visually indicate actions restricted based on associated permissions using a red, "X" or lock icon or grayed-out text, and may visually indicate permitted actions using a green icon, "V" or normal text. Such a clear, visual distinction may permit users and/or administrators to quickly assess which actions may be performed by the user, and which actions may be restricted or limited, which may enhance user experience and reduce potential confusion or frustration when attempting to perform one or more actions.

Figure 6:
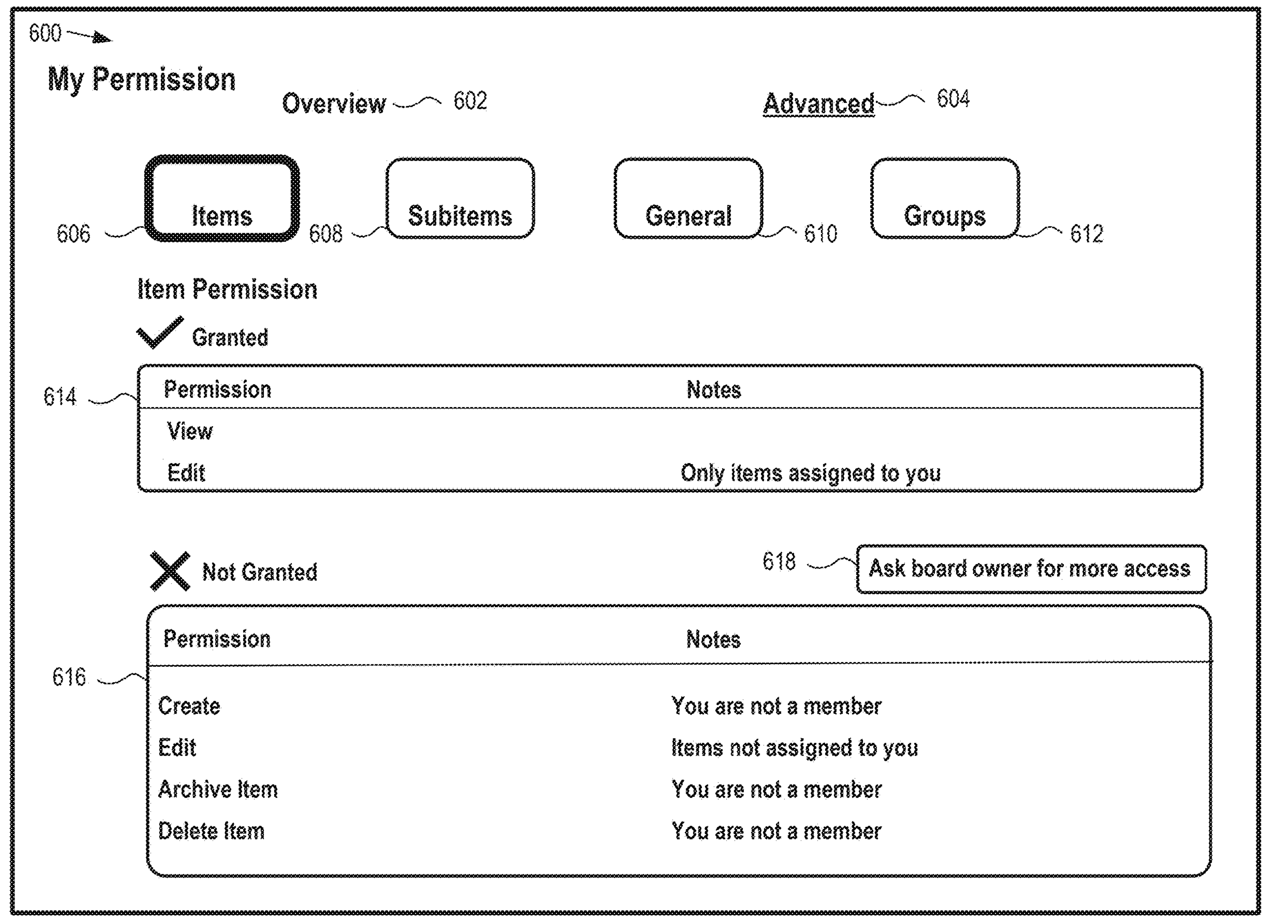
FIG. 6 is an exemplary screen shot of a user interface for presenting multi-layered permissions in a first mode of operation, consistent with some disclosed embodiments.

By way of a non-limiting example, reference is made to FIG. 6 which illustrates an exemplary user interface 600 for presenting multi-layered permissions in a first mode of operation, consistent with some disclosed embodiments. User interface 600 may visually indicate which action is associated with a restriction thereby being restricted for performance by the user, and which action is unassociated with a restriction thereby being permitted for performance by the user. In some instances, user interface 600 may include an Overview tab 602 for viewing a general summary of permissions, and an Advanced tab 604 for viewing a more granular or detailed presentation of permissions. For instance, selecting Advanced tab 604 may display tabs for viewing for different categories of permission types, e.g., permissions types that may be available for viewing within the platform, such as an Items tab 606 to view permissions for an item (e.g., a column or row in a board), a Subitems tab 608 to view permissions for subitems (e.g., a cell in a board), a General tab 610 to view fundamental permissions across the platform, and a Groups tab 612 to view permissions for different groups. This list is not intended to be limiting, and additional tabs may be presented for additional permission categories. In the example shown, the Items Permissions tab 606 has been selected. In response to the selection, at least one processor (e.g., processor 102 in FIG. 1) may display permissions for items (e.g., rows or columns) of board 802 (FIG. 8). Such permissions may include a set of permitted actions 614 (e.g., the user may view content and edit certain items), and a group of restricted actions 616 (e.g., the user may be restricted from creating, archiving, or deleting items, and editing certain other items). In other words, when assigned a role of contributor, a user's editing capabilities may be permitted under some circumstances and denied under other circumstances.

Some disclosed embodiments involve, in a second mode of operation, for a particular action of the at least one action, visually indicate which of the identified permission levels permit the user to perform the particular action, and which of the identified permission levels restrict the user from performing the particular action. A second mode of operation refers to a state, context, and/or configuration for performing one or more procedures different than the first mode. For example, a second mode of operation may be relevant to a different context than the first mode, offer different features, and/or present different information than the first mode. At least one processor may invoke the second mode of operations in response to an input signal (e.g., a menu selection and/or button press for the second mode), and/or automatically due to a particular context and/or circumstance. A particular action refers to a specific, certain, distinct, and/or selected action (as described elsewhere herein). For example, a particular action may include editing a document, accessing a data structure, or calling an API. To permit a user to perform a particular action refers to allowing, and/or granting authorization to the user to perform the particular action. Permitting a user to perform a particular action may include enabling certain functionalities, lifting one or more limitations, granting rights, and/or removing restrictions. Permissions levels that permit a user to perform a particular action refer to permission levels in a group or hierarchy that lack any restrictions or limitations that could deny and/or constrain a capability of a user to perform the action. To restrict refers to deny, limit, constrain, and/or prevent. Permissions levels that restrict a user to perform a particular action refer to permission levels in a group or hierarchy that include one or more limitations and/or constraints to thereby deny, prevent, and/or limit a capability of the user to perform the action. For example, some permission levels in a hierarchy may permit a user to perform a particular action while other permission levels may deny performance of the action.

To visually indicate which of the identified permission levels permit the user to perform the particular action, and which of the identified permission levels restrict the user from performing the particular action refers to visibly portraying permission levels attributable to permitting the user to perform the action in one manner, and visibly portraying permission levels attributable to denying or limiting the user from performing the action in another manner. It may include visibly distinguishing permission levels granting a user the right to perform the action from permission levels denying or limiting the action, e.g., by using different display characteristics for each (e.g., using highlight, different colors, icons, text format, and/or other graphical elements). For instance, permission levels attributable to denying an action may be displayed in red or with an "X" whereas permission levels attributable to permitting an action may be displayed in green or with a "V".

Thus, the second mode of operation may be action-based in that it may permit a user and/or administrator to view which permission levels are attributable to permitting performance of a particular action by a user and which permission levels are attributable to denying performance of the particular action. The visual indication may help users and/or administrators understand which levels of a permission hierarchy are attributable to enabling performance of an action and which levels are attributable to restricting or limiting performance of the action. The second mode of operation may provide a more detailed and granular view of the permission structure affecting a user's ability to perform a specific action within the collaborative software platform. This mode may allow users to understand not just whether an action is permitted or restricted, but also which specific permission levels contribute to that determination. By visually indicating the permitting and restricting permission levels, at least one processor may enable users to gain insights into the complex multi-layered permission hierarchy and how it affects their access rights.

For example, in the second mode of operation, when a user selects a particular action, such as editing a shared document, at least one processor may display a hierarchical view of the permission levels relevant to the action. For instance, at least one processor may display permission levels that permit the action, such as a user's role-based permissions or specific document-level grants, in green or with checkmark icons, and may display permission levels that restrict the action, such as organization-wide policies or project-specific limitations, in red or with lock icons. Such a detailed visualization may permit users to identify which specific aspects of their permissions enable or prevent them from performing the selected action. This transparency may help users navigate complex permission structures more effectively and request appropriate.

Figure 7:
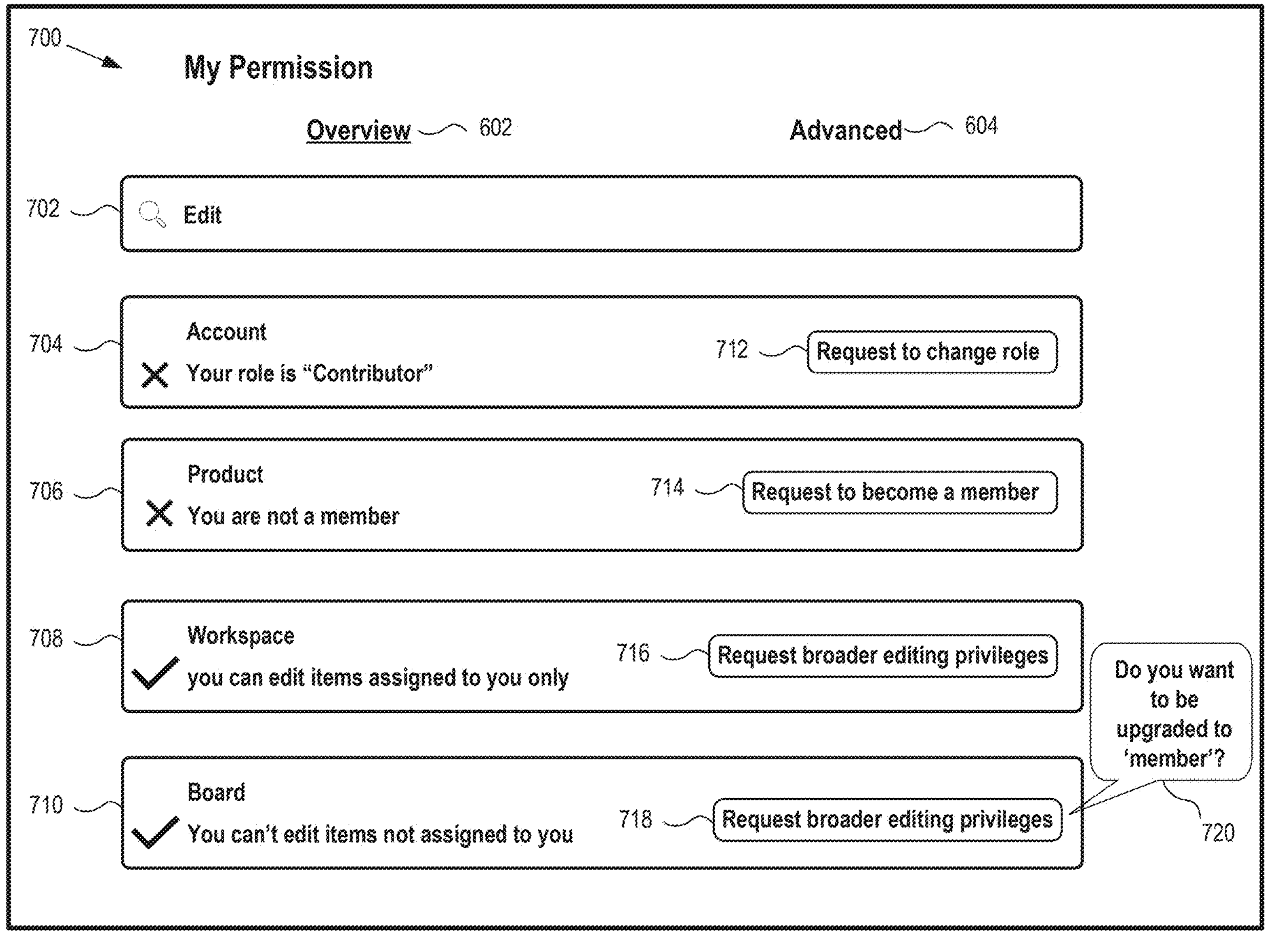
FIG. 7 is an exemplary screen shot of a user interface for presenting multi-layered permissions in a second mode of operation, consistent with some disclosed embodiments.

By way of a non-limiting example, reference is made to FIG. 7 which illustrates an exemplary user interface 700 for presenting multi-layered permissions in a second mode of operation, consistent with some disclosed embodiments. In some instances, at least one processor (e.g., processor 102 in FIG. 1) may present user interface 700 in response to a selection of overview tab 602. User interface 700 may include a search bar 702 permitting a user to select or otherwise indicate a particular action for which to view permissions (e.g., edit). For instance, user interface 700 may present four different permission levels, an account level permission 704 (e.g., corresponding to account level 402 in permission hierarchy 400 in FIG. 4), a product level permission 706 (corresponding to product level 404), a workspace level permission 708 (corresponding to workspace level 406) and a board level permission 710 (corresponding to board level 408). User interface 700 may present additional or fewer permission levels.

For the particular action (e.g., edit), user interface 700 may visually indicate which of the identified permission levels permit the user to edit, and which of the identified permission levels restrict the user from editing. For instance, based on the permission data collected from hierarchies 400, 500 and/or user data 314, permission rules 316 and/or RBAC policies 318, at least one processor indicate via account level permission 704 that the user is restricted from making edits at account level 402 (e.g., the user cannot modify account-wide settings, update global configurations, or make changes that affect all users within the account). Similarly, at least one processor may indicate via product level permission 706 that the user is restricted from editing at product level 404 (e.g., the user cannot edit unassigned items, add or remove users or boards, or perform administrative changes at the product level). To indicate these restrictions, at least one processor may present a red icon (e.g., "X"). In addition, at least one processor may indicate via workspace level permission 708 and board level permission 710 that the user is permitted to edit certain items assigned to the user at workspace level 406 and board level 408. To indicate these permissions, at least one processor may present a green icon (e.g., "V").

Some disclosed embodiments involve displaying at least one call-to-action (CTA) for resolving the at least one restriction. A call-to-action (CTA) refers to an indicator or interactive element prompting performance of a procedure. For example, a call-to-action may include a clickable button, link, icon, menu item, banner, or other interactive element designed to encourage a user to invoke a procedure using an input device. For instance, a CTA may include a button labeled "Request Access" or a hyperlink displaying the text "Upgrade Permissions". To resolve a restriction refers to address, fix, and/or remove a limitation and/or constraint preventing performance of an action. Resolving a restriction may include granting access rights, changing a user role, or modifying one or more settings and/or permissions to allow a previously restricted action. Displaying a CTA for resolving a restriction may provide users with a direct and actionable means to address permission-related limitations encountered while using the collaborative software platform. A CTA may enhance a user experience by offering immediate solutions to access issues, potentially reducing frustration, reducing friction, and improving workflow efficiency. The CTAs may address all restrictions associated with an action or a single identified permission level, providing users with direct means to request necessary permissions or role changes.

In some embodiments, a user interface associated with the first, second, and/or additional modes of operation may present differing types of CTAs. For instance, in a first mode of operation, an associated user interface may present one or more CTAs for resolving one or more restricted or partially restricted actions (i.e., the first mode may present action-specific CTAs). For instance, selection of a "Request access" CTA, a "Resolve restrictions" CTA, or an "Ask an administrator" CTA may trigger operations for gaining access to a restricted resource, resolving a restriction on a particular action, or petition an administrator for assistance, respectively. In some embodiments, an action may include a bundle or group of sub-actions, such that selection of a CTA in the first mode may resolve a plurality of restrictions on a plurality of sub-actions. For instance, selection of a CTA associated with a "Grant Full Project Access" action to onboard a new team member to a workspace may trigger operations for resolving restrictions for viewing project documents, editing tasks, commenting on message boards, and accessing dashboards in response to a single button click. Additionally or alternatively, an action may be restricted at multiple layers of a permission hierarchy, such that selection of a CTA in the first mode may resolve restrictions across a plurality of hierarchical layers (e.g., all hierarchical layers restricting a particular action). For instance, selection a CTA for a "Publish project updates" action may resolve restrictions at the board and workspace levels. Thus, a user interface for the first mode may permit viewing restrictions at the action level (i.e., which actions are permitted/restricted), and may present CTAs for resolving restricted actions. In other words, in the first mode, permission levels associated with an action and/or any associated sub-actions may be aggregated to produce a binary outcome, e.g., permitted/restricted, and restricted actions may be resolvable using a single CTA.

In some embodiments, in a second mode of operation, an associated user interface may present a plurality of CTAs, each resolving a restriction at a differing hierarchical level for a particular action. A user interface for the second mode may present a menu and/or search bar to enable selection of a particular action for which to view a "drill-down" view of associated permission levels, enabling a user to identify at which levels in a permission hierarchy the particular action is permitted and at which levels the particular action is restricted. The user interface for the second mode may present a CTA for each level in the permission hierarchy restricted a selected action, such that selecting a particular CTA may initiate operations for lifting a restriction at a particular level of the permission hierarchy.

In some disclosed embodiments, at least one CTA is a single CTA for resolving all the restrictions associated with the action via a single input. A single CTA refers to a unified or consolidated call-to-action element. Resolving all the restrictions refers to addressing and removing multiple limitations or constraints simultaneously, in a limited time window, or in response to a single action, rather than dealing with each restriction individually over an extended or unnecessarily long period, and/or rather than requiring multiple user actions. Thus, a single CTA may invoke multiple procedures to address multiple issues through one (single) user interaction (e.g., a single click). For example, a single CTA may include a button labeled "Resolve All Restrictions" that affects multiple different permission levels. A single input refers to a one-time user action, such as a single click, tap, or keystroke, that triggers a series of system processes or changes. Providing a single CTA for resolving all restrictions associated with an action via a single input may improve efficiency and streamline management of complex permission structures. It may permit addressing multiple permission-related issues in response to a single user action, potentially saving time and reducing the cognitive load associated with navigating intricate permission hierarchies.

For example, accessing and editing capabilities for a shared project dashboard may be restricted at multiple permission levels and/or by multiple permission categories. Instead of presenting separate CTAs for each restriction (e.g., "Request View Access", "Request Edit Rights", "Join Project Team"), at least one processor may display a single CTA button labeled "Gain Full Project Access". A click event associated with the single CTA button may cause at least one processor to initiate multiple procedures for resolving any restrictions preventing the access and edit capabilities, and may role reassignments, solicit necessary approvals, and update permission settings across various levels of the multi-layered permission hierarchy. Such a streamlined approach may improve user experience and productivity within the collaborative software platform.

By way of a non-limiting example, after a user selects a CTA button, at least one processor may trigger a backend workflow to process the user's request. A server associated with the collaborative software platform may receive a signal indicative of the user's request to resolve a permission and validate the user's identity and current permissions. The server may invoke one or more procedures. For instance, the server may send a permission upgrade request to an administrator, update a user role, and/or modify an access setting. Depending on the type of CTA and the permissions involved, the server may notify a party (e.g., a project owner or admin) to review and approve the request. The server may present the outcome of the approval on the user interface of the user, e.g., a confirmation message, an updated permission indicator, or a denial.

In some disclosed embodiments, at least one CTA is a single CTA for resolving a single identified permission level restricting the user from performing the particular action. A single identified permission level refers to a specific tier and/or category within the multi-layered permission hierarchy. Restricting the user from performing the particular action refers to a limitation or constraint that prevents a user from executing a desired operation, prevents the user from accessing a specific resource within the collaborative software platform, or prevents the user from executing a particular function. For example, a single identified permission level may include a role-based permission, a project-specific access control, or an organization-wide policy. An action may be denied due to a single permission level or due to a combination of multiple permission levels. In some embodiments, a single identified permission level may be the only reason an action may be denied such that resolving the single identified permission level via a single CTA removes all restrictions for the action. In some embodiments, resolving a single identified permission level is insufficient for removing all restrictions to an action. For instance, providing a single CTA for resolving a single identified permission level restricting the user from performing a particular action may provide a targeted and efficient approach to address ubiquitous permission-related obstacles. Such a feature may permit users to quickly and directly address the most common or relevant permission issues without navigating through multiple layers of the permission hierarchy or dealing with unrelated restrictions. For example, the most common restriction to editing a shared document may be attributable to user roles. At least one processor may display a single CTA button labeled "Request Editor Role" that when clicked transmits a request to upgrade the user's role to one with editing privileges. Such a targeted approach may lead to faster resolution of permission issues and a more streamlined user experience within the collaborative software platform.

By way of a non-limiting example, in FIG. 6, at least one processor (e.g., processor 102 in FIG. 1) may display a CTA 618 for resolving one or more restrictions. In some embodiments, CTA 618 may be a single CTA for resolving all the restrictions via a single input (e.g., "Ask board owner for more permissions" may permit resolving the restrictions associated with creating, editing, archiving and deleting items via a single button click). By way of another non-limiting example, in FIG. 7, at least one processor may display CTAs 712 to 718. In some disclosed embodiments, each of CTAs 712 to 718 are single CTAs for resolving a single identified permission level restricting the user from performing the editing action, e.g., CTA 712 may resolve editing at account level 402, CTA 714 may resolve editing at product level 404, CTA 716 may resolve editing at workspace level 406, and CTA 718 may resolve editing at board level 408. In some embodiments, when an action is indicated as restricted in the first mode, the GUI may present one or more CTAs adjacent to the restricted action (e.g., CTA 618 of FIG. 6) to initiate a remediation workflow.

In some disclosed embodiments, at least one action includes a collection of actions. A collection refers to a group, set, and/or assemblage of multiple items, elements, or entities gathered together or considered as a whole. For example, a collection may include a compilation of documents, a series of tasks, or a group of related functionalities within a software system. A collection of actions refers to a set of related or grouped operations or functions that may be performed within the collaborative software platform. This collection may be associated with a specific resource, project, and/or user group, allowing for more efficient management of permissions and/or access rights. A collection of actions may permit grouping related functionalities and/or apply permissions more efficiently. Instead of setting individual permissions for each action, an administrator and/or automated engine may define access rights for entire collections of actions. This approach may facilitate in streamlining management of permission, particularly for complex collaborative environments where users may need to perform multiple related tasks. A collection of actions may include multiple instances of the same or similar task, such as creating a series tasks for a board, assigning a group of new team members, updating a series of due dates, or generating multiple progress reports. Additionally or alternatively, a collection of actions may include multiple related tasks that may be performed sequentially, such as accessing a data structure, retrieving data from the data structure, and incorporating the data into a board, or multiple tasks typically performed by members of a group. By grouping actions together, at least one processor may apply consistent permission rules for an entire set related actions. Grouping actions may additionally permit a user to view and manage permissions for an entire collection of actions as though they were a single action, thereby simplifying permission management while ensuring that users have appropriate permissions for performing their assigned tasks.

In some instances, collections of actions may be dynamically generated based on user roles, project types, and/or specific workflows. For instance, a marketing team may have access to a collection of actions related to content creation, social media scheduling, and analytics reporting, while a development team may have a different collection of actions focused on code repositories, bug tracking, and deployment. By supporting collections of actions, at least one processor may enable more efficient and intuitive permission management, reducing the complexity of administering access rights in large-scale collaborative environments. Moreover, granting or revoking permissions for entire sets of actions with a single update may facilitate onboarding of new users or transitioning of roles.

By way of a non-limiting example, in FIG. 8, a user may request generation of a report for items indicated as "in progress" on board 802. Since board 802 includes two items indicated "in progress", at least one processor (e.g., processor 102 in FIG. 1) may generate a plurality of reports, one for each item that is "in progress". As another example, a user may request to update the status of items based on email content. In response, at least one processor may access an email client, analyze email content, determine from the email content which items are candidates for a status change, and changing the status for those items. Thus a single action (e.g., updating status based on email content) may include a collection of actions. At least one processor may permit. In response to a request to view permissions for the collection of actions, at least one processor may present user interface 700 of FIG. 7, with each of account level permission 704, product level permission 706, workspace level permission 708, and board level permission 710 displaying each permission for the collection of actions.

In some disclosed embodiments, a signal is indicative of a request to view available actions for performance by the user. Indicative refers to serving as a sign, indication, and/or pointer towards a particular fact, condition, and/or characteristic. A signal indicative of something may suggest and/or imply certain information. A request refers to a petition, an act of asking for something, seeking information, or expressing a desire for a particular action or response. A request may include a user input, a system-generated query, and/or an automated process seeking specific data or functionality. A request may serve as a signal indicating that an action is desired. At least one processor may interpret the request and determines an appropriate response based on the user's permissions and the current context. Available actions for performance by a user refers to operations, tasks, and/or functions that may be accessible or permissible for a user to perform based on existing permissions and current context. For example, available actions may include editing documents, accessing specific resources, or initiating certain processes. To view available actions for performance by a user refers to receiving information rendered visually and indicating which action the user may be permitted to implement. The signal may prompt at least one processor to display which actions the user may perform, e.g., in a list. For example, a user may click on a "My Actions" button or hover over a profile icon to view available actions. In response, at least one processor may traverse a multi-layered permission hierarchy to identify the user's current permissions across various levels, and present actions that the user may perform (e.g., a list of accessible projects, editable documents, and/or available tools.

By way of a non-limiting example, in FIG. 6, at least one processor (e.g., processor 102 in FIG. 1) may present user interface 6 in response to a signal indicative of a request to view available actions for performance by the user. For instance, the signal may be associated with a button click on a "My Actions" button.

In some disclosed embodiments, a signal is received following receipt of a prior signal indicative of a selection of the user from a plurality of available users. A prior signal refers to an earlier or preceding input, event, and/or data transmission within a sequence of system interactions. For example, a prior signal may include a user login, an event generated by at least one processor, and/or an automated process that occurs before the current signal is received. A selection refers to a choice or a pick of a particular item, option, and/or entity from a group of alternatives. For example, selection may involve clicking on a user profile, entering a username, or using a dropdown menu to pick a specific user account. A plurality of available users refers to a group or set of multiple user accounts or profiles that may be accessible or visible within the collaborative software platform. For example, this may include all registered users, members of a specific team or project, and/or users with certain roles or permissions. For example, an authorized user (e.g., an administrator) may have access to a two-step process for accessing and displaying user-specific permission information. First, the administrator may select a specific user from a directory (e.g., the prior signal). Following the selection, the administrator may request to view the available actions for the selected user. This may permit a team leader to review and potentially adjust permissions of various team members by first selecting a team member, and then clicking on a "View Permissions" or "Available Actions" button for the selected user. This approach may improve security by ensuring that permission information is accessed intentionally and for specific users.

Figure 9:
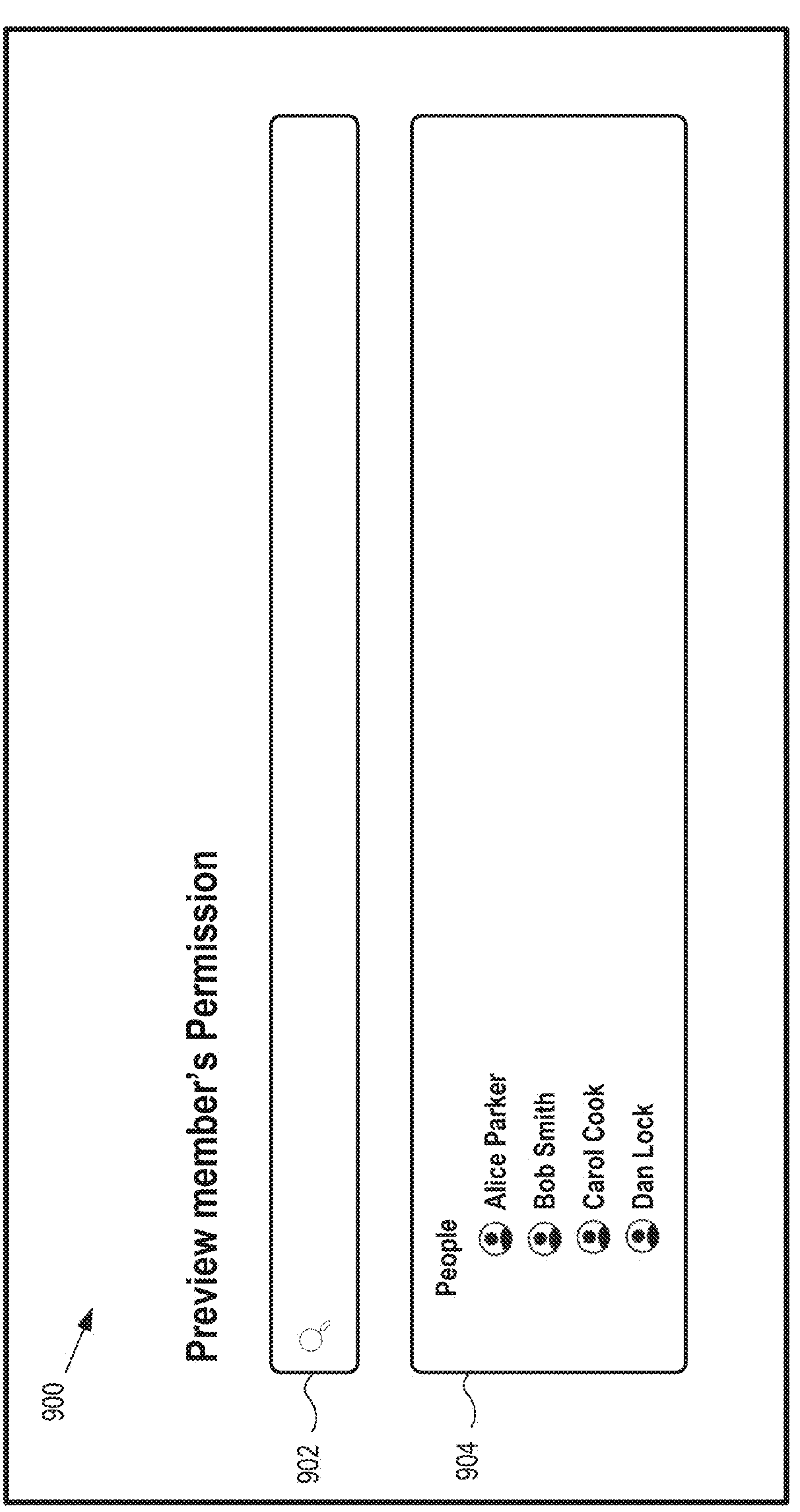
FIG. 9 is an exemplary screen shot of a user interface for selecting a user from a plurality of users, consistent with some disclosed embodiments.

By way of a non-limiting example, reference is made to FIG. 9 which illustrates an exemplary user interface 900 for selecting a user from a plurality of users, consistent with some disclosed embodiments. At least one processor (e.g., processor 102 in FIG. 1) may limit presenting user interface 900 to authorized users, such as an administrator or project manager. User interface 900 may include a search bar 902 permitting selection of a particular user from a list 904 of a plurality of users. At least one processor may receive a signal to access permission data associated with performance of an action by a user (e.g., in response to which at least one processor may present user interface 600 in the first mode of operation or user interface 700 in the second mode of operation) following receipt of a prior signal via user interface 900 indicative of a selection of the user from a plurality of available users (e.g., by selecting a user from list 904).

In some disclosed embodiments, at least one action is a single action. A single action refers to a specific or individual operation and/or task. For example, a single action may include editing a document, sending a message, or approving a workflow step. Specifying that the at least one action is a single action may permit for a more granular and focused permission management within the multi-layered permission hierarchy. This approach may enable system administrators to define and control access rights for very specific operations, enhancing security and providing more precise control over user capabilities within the collaborative software platform. For example, instead of granting broad permissions for "document management," at least one processor may define permissions for individual actions, such as to view, edit, or share a document. Such granularity may provide a more nuanced control for access privileges, permitting a user to view a document but not edit or share it. Such specificity in permission management may be particularly useful in scenarios where sensitive information is involved or where different team members have distinct roles and responsibilities within a project.

In some disclosed embodiments, a signal is received following receipt of a prior signal indicative of a selection of the single action from a plurality of available actions. A prior signal and a selection may be understood as described elsewhere herein. A plurality of available actions refers to a set of multiple operations, tasks, and/or functions that may be accessible and/or permissible for a user to perform within the collaborative software platform based on current permissions and/or context. For example, available actions may include creating new documents, editing existing files, sending messages, or generating reports. For instance, users may have access to a two-step process for accessing and displaying permission information related to a specific action. First, a user may select a particular action from a list of available actions within the collaborative platform (e.g., a prior signal). Following the selection, the user may click a button requesting to view permission data associated with the selected action. This approach may provide for more focused and context-specific permission management, particularly in complex collaborative environments with numerous possible actions. For instance, a user may first select the "edit document" action from a list of available actions in a project workspace to generate a prior signal. The user may then client a "View Permissions" or "Check Access" button associated with the edit document action to generate another signal indicative of a request to view the specific permission data related to editing documents. Such a two-step process may enhances a capability to provide detailed, action-specific permission information, facilitating more effective troubleshooting of access issues and improving user understanding of their rights within the collaborative platform. It may also improve security and/or privacy by ensuring that permission information is accessed intentionally and for specific actions, rather than providing a broad overview of all possible actions at once.

By way of a non-limiting example, in FIG. 8, at least one processor (e.g., processor 102 in FIG. 1) may receive a signal indicative of keystroke for changing a value of a status for an item (e.g., a single action) in board 802. By way of another non-limiting example, in FIG. 6, upon viewing a list of available actions in user interface 600, a user may select "edit" from restricted actions 616 using a mouse click. At least one processor may receive a signal indicative of the mouse click as a prior signal indicative of a selection of a single action (edit) from a plurality of available actions (e.g., create, edit, archive, and delete). Following the selection of the single action, the user may provide another signal (e.g., a second mouse click) requesting to access permission data associated with the edit action.

Some embodiments involve implementing at least one AI agent. An AI agent refers to a software component or system that utilizes artificial intelligence techniques to perform tasks, make decisions, or process information autonomously. For example, an AI agent may employ machine learning algorithms, natural language processing, or expert systems to analyze data and generate insights. In some disclosed embodiments, the at least one AI agent may analyze the multi-layered permission hierarchy to identify a current role for the user, the current role being associated with at least one of the permission levels in the multi-layered permission hierarchy attributable to restricting the at least one action. To analyze refers to examining, investigating, organizing, and/or interpreting data to extract insights, identify patterns, and/or support decision-making. Analyzing may additionally or alternatively involve determining and/or applying mathematical or statistical algorithms and/or correlations between data sets, identifying patterns and/or features (e.g., using artificial intelligence). A current role for a user refers to an active or assigned position, function, and/or set of responsibilities and/or privileges associated with a user within an organization or software system at a given time. For example, a current role may be "project manager," "content editor," or "system administrator," each with its own set of permissions and access rights. A role may set a maximum or ceiling for permissions granted to an entity assigned to the role. Actions and/or abilities permitted as a set of default permissions for a role may be removed for a particular entity assigned to the role, however actions and/or abilities above or beyond the ceiling for a role may not be granted. An owner of a resource (e.g., a board) may bypass permissions. Attributable refers to the ability to assign or trace a particular effect, outcome, and/or characteristic to a specific cause or source. For example, a restriction on accessing sensitive data may be attributable to a company-wide security policy implemented at a high level of the permission hierarchy. A current role associated with a permission level in a multi-layered permission hierarchy attributable to restricting an action refers to a role assigned to a user linked to a specific permission tier within the permission hierarchy or group that results in limiting an action. For example, roles such as 'viewer, 'guest', and/or 'junior analyst' may be associated with a restricted set of privileges denying users assigned those roles from being able to edit a document. The restriction may be applied through the role's association with specific permission levels, which prohibit editing operations to maintain security and/or uphold organizational policies. For instance, a user assigned to a "viewer" role may be permitted to access and read documents but may be prohibited from editing, deleting, and/or sharing documents, to ensure that only users with higher-level roles—such as "editor," "senior analyst," or "project manager"—can perform editing tasks. Such an approach may permit administrators to finely control who can modify content, reducing the risk of accidental or unauthorized changes and supporting compliance requirements within collaborative environments.

In some disclosed embodiments, at least one AI agent may generate a natural language explanation for the at least one restriction associated with performance of the at least one action by the user as a consequence of the current role. Natural language text may include everyday words, phrases, and sentences that people use to communicate, and may include content in emails, chat messages, and/or spoken commands. A natural language explanation refers to a description and/or clarification provided in human-understandable, conversational language that conveys information in an easily understandable manner. For example, a natural language explanation may translate technical permission rules into plain English statements that non-technical users may comprehend. A natural language explanation for the at least one restriction associated with performance of the at least one action by the user as a consequence of the current role refers to a description in everyday words or phrases providing one or more reasons why an action may be restricted due to a role assigned to a user. For example, if a user in a "junior analyst" role attempts to access sensitive financial data, the AI agent might generate an explanation: "Your current role as a junior analyst does not have permission to view financial reports. This restriction is due to the company-wide data protection policy (Level 1) and the finance department's access control rules (Level 3). To gain access, you need to be assigned to a senior analyst role or receive specific authorization from the finance team lead." Use of an AI agent to analyze the multi-layered permission hierarchy and generate natural language explanations may provide clear, user-friendly insights into complex permission structures. One or more AI agents may traverse the permission hierarchy, consider various factors such as user roles, organizational policies, and/or specific action restrictions to identify one or more root causes of access limitations. The root causes may be framed using natural language, permitting non-technical users to understand why some actions are denied. The generation of natural language explanations by an AI agent may demystify a complex and technical nature of permission systems. Instead of presenting users with cryptic error messages or technical jargon, at least one processor may provide clear, context-aware explanations that help users understand why they cannot perform certain actions and what factors contribute to these restrictions.

In some disclosed embodiments, an interactive GUI includes a natural language interface, and wherein the signal is indicative of a natural language query, and wherein the at least one AI agent is configured to process the natural language query to generate the natural language explanation for the at least one restriction associated with performance of the at least one action. A natural language interface refers to a user interface component that allows users to interact with hardware or software using everyday language rather than specialized commands or syntax. A natural language interface may include a chat box, a text box, and/or a microphone for receiving natural language input. For example, a natural language interface may enable users to type or speak queries such as "Why can't I edit this document?" instead of navigating through complex menu structures. A natural language query refers to a question and/or request formulated in everyday human language, as opposed to a non-natural structured query language or predefined command format. For example, a natural language query might be "What permissions do I need to create a new project?" or "Why am I unable to delete this file?" To process the natural language query refers to an act of analyzing, interpreting, and/or extracting meaning from a user's input expressed in natural language to determine the user's intent and formulate an appropriate response. For example, processing a natural language query may include parsing, tokenization, part-of-speech tagging, entity recognition, interpretation, and semantic analysis to extract meaningful information pertaining to the request. The at least one AI agent may user this information to traverse the multi-layered permission hierarchy, consider the user's current role and requested action, the relevant permission levels, and any associated restrictions to generate a comprehensive and easily understandable explanation why the action may be prohibited. Allowing requests to include natural language text may enhance user accessibility and flexibility by permitting users to describe a desired functionality using natural language rather than requiring specialized technical terms or formal specifications. Incorporating a natural language interface and enabling one or more AI agents to process natural language queries may enhance the user experience when interacting with a complex multi-layered permission system. Such a feature may allow users to inquire about their permissions and restrictions in a more intuitive and conversational manner, without requiring technical knowledge of the underlying permission structure.

For example, in response to a natural language query, "Why can't I approve expense reports?", an AI agent may process the query to identify the requested action (approving expense reports), check the user's current role and associated permissions, and examine the relevant levels of the permission hierarchy. The AI agent may apply the current role and associated permission to generate a response such as: "You currently don't have permission to approve expense reports because your role as a team member doesn't include financial approval rights. This restriction is set at the department level (Level 2) of our permission hierarchy. To gain this permission, you would need to be promoted to a team lead role or be granted specific financial approval rights by your department manager."

By way of a non-limiting example, in FIGS. 3-5, at least one processor (e.g., processor 102 in FIG. 1), may implement an AI agent (e.g., via AI module 312) for analyzing multi-layered permission hierarchy 400 and/or 500 to identify a current role for the user (e.g., contributor). In some embodiments, the AI agent may additionally access user data 314, permission rules 316, and/or RBAC policies 318 to identify the role. The current role (contributor) may be associated with contributor level 506 in multi-layered permission hierarchy 500 attributable to restricting the editing action. The AI agent may generate a natural language explanation (e.g., "you can't edit items not assigned to you" in board level permission 710 of FIG. 7) for the restriction associated with performance of the editing action by the user as a consequence of the contributor role.

In some disclosed embodiments at least one AI agent is configured to determine a resolution for the at least one restriction associated with performance of the at least one action, and present the resolution as a recommendation. A resolution for a restriction associated with an action refers to a solution, fix, and/or workaround that addresses and/or lifts the restriction, such that the action may be performed. For example, a resolution to a restriction for an action may include changing user permissions, modifying system settings, and/or suggesting alternative actions to achieve a desired outcome. Determining a resolution may include identifying a solution to a problem. It may include analyzing a problem and/or restriction and identifying potential solutions or ways to overcome the limitation, accessing one or more data structures with known solutions to problems, applying machine learning to similar problems, and/or testing and/or simulating one or more candidate solutions to identify which solutions are effective. may include evaluating various options, considering their implications, and selecting the most appropriate course of action based on predefined criteria or rules. A recommendation refers to a suggestion, advice, and/or guidance to solve a problem support decision-making. For example, a recommendation may propose a specific course of action, such as requesting a role change or seeking approval from a supervisor, to resolve a permission-related issue. Utilizing an AI agent to determine resolutions for permission restrictions and present them as recommendations may introduce a proactive and solution-oriented approach to a permission management system. Beyond merely providing explanations to restrictions, one or more AI agents may actively assist users in overcoming permission-related obstacles.

For instance, when an AI agent identifies a restriction preventing a user from performing a desired action, the AI agent may analyze the multi-layered permission hierarchy, the user's current role, the user's job responsibilities, a history of similar requests and/or actions performed actions by the user and their outcomes, the sensitivity of the requested action, the specific requirements for the requested action, and/or the organization's policies for permission escalation. The AI agent may additionally analyze resolutions to similar requests to determine the most appropriate and/or likely-to-success resolutions. Based on this analysis, the AI agent may determine potential resolutions to permit the user to perform the action while adhering to the organization's security policies and permission structure, and present one or more potential resolutions as natural language text. For instance, if a user attempts to access a restricted project folder, an AI agent may determine multiple possible resolutions and present them as recommendations: "To gain access to the Project X folder, consider the following options: 1) Request temporary access from the project manager (estimated approval time: 1-2 hours), 2) Apply for the 'Project Contributor' role, which includes access to all project folders (requires department head approval), or 3) Schedule a meeting with your team lead to discuss your need for access and potential role adjustments."

In some disclosed embodiments, a resolution includes an assignment of a new role for a user to replace a current role. An assignment of a role for a user refers to designating, associating, and/or attributing a particular role (e.g., a status and/or set of privileges), a responsibility, and/or set of permissions to an individual within an organization. Assigning a new role may include modifying one or more settings of a user profile to reflect a new position or responsibilities. A new role refers to a different position, job title, status, and/or or set of responsibilities, privileges, and associated permissions that a user may be given within an organization or system. For example, a new role may include "senior developer," "project manager," or "department lead," each with its own specific set of access rights, privileges, and permissions. A new role may permit actions that were previously restricted to the user under the previous role. To replace a current role refers to substituting, updating, and/or changing an existing status and/or title with a new status and/or title. Replacing a current role may include changing responsibilities, privileges, permissions, and/or access rights. For example, replacing a user's current role of "junior analyst" with "senior analyst" may grant additional permissions and responsibilities associated with the new, higher-level position. The capability of assigning a new role via an AI agent to resolve a restriction may provide a comprehensive solution to permission-related issues when adjustments to individual permissions may be insufficient or inefficient. When determining to assign a new role, an AI agent may consider the user's current responsibilities, the specific actions they are attempting to perform, permission policies, and the overall structure of the multi-layered permission hierarchy. The AI agent may analyze the available roles within the organization to identify a particular role that aligns with the user's needs while maintaining appropriate security and access control.

For example, if a user in a "content creator" role frequently requires access to analytics data but is consistently restricted, an AI agent may present a recommendation: "Based on your recent access attempts and job responsibilities, we recommend assigning you the new role of 'Content Strategist.' This role includes all the permissions of your current 'Content Creator' role, plus access to analytics dashboards and report generation tools. This change would resolve your current restrictions and better align with your evolving job functions. To proceed with this role change, please contact your department manager for approval." By suggesting role changes as a resolution, an AI agent may provide a more holistic approach to permission management, streamline workflows and reduce the need for frequent, individual permission adjustments, leading to improved efficiency, better alignment of user roles with actual responsibilities, and a more coherent overall permission structure within an organization.

In some disclosed embodiments, the new role resolves at least two of the identified permission levels in the multi-layered permission hierarchy attributable to restricting at least one action. Resolves may be understood as described elsewhere herein. At least two identified permission levels refers to multiple distinct tiers or categories within the multi-layered permission hierarchy determined to be relevant for a particular user and/or action. For example, at least two permission levels may include global permissions, role-based permissions, project-specific permissions, and/or individual user permissions. Resolving multiple identified permission levels through the assignment of a new role may permit addressing complex permission scenarios efficiently when permission restrictions are associated with multiple layers of a permission hierarchy. This may provide a comprehensive solution when permitting an action requires adjustments to multiple layers in the hierarchy. When an AI agent suggests a new role as a resolution to a permission denial, the AI agent may consider the various permission levels contributing to the current restrictions. The AI agent may select a new to simultaneously address multiple permission-related issues, potentially leading to a more coherent and efficient permission management, and reducing a need for multiple, separate permission adjustments.

For example, if a user in a "junior analyst" role is restricted from both accessing financial reports (due to a department-level permission) and editing project timelines (due to a project-specific permission), an AI agent may recommend a new "senior project analyst" role. This new role may resolve both permission levels simultaneously, granting the user access to financial reports and the ability to edit project timelines. As a result, the user's capabilities may be expanded in a way that aligns with their evolving responsibilities, while maintaining appropriate security measures across the platform.

By way of a non-limiting example, in FIG. 7, the at least one AI agent may determine a resolution for the restriction associated with performance of the editing action, such as by changing the role of the user to "member". The AI agent may present the resolution as a recommendation 720 (e.g., "do you want to be upgraded to member?"), for instance, in response to receiving a signal indicative of a selection of CTA 718. In some embodiments, the resolution includes an assignment of a new role (e.g., "member") to replace the current role (e.g., "contributor"). In some embodiments, the new "member" role may resolve at least two of the identified permission levels in multi-layered permission hierarchies 400 and/or 500 attributable to restricting the editing action, such as by resolving board level permission 710, workspace level permission 708, and product level permission 706 corresponding to board level 408, workspace level 406, and product level 404 of hierarchy 400. In some embodiments, in the second mode the GUI may present CTAs associated with one or more restricting permission levels (e.g., CTAs 712-718 of FIG. 7), enabling a user to request an override or change at a selected permission level.

In some disclosed embodiments determining a resolution includes evaluating a plurality of candidate resolutions using scoring model in accordance with at least one privilege policy. Candidate resolutions refers to potential solutions and/or approaches proposed to address a specific problem, decision, or restriction. For example, candidate resolutions for a permission-related issue may include role changes, temporary access grants, and/or modifications to specific permission levels. A scoring model refers to a methodology to evaluate and/or rank different options and/or solutions based on predefined criteria and/or metrics. For example, a scoring model may assign numerical values to differing factors affected by each resolution, such as security impact, user productivity, and/or administrative overhead to determine the most suitable resolution. A least privilege policy refers to a security principle that advocates for granting users a minimal level of access rights (e.g., the fewest privileges) necessary to perform their required tasks. In some embodiments, a least privilege policy may only include permissions that a user needs to perform their defined tasks, and may exclude any privileges not needed to perform their defined tasks. In some embodiments, a number of permissions granted to a user in a least privilege policy that are not required by the user to perform their defined tasks is below a threshold number and/or below a threshold access level. For example, under a least privilege policy, a user might be given read-only access to certain documents rather than full edit rights if their job only requires them to review the content. Evaluating candidate resolutions using a scoring model in accordance with a least privilege policy may provide a security-conscious approach to resolving permission-related issues while addressing user needs. Such an approach maintain a balance between granting necessary access while minimizing potential security risks. When determining the most appropriate resolution for a permission restriction, an AI agent may generate multiple candidate resolutions. Such resolutions may include role changes, specific permission adjustments, and/or combinations thereof. The AI agent may apply a scoring model to evaluate each candidate resolution based on multiple factors, such as the extent to which it resolves the user's immediate needs, an alignment with organizational security policies, and/or a potential impact on overall system security. The least privilege policy may provide a guiding principle in the evaluation process, ensuring that the chosen resolution grants the user sufficient access to perform their tasks without unnecessarily expanding their permissions beyond what is required. This may maintain the integrity of the multi-layered permission hierarchy while addressing user needs efficiently. For example, if a user requires access to a specific project document, an AI agent may generate candidate resolutions including: 1) granting full project access, 2) providing document-specific edit rights, or 3) offering temporary view-only access. The AI agent may apply a scoring model to evaluate these options, considering factors such as the user's role, the document's sensitivity, and the duration of the required access. Adhering to the least privilege policy, the AI agent may score the temporary view-only access higher if it sufficiently meets the user's immediate needs without granting excessive permissions.

By way of a non-limiting example, in FIGS. 3-5, at least one processor (e.g., processor 102 in FIG. 1) in conjunction with AI module 312 may determine the resolution by evaluating a plurality of candidate resolutions using scoring model in accordance with a least privilege policy. For instance, at least one processor may evaluate 1) assigning additional items to the user to permit the user to edit those items as a 'contributor', 2) modifying specific permission settings in board 802, 3) granting temporary access for the particular items, or 4) suggesting the user request item-specific access from a supervisor. The at least one processor may score each of these candidate resolutions to determine which resolution resolves the restriction while granting a minimal number of privileges to the user. For instance option 4 (request item-specific access from a supervisor) may permit the user to edit board 802 under a least privilege policy.

Some disclosed embodiments involve visually indicating which of the at least one action is associated with the at least one restriction or which of the identified permission levels restrict the user from performing the particular action prevents an attempt by the user to perform the at least one action, thereby conserving processing power. Visually indicating may be understood as described elsewhere herein. Preventing an attempt to perform an action refers thwarting, hindering, and/or stopping a user from initiating and/or executing an action that would ultimately be unsuccessful and/or unauthorized. For example, preventing an attempt might involve disabling buttons, graying out menu options, or displaying warning messages before an action is taken. Preventing an attempt to perform an action may additionally include interrupting a process, removing a process from a task schedule, and/or lowering a priority for a scheduled process. Conserving processing power refers to efficient use of computational resources by reducing unnecessary operations and/or calculations. For example, conserving processing power may involve optimizing, streamlining, and/or consolidating tasks, caching frequently accessed data, and/or avoiding redundant checks and validations. Visually indicating restrictions and permission levels may thus serve a dual purpose of informing users and optimizing system performance.

By clearly displaying which actions are restricted or which permission levels are denied, at least one processor may discourage attempts of non-permissible actions thereby sparing use of computing resources associated with performances of those actions, leading to improved resource utilization. Visually indicating restrictions or limiting permission levels, may provide users with immediate feedback about access rights, permitting users to readily understand what actions they may and may not perform without attempting to execute restricted operations. As a result, unnecessary attempts to perform unauthorized actions, which may trigger permission checks, error handling processes, and potentially complex rollback procedures may be prevented. By preventing such attempts, at least one processor may conserve processing power and memory that would have been expended on handling unauthorized requests. This conservation of resources may be particularly significant in large-scale collaborative platforms where numerous users are interacting with the system simultaneously. The reduction in unnecessary processing may lead to improved overall system performance, faster response times, and a more scalable architecture.

For example, in a project management interface, actions that a user is not authorized to perform (such as deleting a critical document or modifying a locked timeline) may be visually indicated with a lock icon or grayed-out buttons. When a user sees these visual cues, the user may be less likely to attempt these restricted actions. Consequently, at least one processor may be spared the need to process requests for such action, e.g., by checking permissions, generating error messages, and/or logging unauthorized attempts. In a collaborative platform serving thousands of users, such prevention of unnecessary processing may significantly reduce a computational load of system servers, leading to more efficient operation and potentially reducing infrastructure costs.

By way of a non-limiting example, in FIGS. 6 and 7, visually indicating via restricted actions 616 that creating, editing, archiving, and deleting items are restricted, or visually indicating via account level permissions 704 and product level permissions 706 restrict the user from attempting to perform any of the restricted actions, which may conserve processing power of device 200 and/or 202 (see FIG. 2).

Some disclosed embodiments involve enabling transitioning between the first mode of operation and the second mode of operation in response to receiving an additional signal via the interactive graphical user interface. Transitioning refers to changing, transferring, and/or shifting from one state, condition, or mode to another. For example, transitioning might involve switching between different views, layouts, and/or functionality sets in a software application. An additional signal refers to a subsequent signal, as described elsewhere herein. An additional signal may include an input, command, and/or event received after an initial interaction. For example, an additional signal may result from a user clicking a button, selecting a menu option, or performing a specific gesture within a user interface. Enabling transitioning between the first and second modes of operation in response to an additional signal via the interactive GUI may provide users with flexibility to dynamically adjust a level of detail and perspective on permission information. Such a feature may enhance an ability to cater to different user needs and scenarios within a complex multi-layered permission hierarchy. For instance, first mode of operation may provide a broader overview of permissions, showing which actions are permitted or restricted for a user. The second mode may provide a more detailed, higher resolution (e.g., granular) view, indicating which specific permission levels are responsible for allowing or restricting particular actions. By allowing users to transition between the two modes, at least one processor may accommodate both quick permission checks and in-depth analysis of permission structures. When a user interacts with the GUI to request a transition between modes, at least one processor may respond by reorganizing and representing the permission data to suit the newly selected mode. Such a dynamic transition may permit users to drill down into permission details when needed or zoom out for a higher-level view, all within the same graphical user interface.

For example, a user may begin in the first mode to view a list of actions with visual markers indicating which actions are permitted (e.g., green checkmarks) and which actions are denied (e.g., red X's). Upon encountering a restricted action, the user may click a "Details" button or select a "Show Permission Levels" option. This additional signal may trigger a transition to the second mode, where the GUI may display a breakdown of the permission levels affecting that specific action. The user may view which levels (e.g., global policies, role-based permissions, project-specific rules) are contributing to the restriction, providing valuable context for understanding and potentially addressing the limitation.

By way of a non-limiting example, in FIGS. 6-7, at least one processor (e.g., processor 102 in FIG. 1) may enable transitioning between the first mode of operation (e.g., user interface 600 FIG. 6) and the second mode of operation (e.g., user interface 700 in FIG. 7) in response to receiving an additional signal via the interactive graphical user interface. For instance, clicking overview tab 602 may cause at least one processor to present user interface 700 (the second mode of operation), and clicking advanced tab 604 may cause at least one processor to present user interface 600 (the first mode of operation).

The present disclosure addresses a significant technological problem in existing collaborative software platforms, namely the difficulty in managing and presenting complex multi-layered permission structures in a user-friendly and efficient manner. Traditional systems often struggle to provide clear visibility into permission hierarchies, leading to confusion, reduced productivity, and potential security risks as users may not fully understand their access rights or restrictions. Disclosed embodiments implement a sophisticated multi-layered permission hierarchy linked to a centralized authorization manager. This structure allows for granular control over user permissions across various levels of the collaborative platform by implementing advanced traversal algorithms to efficiently navigate a complex hierarchy, and identifying and collecting relevant permission data for specific user actions. The disclose embodiments modify and improve computer operation by introducing a dual-mode interactive graphical user interface (GUI) for presenting permission information. In the first mode, at least one processor visually indicates permitted and restricted actions, while the second mode, at least one processor provides a detailed breakdown of permission levels affecting specific actions. This approach reconfigures how permission data may be processed and displayed, moving beyond simple binary access controls to a more nuanced and context-aware presentation. As a result, disclosed embodiments achieve measurable improvements in both user experience and system performance. The visual indication of restrictions prevents unnecessary attempts to perform unauthorized actions, thereby conserving processing power and reducing server load. For example, in a large-scale deployment with 10,000 users, this optimization could lead to a 30% reduction in permission-related server requests, significantly improving overall system responsiveness.

The implementation of AI agents for analyzing the permission hierarchy and generating natural language explanations further enhances disclosed capabilities. Such AI agents may process complex permission structures and provide user-friendly insights, reducing the cognitive load on users and administrators. For instance, an AI agent may analyze a user's permission conflicts and suggest role adjustments that resolve multiple issues simultaneously, potentially reducing permission management time by up to 50% compared to manual methods. The capability to transition between operational modes in response to user input demonstrates a technical improvement in user interface design. This dynamic adjustment of information presentation may permit users to efficiently navigate complex permission structures without overwhelming them with unnecessary details, and accommodate both quick permission checks and in-depth analysis within the same interface, improving user productivity and reducing the likelihood of permission-related errors.

Figure 10:
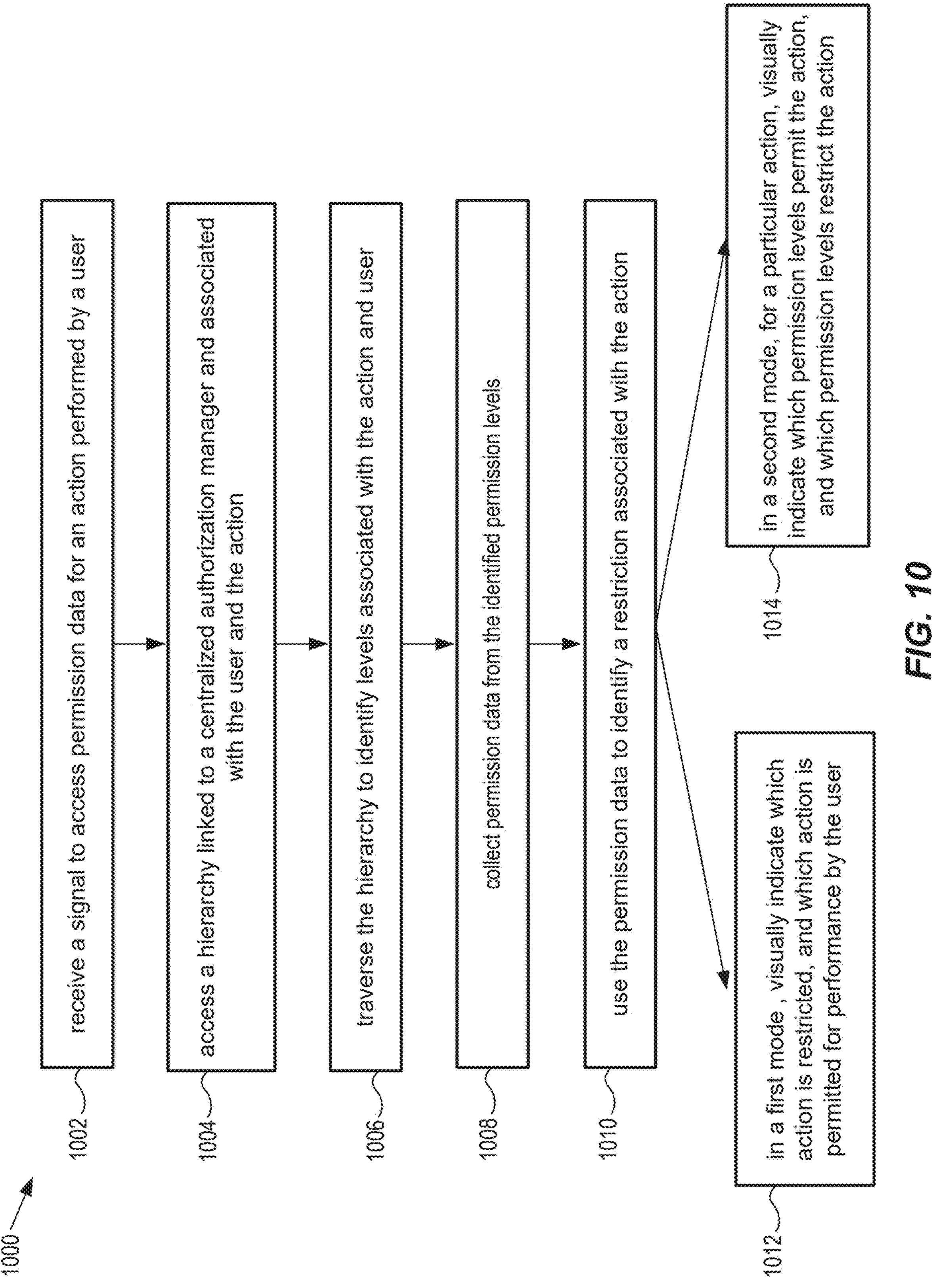
FIG. 10 is a flowchart of example process for providing an interactive graphical user interface (GUI) to enable presentation of multi-layered permissions in a collaborative software platform, consistent with some disclosed embodiments of the present disclosure.

FIG. 10 is a flowchart of example process 1000 for providing an interactive graphical user interface (GUI) to enable presentation of multi-layered permissions in a collaborative software platform, consistent with embodiments of the present disclosure. In some embodiments, process 1000 may be performed by at least one processor (e.g., processor 102 in FIG. 1) to perform operations or functions described herein. In some embodiments, some aspects of process 1000 may be implemented as software (e.g., program codes or instructions) that are stored in a memory (e.g., memory 104) or a non-transitory computer readable medium. In some embodiments, some aspects of process 1000 may be implemented as hardware (e.g., a specific-purpose circuit). In some embodiments, process 1000 may be implemented as a combination of software and hardware. It should be understood that the steps of process 1000 may be performed in any suitable order and may be carried out by one or more processors or other relevant entities within the collaborative software platform.

Process 1000 may include a step 1002 of receiving a signal to access permission data associated with performance of an editing action by a user of the collaborative software platform. By way of a non-limiting example, in FIG. 3, at least one processor (e.g., processor 102 in FIG. 1) may receive a signal to access permission data associated with performance of at least one action by a user of collaborative software platform 300. For instance, the signal may be received via an introductory web page presenting user account settings, or while attempting to edit board 802 in FIG. 8.

Process 1000 may include a step 1004 of accessing a multi-layered permission hierarchy associated with the user and the at least one action, wherein the multi-layered permission hierarchy is linked to a centralized authorization manager of the software platform. By way of a non-limiting example, in FIG. 3, at least one processor (e.g., processor 102 in FIG. 1) may access multi-layered permission hierarchy 320 associated with the user and the at least one action. Multi-layered permission hierarchy may be linked to centralized authorization manager 310 of the software platform. By way of another non-limiting example, in FIGS. 4-5, at least one processor may access multi-layered permission hierarchies 400 and/or 500.

Process 1000 may include a step 1006 of traversing the multi-layered permission hierarchy to identify a plurality of permission levels in the multi-layered permission hierarchy associated with the performance of at least one action by the user. By way of a non-limiting example, in FIGS. 4-5, at least one processor (e.g., processor 102 in FIG. 1) may traverse multi-layered permission hierarchies 400 and/or 500 to identify a plurality of permission levels in multi-layered permission hierarchies 400 and/or 500 associated with the performance of an editing action by the user.

Process 1000 may include a step 1008 of collecting the permission data from the identified permission levels associated with the performance of at least one action by the user in the multi-layered permission hierarchy. By way of a non-limiting example, in FIGS. 4-5, at least one processor (e.g., processor 102 in FIG. 1) may collect permission data from contributor level 506 and from board level 408 in multi-layered permission hierarchies 500 and 400, respectively, upon identifying these levels as being associated with the user and the performance of the editing action.

Process 1000 may include a step 1010 of using the permission data to identify at least one restriction associated with performance of the at least one action. By way of a non-limiting example, in FIGS. 4-5, at least one processor (e.g., processor 102 in FIG. 1) may identify restrictions associated with account level 402, product level 404, workspace level 406, and board level 408 restricting the user from editing board 802 (FIG. 8).

Process 1000 may include a step 1012 of 1012, in a first mode of operation, visually indicate which of the at least one action is associated with the at least one restriction thereby being restricted for performance by the user, and which of the at least one action is unassociated with the at least one restriction thereby being permitted for performance by the user. By way of a non-limiting example, in FIG. 6, in a first mode of operation, at least one processor (e.g., processor 102 in FIG. 1) may display user interface 600 visually indicating that creating, editing non-assigned items, archiving, and deleting are associated with restrictions thereby being restricted for performance by the user, and may visually indicate that viewing and editing assigned items are unassociated with restrictions thereby being permitted for performance by the user.

Process 1000 may include a step 1014 of 1014, in a second mode of operation, for a particular action of the at least one action, visually indicate which of the identified permission levels permit the user to perform the particular action, and which of the identified permission levels restrict the user from performing the particular action. By way of a non-limiting example, in FIG. 7, in a second mode of operation, for editing non-assigned items, at least one processor (e.g., processor 102 in FIG. 1) may present user interface 700 visually indicating workspace level permission 708 and board level permission 710 permitting the user to edit the item, and account level permission 704 and product level permission 706 restricting the user from performing the editing action.

Managing permissions for multiple tenants of a collaborative software platform may pose challenges due to varying needs and customizations for each tenant. Traditional permission models based on rigid, predefined roles and access control lists may lack the flexibility required to accommodate the complexity of dynamic and evolving collaborative environments, resulting either in overly restrictive or overly permissive access policies. Embodiments are disclosed for an adaptable permission framework permitting seamless integration with extensions and third-party applications while maintaining robust security measures.

Some disclosed embodiments involve managing extensible permissions in a multi-tenant native collaborative software platform. A tenant refers to a logically isolated entity in a shared software environment. A tenant may include a user, an account, a customer, a group, and/or any other type of organizational boundary permitting collaboration alongside security and governance within a software platform. A tenant maybe logically isolated from other tenants, and may be administered independently, permitting differing tenants to share application code, infrastructure, and/or resources without being visible to other tenants. A tenant may be associated with tenant-specific users, accounts, rules, permissions, preferences, settings, and/or policies. A multi-tenant collaborative software platform refers to a collaborative software platform (as described and exemplified elsewhere herein) capable of hosting an instance of a software application serving multiple tenants concurrently. A multi-tenant platform may isolate each tenant's data and configurations while sharing an underlying infrastructure and codebase. Some examples of a multi-tenant collaborative software platform may include SalesForce®, Slack®, Google Workspace®, MicroSoft 365®, Shopify®, and Monday®. A native collaborative software platform refers to a software environment in which core capabilities (e.g., collaboration, multi-tenancy, permissions, real-time interaction, extensibility) may be designed into a platform architecture and data model from the outset, rather than added as external layers or integrations. A native collaborative software platform may provide a seamless and/or cohesive user experience for accessing core functionalities, without having to rely on integrations with external tools and/or services. Managing refers to coordinating, controlling, organizing, and/or administering resources, data, and/or operations. Permissions refer to access controls, rules, scopes, and/or authorizations. Permissions may be used to define and/or enforce actions a user, role, and/or tenant may perform on platform resources, data, and/or collaborative objects. For example, permissions may govern access to data and/or shared content, allowed actions, scope of collaborations between different user, roles, and/or tenants, and/or enforcement of policies (e.g., for security, and/or isolation). Extensible permissions refers to flexible and/or customizable permissions. Extensible permissions may permit addition, modification, and/or expansion of permission rules beyond a predefined set of permissions (as described elsewhere herein). For example, extensible permissions may permit defining custom roles, granular access levels, and/or integration of third-party permission logic within a permission hierarchy for a software platform. Managing extensible permissions in a multi-tenant native collaborative software platform may include, for example, administering tenants, users, roles, and/or access controls; configuring tenant-specific policies, data scopes, and/or feature entitlements; orchestrating collaborative interactions (e.g., shared documents, real-time updates, conflict resolution) across users within a tenant; monitoring usage, performance, and/or compliance across shared infrastructure; and/or enforcing isolation, security, and service-level guarantees between tenants.

Figure 11:
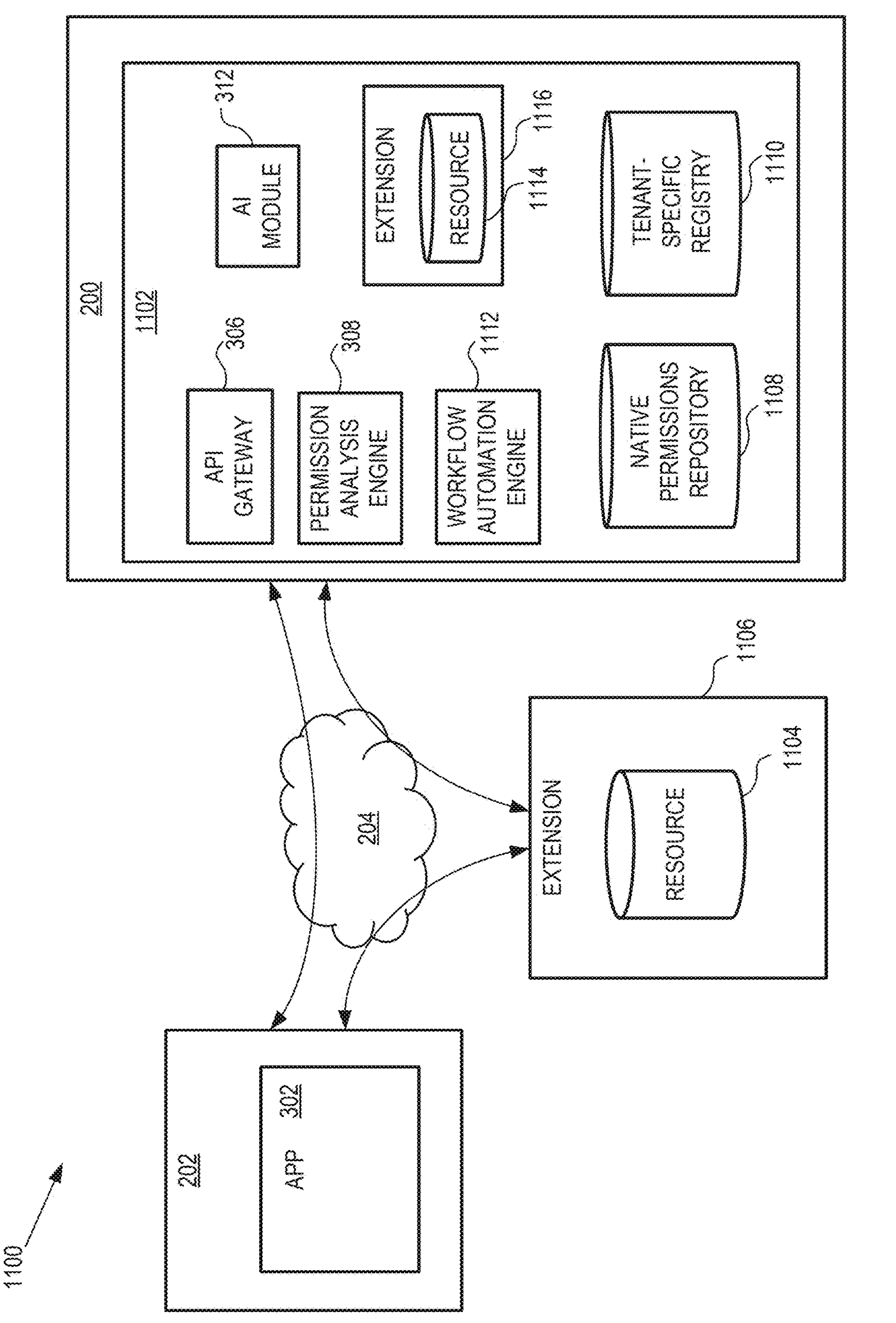
FIG. 11 is an exemplary schematic diagram of a multi-tenant collaborative software platform for managing extensible permissions, consistent with some disclosed embodiments.

By way of a non-limiting example, reference is made to FIG. 11, which is an exemplary schematic diagram of a system 1100 for managing extensible permissions in a multi-tenant native collaborative software platform 1102, consistent with some disclosed embodiments. In some embodiments, FIGS. 3 and 11 may show differing aspects of the same underlying system. Thus, elements from FIG. 3 may be included in FIG. 11 and the reverse, however this is not required. At least one server 200 may provide backend services associated with platform 1102 to at least one client 202. Such services may include, for example, data models, APIs, automation engines, permission systems, AI agents, tenant-management and the like. At least one server 200 may manage extensible permissions for client 202 for accessing a resource 1104 and/or 1114 associated with one or more tenant-specific extensions 1106 and/or 1116, respectively. For instance, tenant-specific extension 1106 may be a third-party customer relations management (CRM) application for handing sales data and resource 1104 may store sensitive sales data. Extension 1116 may be a customizable workflow automation internal to platform 1102 and resource 1114 may include be a user directory storing user identifiers and associated roles and/or groups.

Client 202 may have a software application 302 installed thereon that may interact with collaborative software platform 1102 via API gateway 306 and may require access to resource 1104 and/or resource 1114. For example, software application 302 may include a board (e.g., board 802 in FIG. 8) native to platform 1102. Board 802 may be integrated with tenant-specific extension 1106 (e.g., a third-party CRM application), external (e.g., non-native) to platform 1102 permitting sensitive sales data from resource 1104 to be incorporated into board 802. Board 802 may additionally be integrated with an extension 1116 (e.g., an internal automation) permitting resource 1114 to be incorporated into board 802. A user of software application 302 may attempt to perform an operation on data stored in resource 1104 and/or 1114 while interacting with board 802.

Some disclosed embodiments involve maintaining a permission repository for a native collaborative software platform. Maintaining refers to the act of keeping something in a desired state or condition over time. It may include storing, protecting, updating, monitoring, and/or backing up to preserve the integrity and/or performance of a system. Maintaining may include adding new entries to a data repository, updating existing information in a database, removing outdated data, organizing data, and/or ensuring the integrity and consistency of stored information. A permission repository refers to a data structure dedicated to storing information associated with controls, rules, restrictions, policies, scopes, and/or authorizations. It may be implemented as a database, a graph data structure, and/or another data storage mechanism permitting efficient storage and retrieval of permission-related information. For example, a permission repository may contain user roles (e.g., admin, member, guest), resource types (e.g., workspaces, boards, documents), associated access rights and/or restrictions, one or more permission hierarchies and/or any other data relevant to managing permissions in a multi-tenant collaborative platform. Maintaining a permission repository for a native collaborative software platform may include storing, updating, and organizing information related to user roles, access rights, and permission rules, preserving integrity of permission data, and/or supporting default and/or customizable access policies to accommodate evolving needs.

In some disclosed embodiments, a permission repository includes native logic for handling native permissions. Native logic refers to a set of built-in and/or inherent rules, policies, reasoning, inferences, computations, and/or decision-making processes. For example, native logic may include predefined permission structures and/or hierarchies (e.g., defining permission dependencies and/or inheritance), default permission settings and/or policies (e.g., for security, authorization, and/or data isolation), and/or access-control algorithms. In some embodiments, the native logic may include immutable and/or unchangeable logic for the platform, and may be shared globally across the platform and may be applied to multiple (e.g., all) tenants. For instance, a native rule may stipulate that administrators may delete items, while group members may only view boards. Native logic may include logic governing permissions for the multi-tenant collaborative platform, and/or logic governing permissions for a specific application hosted thereon. Native permissions refers to permissions (as described elsewhere herein) that may built-in and/or inherent to a software platform. Native permissions may be integrated withing a design and/or architecture of a software platform to define permitted access flows. Handling native permissions refers to managing, enforcing, and/or resolving access control decisions based on default and/or built-in permission rules of a software platform. For example, handling native permissions may include checking a user's role against predefined access levels, applying default security policies to resources, and/or executing built-in logic to determine if a requested action is permitted. A permission repository may serve as a centralized store for default permission rules and policies governing how different tenants and/or users may interact with differing resources and/or functionalities within a collaborative environment. Native logic may form a baseline set of rules for handling permissions to ensure consistency in applying base-level permissions across a platform while allowing for customization at the tenant level. At least one processor may apply a native rule universally across a platform unless the native rule is overridden by a tenant-specific customization. Storing native permissions in a permission repository may ensure these remain available and up-to-date across the platform.

Some disclosed embodiments involve maintaining a tenant-specific logic registry configured to store non-native logic associated with a tenant-specific extension. A tenant-specific logic registry refers to a dedicated data structure for containing rules, policies, reasoning, inferences, computations, and/or decision-making processes applicable to a particular tenant within a multi-tenant software platform. A tenant-specific logic registry may store custom and/or bespoke permission rules, workflow definitions, and/or data processing logic applicable to a specific tenant. It may serve as a separate, isolated storage space for storing custom logic for a specific tenant, ensuring that customizations for one tenant do not interfere with or impact operations of other tenants sharing the same platform infrastructure. A tenant-specific logic registry may be implemented using a data structure, a data pool, a relational and/or graph database, and/or any other type of organization of data. A tenant-specific extension refers to a customization, add-on, and/or modification to a set of core functionalities provided by a multi-tenant software platform. A tenant-specific extension may customize and/or add one or more functionalities internal and/or external to the software platform. For instance, it may include definitions at an account level that are different than a set of baseline definitions for the platform. A tenant-specific extension may refer to any component added to an account, including internal and/or external applications and/or resources available via the collaborative platform. A tenant-specific extension may augment and/or expand functionalities available to a particular tenant, while operating within an architecture of the platform and respective tenant isolation and governance controls. For example, a tenant-specific extension may include a custom user interface, integrations with internal and/or external systems, specialized data processing for a specific use case, and/or a custom role that is not defined on the platform.

In some embodiments, a tenant-specific extension may be associated with a third-party platform and/or application and may be selected by a particular tenant for integration within the software platform. This integration may enable the tenant to seamlessly access and utilize external resources provided by the extension directly from within the collaborative software environment. Some examples of tenant-specific extensions associated with third-party platforms that may be integrated with a board may include Google Drive®, DropBox®, Slack®, OneDrive®, SharePoint®, Gmail®, Jira®, GitHub®, Zoom®, DocuSign®, and Zapier®. For instance, linking an email account to a board hosted on collaborative platform may permit a user to access emails from within the board. In some embodiments, a tenant-specific extension may add to an account, a new resource undefined by baseline definitions associated with the platform, e.g., using an AI-assistant and/or vibe coding. At least one processor may save rules and/or access control policies for a tenant-specific extension in a tenant-specific registry.

In some embodiments, a tenant-specific extension may be associated with the collaborative software platform, permitting integration of differing applications offered by the same platform. Some examples of tenant-specific extensions that may be integrated with a board and hosted by the same collaborative platform may include a Sprint View® (e.g., for managing workflows directly from a board), Notes® (e.g., for scheduling and recording contextual notes tied to board items), Power Calendar® (e.g., embedding schedules from items in a board), a spreadsheet view for a board, a dashboard widget, automation recipes, another (i.e., different) board, and a QR item tracker (e.g., for item tracking).

Non-native logic refers to rules, policies, reasoning, inferences, computations, and/or decision-making processes that are not part of a built-in functionality of a software platform. Non-native logic may be added and/or defined by tenants, users, administrators, and/or third-party developers to extend and/or modify a platform's behavior. For example, non-native logic may include custom permission rules, extensions, overrides, data validation checks, application-specific logic, and/or process automations specific to needs for a single tenant and/or user. Non-native logic may include logic native to an external (e.g., third-party) application and/or platform. Non-native logic may be mutable (e.g., changeable) and may be isolated for each tenant. By way of example, a logic registry for a specific tenant may store a non-native rule stating, "Permit access to an external financial database only from a specific IP address and during business hours." Such a rule may include non-native logic associated with a third-party financial database, and which may be applied when attempting to access the financial databased from the collaborative software platform. Another non-native rules may stipulate "The CRM App denies deletion for Junior users," or "Marketing Team can view the Budget Board." By maintaining a separate registry for non-native logic, at least one processor may manage and apply tenant-specific customizations without modifying core platform code and/or logic, and avoid affecting other tenants.

To store refers to save, retain, hold, and/or maintain data or information for future access. Storing data may include backing up, updating, caching, organizing, encrypting, decrypting, and/or performing any other data operation to ensure the data is available for subsequent access. When installing, linking, and/or configuration an extension with an application hosted on a multi-tenant collaborative software platform (e.g., during setup time), at least one processor may inject one or more non-native rules associated with the extension (e.g., "Junior-level users cannot delete records from the extension database") into a tenant-specific logic registry maintained by the platform. The non-native rules may be received with a custom permission definition via a permissions API exposed by the collaborative software platform. The custom permission definition may include a JSON blueprint with instructions for incorporating the non-native rules into the tenant-specific logic registry for subsequent retrieval and enforcement during runtime. At least one processor associated with the platform may process the custom permission definition and store the non-native rules in the tenant-specific logic registry as non-native logic for subsequent retrieval and application.

By way of a non-limiting example, in FIG. 11, at least one processor (e.g., processor 102 in FIG. 1) may maintain a native permission repository 1108 for collaborative software platform 1102. Native permission repository 1108 may include native logic for handling native permissions for platform 1102. For instance, the native logic may include permission rules and/or preferences associated with board 802, e.g., "Any user with 'Member' status can delete items on boards they have access to." In addition, at least one processor may maintain a tenant-specific registry 1110 for storing non-native logic associated with tenant-specific extension 1106. Upon installing, configuring, and/or integrating tenant-specific extension 1106 with native application 302 (e.g., prior to runtime), at least one processor associated with extension 1106 may automatically inject non-native logic associated with resource 1104 into tenant-specific logic registry 1110 (e.g., without requiring actions by the user of application 302). The non-native logic may include permission rules and/or preferences associated with resource 1104, e.g., "Junior Sales Reps must NEVER be able to delete a Lead, even if they are full Members of the workspace." Thus, a gap may exist between the native logic for platform 1102 and the non-native logic for resource 1104 associated with tenant-specific extension 1106, e.g., native platform 1102 may not have a definition for a "Junior Sales Rep" or a built-in protection for leads, leading to ambiguity whether or not data may be deleted. Without a system to override the native logic, the native rule may override the non-native rule, potentially putting data stored in resource 1104 at risk. In some embodiments, collaborative software platform 1102 may include an extension 1116 associated with a resource 1114 that may be integrated with software application 302. Logic associated with extension 1116 may be stored in tenant-specific logic registry 1110 and/or native permission repository 1108.

Some disclosed embodiments involve exposing, within a native platform, at least one permissions API including at least one permission endpoint for receiving a custom permission definition associated with the tenant-specific extension. An Applications Programming Interface (API) refers to a set of rules and/or protocols permitting different software applications and/or systems to communicate and/or interact with each other in a standardized and/or controlled manner. A permissions API refers to one or more programmatic interfaces and/or protocols for managing, querying, and/or modifying access control rules within a software system. A permission endpoint refers to a Uniform Resource Locator (URL) and/or access point within an API dedicated to handling permission-related operations and/or requests. A permissions API may include one or more endpoints, for example, to create new roles, assign permissions to users, update permission logic, and/or check access rights for specific resources. For instance, a permission endpoint may include a REST API route that accepts requests to create, read, update, and/or delete permission rules. A permissions API may include multiple endpoints to support various permission-related operations. For example, a permissions API may include differing endpoints for querying current permissions, modifying existing rules, and evaluating access requests based on custom logic. Each endpoint may adhere to a defined schema, ensuring that all interactions with the permissions API are implemented in a consistent and predictable manner. Exposing refers to making a functionality, interface, and/or set of operations available for use within a software environment. For example, exposing may include publishing API endpoints, providing documentation for integration, and/or enabling access to specific features or data within a platform. Receiving (e.g., signals) refers to obtaining, acquiring, and/or otherwise gaining access to information. Receiving may be performed on a wired and/or wireless channel, and may involve connecting to a network, detecting an incoming signal, and/or formatting a signal for storage as data.

A custom permission definition associated with a tenant-specific extension refers to a tailored access control rule and/or policy adapted for a particular tenant in association with a customization and/or add-on to a multi-tenant software platform. A custom permission definition may extend, constrain, and/or otherwise modify a default permission behavior of a software platform. For example, a custom permission definition may include specialized roles, conditional access rules, and/or granular permission controls tailored to a particular tenant's needs and/or to a particular extension. The permissions API may permit a user (e.g., an administrator) and/or process (e.g., an automated extension deployment workflow and/or AI agent) to inject non-native logic associated with the tenant-specific extension by calling a permissions API and submitting the non-native logic as a parameter (e.g., a data structure or JSON definition). At least one processor may interpret the non-native logic received via the permissions API to add tenant-specific logic to the tenant-specific logic registry. Upon receiving a request to access a resource associated with the tenant-specific extension during runtime, at least one processor may access the tenant-specific logic registry to retrieve tenant-specific logic relevant to the request.

For example, a permissions API may include an API endpoint "POST/api/v1/tenants/{tenantId}/permissions/roles", permitting an administrator to define new custom roles and associated permissions for accessing an external database during a configuration stage. At least one processor may call the permissions API with a custom permission definition for adding a custom rule restricting access to financial reports only to users assigned to a Project Auditor role. In response to the API call, at least one processor (e.g., associated with the collaborative platform) may process the custom permission definition and add the custom rule to the tenant-specific logic registry. Subsequently, before granting access to a financial report during runtime at least one processor may validate the request to confirm that the user making the request is registered as a Project Auditor role in the tenant's logic registry. As another example, a permissions API may include an API endpoint for receiving a custom permission definition for one or more tenant-specific or custom rules. During configuration, a tenant may use such an endpoint to add a custom rule to the tenant-specific logic registry that restricts access to certain documents based a user role, type of data, time of day, or user location. Upon receiving the custom permission definition, at least one processor may process the permission definition (e.g., formatted as a JSON definition) and store the custom rules in the tenant-specific logic registry. When access to the documents is subsequently requested during runtime, at least one processor may evaluate the request against both native permissions and the custom rules stored in the tenant-specific logic registry.

In some disclosed embodiments, at least one permission endpoint has a schema defining a permission request structure and a permission response structure. A schema refers to a blueprint, structure, and/or architecture for a software component. A schema may specify required fields, attributes, data type, relationships, rules, and/or additional information indicating how a software component may interact, and/or integrate with components. For instance, a schema may define data types, and relationships for API requests and responses, ensuring consistency and validation in data exchanges. A schema may define a point within a collaborative platform for mounting a rule and/or policy (e.g., attach a custom permission to a particular board integrated with an extension). A permission request structure refers to a format, content, and/or set of parameters required to call a permissions API. For example, a permission request structure may specify that all requests must include a user identifier, resource type, and a desired action, along with any additional context or metadata needed for permission evaluation. A permission request structure may include a schema defining required fields such as a subject (user or entity requesting access), a resource being accessed, an action being attempted, and any relevant context or metadata. It may specify optional fields that allow for more granular or conditional permission evaluations, such as time-based constraints, IP address restrictions, and/or custom attributes specific to the tenant-specific logic. A permission request structure for a permission endpoint may accommodate and/or accept a custom permission definition, such that a request complying with the permission request structure (e.g., a call to a permissions API) includes the custom permission definition. The permission endpoint may receive the custom permission definition as part of a request to resolve access to a resource associated with a tenant-specific extension. The permission endpoint may use the custom permission definition when determining whether access to the resource should be granted, as described herein.

A permission response structure refers to a format, content, and/or set of parameters returned by a permissions API in response to a request. For example, a permission response structure may include a Boolean variable indicating whether access is granted, along with additional details such as the specific permissions applied, conditions and/or limitations, and metadata about the decision-making process. Thus, a schema defining a permission request structure and a permission response structure may specify an expected format, required fields, and/or data types for permission requests and corresponding responses. Such schema may ensure consistency, facilitate validation, and enable seamless integration between a platform and a tenant-specific extension when handling permission-related operations. A permission response structure may include a schema ensuring that all API responses provide information according to a standardized format, e.g., providing a clear indication if access is granted or denied, along with supporting details such as the specific permissions applied, conditions and/or limitations on the access, and potentially an explanation or justification for the decision.

For example, a tenant developing a custom Customer Relationship Management (CRM) extension may use a permissions API to define a new rule restricting access to sensitive customer data based on an employee's department and seniority level. At least one processor may send a custom permission definition including the new rule to an associated API endpoint, formatted according to the request schema. At least one processor associated with the platform may add the new rule to the tenant-specific logic registry. When a user attempts to access customer financial records at runtime, at least one processor may evaluate the request using logic native to the platform and the new rule received with the custom permission definition, and return a response adhering to the defined response schema and indicating if access is granted.

By way of a non-limiting example, in FIG. 11, at least one processor (e.g., processor 102 in FIG. 1) may expose, within native platform 1102, a permissions API (e.g., included in API gateway 306). The permissions API may include a permission endpoint (e.g., a URL) for receiving a custom permission definition associated with the tenant-specific extension 1106 and/or 1116. The permission endpoint may have a schema defining a permission request structure and a permission response structure. For instance, when linking tenant-specific extension 1106 and/or 1116 with a software application during configuration, at least one processor (e.g., associated with tenant-specific extension 1106 and/or 1116) may use the permissions API (e.g., included in API gateway 306) to send a custom permission definition to collaborative platform 1102. The custom permission definition may include one or more tenant-specific rules governing access privileges for resource 1104 from application 302. At least one processor (e.g., associated with platform 1102) may parse and/or analyze the custom permission definition and store the tenant-specific rules in tenant-specific registry 1110.

In some disclosed embodiments, receiving via at least one permissions API, a request conforming with a permission request structure for resolving access to a resource associated with a tenant-specific extension. A resource refers to an entity, object, data, service, and/or functionality that may be accessed, manipulated, and/or utilized. Some examples of resources may include a file, a data structure, a data pool, a network, a server, a device (e.g., a printer), an API endpoint, an application feature, and/or any other type of resource. To resolve access to a resource refers to addressing, fixing, and/or removing a limitation and/or constraint preventing interaction with a resource. It may include determining whether a particular user, system, and/or entity is authorized to perform a specific action on or interact with a resource. For example, resolving access may involve evaluating permission rules, checking user credentials, settle a conflict, and/or applying conditional logic to make an allow/deny decision. Resolving a resource may be relevant during a runtime phase, when a user is actively using an application hosted on a collaborative platform to access a resource associated with a tenant. Resolving access to a resource associated with a tenant-specific extension may include determining whether a requested action on a resource associated with a tenant-specific extension should be allowed or denied, based on one or more of the native platform permissions and custom rules (e.g., non-native logic) defined by the tenant and included in a custom permission definition (e.g., during configuration). A request refers to an appeal, inquiry, and/or demand for information, access, or performance of an action. For example, a request may include an API call, a data query, or an access attempt to a specific resource or functionality. A request may be received by a user and/or by an automated process in response to an event (e.g., causing a state change). A request to resolve access to a resource may be received at runtime, e.g., while a user is actively engaging with an application hosted on a platform and linked to an extension, following a configuration stage. A permission request structure refers to a standardized format and/or schema specifying fields, parameters, and/or data types for submitting a permission-related request to a permissions API. It may include placeholders for information such as the requester's identity, the resource being accessed, the action to be performed, and/or additional relevant contextual information and/or metadata needed for accurate permission evaluation. Conforming with a permission request structure refers to adhering to a format, schema, and/or set of rules specifying a form and/or content of a permission-related request. For example, a request conforming with a permission request structure may include required fields and follow a data structure defined in a schema for a permission API. A permissions API used for receiving a request to resolve access to a resource during runtime may be the same or different than a permissions API used to provide a custom permissions definition for adding tenant-specific non-native logic to a tenant-specific logic during configuration. In other words, at least one permissions API may include a first permissions API for use during a configuration phase to incorporate non-native logic into a tenant-specific repository and a second permissions API for use during runtime to access the non-native logic to resolve a request to access a resource associated with a tenant-specific extension.

Ensuring that a request conforms to a permission request structure may ensure that necessary information (e.g., the identity of the requester, the resource, type of action, and any contextual information affecting a permission decision) is provided in a standardized format, permitting at least one processor to parse and process the request. A permissions API may permit integration of native platform permissions with tenant-specific custom logic, thereby balancing the platform's core security model with flexibility required by individual tenants to implement specific access controls. The capability to receive and process such requests in a standardized manner may permit handling of complex permissions involving multiple permission levels, and native and non-native rules. Ensuring requests adhere to a particular structure may ensure that the information needed to make an appropriate access decision is available.

By way of a non-limiting example, in FIG. 11, a user of software application 302 may be assigned a role of "Workspace Member" within platform 1102, permitting the user to delete items on board 802. Concurrently, the user of software application 302 may be assigned a non-native role of "Junior Sales Rep" within tenant-specific extension 1106 denying permission to delete a Lead. At runtime, the user may attempt to delete one of the clients listed in board 802, prompting at least one processor (e.g., processor 102 in FIG. 1) associated with resource 1104 to issue a request to resolve access to resource 1104. At least one processor (e.g., associated with platform 1102) may receive via the permissions API (e.g., via API gateway 306), a request conforming with a permission request structure for resolving access to resource 1104 and/or 1114 associated with tenant-specific extension 1106 and/or 1116, respectively.

Some disclosed embodiments involve satisfying a request by identifying that fulfilling the request requires accessing native logic from the permission repository and non-native logic associated with the tenant-specific extension. Satisfying and/or fulfilling a request refers to meeting, handling, and/or servicing demands included in a request. Identifying refers to recognizing, determining, ascertaining, and/or discovering. Accessing native logic from a permission repository refers to retrieving and/or obtaining native logic from the permission repository. It may include establishing a link and/or querying the permission repository. The native logic may represent foundational rules and policies of the collaborative platform and may be applicable across all tenants as a baseline for access control decisions. Accessing means gaining the ability to use, enter, retrieve, communicate with, or interact with something, for example, a system, program, data, device, or data resource. For example, it may refer to gaining the ability to use, interact with, retrieve, or manipulate a program or data it provides. Identifying that fulfilling a request requires accessing native logic from a permission repository may refer to recognizing and/or determining that permission rules native to the platform (i.e., inherent, baseline platform permissions) need to be considered to resolve an access request for a resource associated with a tenant-specific extension. For example, such baseline platform permissions may be associated with critical functionalities for maintaining security, privacy, data isolation, authentication and/or data integrity on the platform, and/or any other functionality (e.g., to maintain a benchmark efficiency level).

Accessing non-native logic associated with the tenant-specific extension refers to retrieving and/or obtaining non-native logic from a tenant-specific logic registry. It may include establishing a link and/or querying the tenant-specific logic registry. The non-native logic may represent customizations and additional rules modifying or extend the native permissions, allowing tenants to implement bespoke access control policies that align with their specific needs. Identifying that fulfilling a request requires accessing non-native logic associated with the tenant-specific extension may refer to recognizing and/or determining that permission rules non-native to the platform (i.e., permissions associated with the resource, the tenant-specific extension, and/or the tenant) need to be considered to resolve an access request for a resource associated with a tenant-specific extension. At least one processor (e.g., associated with a permission endpoint) may identify a need to access the non-native logic, for example, by analyzing and/or processing the request received via the permissions API. The non-native logic may include tenant-specific preferences, critical functionalities for maintaining security, privacy, data isolation, authentication and/or data integrity for the tenant-specific extension and/or the integration of the extension with the platform, and/or any other functionality (e.g., to improve and/or maintain a benchmark level of efficiency).

Satisfying a request for accessing a resource associated with a tenant-specific extension may thus include resolving a query based on native platform logic and tenant-specific logic, and integrating the logics to generate a permission outcome. This may ensure that all relevant rules and customizations are considered when making an access decision and that the integrity of the platform is maintained when accommodating tenant-specific requirements. For example, when a user attempts to access a report within a tenant-specific CRM extension to a software platform, at least one processor may consider logic native to the platform to determine the user's base permissions, as well as non-native logic to check custom access rules specific to the CRM extension and/or tenant. Considering both native and non-native logic may ensure that relevant factors are considered in the final access decision.

Some disclosed embodiments involve retrieving native logic from a permission repository. Retrieving refers to obtaining, fetching, and/or accessing stored information or data. For example, retrieving may involve querying a database, reading from a file system, and/or accessing data from a cache. At least one processor may establish a connection with a permission repository and submit one or more queries to obtain the native logic. In some embodiments, a processor may employ a caching mechanism to store frequently accessed native logic. In some instances, retrieving may fetch only relevant portions of native logic based on the specific tenant-extended resource and action being evaluated. For example, to access a CRM report within a tenant-specific extension, at least one processor may retrieve native logic only pertaining to the role of the user requesting access.

Some disclosed embodiments involve retrieving the non-native logic from the tenant-specific logic registry. This may be understood as described above for retrieving native logic. At least one processor may establish a connection with a tenant-specific logic registry and submit one or more queries to obtain the non-native logic. In some embodiments, retrieving non-native logic may include authentication and authorization checks to ensure that only authorized parties can access the tenant-specific logic registry. For example, to access a CRM report within a tenant-specific extension, at least one processor may retrieve non-native logic, including rules such as "Only allow access to customer financial data for users with 'Senior Sales Representative' role and during business hours." This may ensure that an access decision reflects a tenant's specific security requirements for their extended resources, even if they differ from and/or extend beyond the platform's native permission model. The retrieved native and/or non-native logic may be represented in various formats, such as JSON objects, XML structures, and/or serialized code snippets.

By way of a non-limiting example, in FIG. 11, at least one processor (e.g., processor 102 in FIG. 1) may satisfy the request by identifying that fulfilling the request requires accessing native logic from native permission repository 1108 and non-native logic associated with the tenant-specific extension 1106. At least one processor may retrieve the native logic from native permission repository 1108 and may retrieve the non-native logic from tenant-specific logic registry 1110. For instance, at least one processor may retrieve the native "Members can Delete" rule from native permission repository 1108 and the non-native "Junior Sales Reps cannot delete a Lead" rule from tenant-specific registry 1110.

Some disclosed embodiments involve integrating the retrieved native logic with the retrieved non-native logic by aggregating permission effects defined by the native logic and the non-native logic associated with the resource. Integrating native logic with non-native logic refers to combining, merging, and/or aggregating the native logic with the non-native logic into a unified whole for the purpose of making a comprehensive access decision based on both logics. For example, integrating may involve combining native platform permissions with tenant-specific custom rules to create a cohesive set of criteria for evaluating access to a resource. Permission effects defined by native logic and non-native logic associated with a resource refers to access control outcomes and/or decisions resulting from applying permission rules and/or logic for a request to access and/or interact with the resource. For example, permission effects may include granting read access to a file, denying write permissions to a board, or imposing time-based restrictions to access a dashboard. Aggregating refers to collecting, merging, and/or combining multiple permission effects or access control outcomes into a single, comprehensive set. For example, aggregating may involve compiling and/or applying allow/deny decisions from both native and non-native logic sources to create a comprehensive picture of applicable permissions for a given resource. Thus, aggregating permission effects defined by native logic and non-native logic for a resource may include collecting and combining relevant access control decisions from both the platform's built-in permission rules and custom, tenant-specific permission rules for the requested resource. This aggregation may produce a comprehensive set of permission effects that may be used to determine a final access decision.

For example, at least one processor may identify relevant permission effects from both the native logic and the non-native logic applicable to the requested tenant-specific resource. This may involve evaluating role-based permissions, contextual rules, and any custom conditions defined in the tenant-specific extension. At least one processor may collect the permission effects into a unified set, maintaining information about the source (native or non-native) and any associated metadata, such as priority levels or conditional factors specific to the tenant-extended resource. This aggregation may produce a comprehensive view of all applicable permissions for the requested resource, which may include both allow and deny effects from various sources. At least one processor may resolve any conflicts and/or overlaps between native and non-native permission effects specific to the tenant-extended resource. For example, if the native logic grants read access to the resource, but the non-native logic introduces a time-based restriction for the particular tenant-specific extension, at least one processor may include both permission effects in the aggregated set for further evaluation. The integrated set of permission effects may ensure that a final access decision takes into account both the platform's core permissions and the tenant's specific customizations for their extended resource.

For example, to access a CRM report within a tenant-specific extension, at least one processor may aggregate permission effects from native and non-native logics. The native logic might provide a base level of access based on the user's role within the platform, while the non-native logic may include additional constraints such as time-based access or data sensitivity levels specific to the tenant's CRM implementation. At least one processor may determine a final access decision for the tenant-specific CRM resource based on the aggregated permission effects, thereby taking into account the user's role, the time of the request, the nature of the data being accessed, and any other factors defined in the native and non-native logic.

By way of a non-limiting example, in FIG. 11, at least one processor (e.g., processor 102 in FIG. 1) may integrate the retrieved native logic (e.g., from native permission repository 1108) with the retrieved non-native logic (e.g., from tenant-specific registry 1110) by aggregating permission effects defined by the native logic and the non-native logic associated with resource 1104 (e.g., "Native says Allow," "Extension says Deny").

Some disclosed embodiments involve executing the integration to generate a customized permission output by applying a hierarchical resolution rule to the aggregated permission effects. Executing refers to carrying out, performing, or implementing a set of instructions, processes, and/or operations. For example, executing may include adding and/or removing a task to/from a queue, processing a task, accessing memory, and/or performing logical operations. Executing the integration refers to implementing, processing, and/or applying the aggregation of the native and non-native logics. Consequently, both the core permissions of the platform and the tenant's specific customizations for the extended resource may be considered when determining an access decision. To generate refers to creating, producing, and/or forming something new. For example, generating may involve compiling data, synthesizing information, and/or producing an output based on input parameters and defined logic.

A customized permission output refers to a tailored and/or bespoke result and/or outcome of a permission evaluation process that takes into account both baseline platform rules and tenant-specific modifications for a requested resource. For example, a customized permission output may include a decision to grant access to a tenant-specific resource under specific conditions based on a tenant's custom rules. A hierarchical resolution rule refers to a structured decision-making process for determining a precedence or priority for differing (e.g., conflicting) permission rules or permission effects. A hierarchical resolution rule may base an access decision on the relative positions of permission rules and/or effects within a hierarchy to determine which permission rules override or are overridden by other permission rules. For instance, a hierarchical resolution rule may specify that tenant-specific rules override platform-wide rules for a requested resource, or that explicit denials take precedence over implicit allows when determining access to a tenant-specific extension. The aggregated permission effects refers to the collective set of access control decisions and/or outcomes resulting from the evaluation of both native and non-native permission logics. For example, aggregated permission effects may include allow/deny decisions from differing sources, along with associated conditions and/or metadata relevant to the requested resource.

Applying a hierarchical resolution rule to aggregated permission effects refers to implementing and/or using the hierarchical resolution rule to determine a permission output based on the aggregation of the permission effects associated with the native and the non-native logic. For instance, the aggregated permission effects may include contradictions and/or inconsistencies, e.g., an action may be permitted according to the native logic but denied according to the non-native logic, or the reverse. Applying hierarchical resolution rule to the aggregated permission effects may prioritize and/or rank differing considerations associated with permitting and/or denying the action to determine which considerations supersede and/or override other considerations. A hierarchical resolution rule may thus permit resolving apparent contradictions within the aggregated permission effects in a systematic, rule-based manner. This may prevent generation of arbitrary, random, and/or inconsistent permission outputs. A hierarchical resolution rule may thus determine how conflicts between native platform rules and tenant-specific customizations may be resolved, and may define how to prioritize different permission effects when they contradict each other. Such a rule may ensure that a final access decision is based on the platform's baseline permissions and any specific permissions and/or conditions imposed by individual tenants for the tenant-specific extension.

In some disclosed embodiments, the hierarchical resolution rule defines a prevalence between the native logic and the non-native logic. A prevalence between native logic and non-native logic refers to a relative priority, rank, and/or weight given to a platform's built-in permission rules versus tenant-specific custom rules when determining a final access decision for a resource. This prevalence may define which set of rules takes precedence when the aggregated permission effects include conflicting permissions, e.g., between the native platform logic and the tenant's customizations specific to the resource. When applying the hierarchical resolution rule to fulfill an access request, at least one processor may evaluate a relative strength and/or priority of each permission effect in the aggregated set as it pertains to the specific tenant-extended resource. This evaluation may consider factors such as the source of the rule (native vs. non-native), the specificity of the rule to the requested resource, and any explicitly defined priority levels. The rule may be used to determine which effects should take precedence in shaping the final access decision for the tenant-specific resource.

For example, when resolving access to a resource associated with the tenant-specific extension, a hierarchical resolution rule may specify that tenant-specific deny rules always override native allow rules for the resource, ensuring that custom security restrictions are strictly enforced. Alternatively, a hierarchical resolution rule may base the prevalence between native and non-native logic on a comparison of priorities assigned to differing permission rules. The customized permission output may reflect the integration of native platform logic and tenant-specific customizations for the requested resource. This output may include a binary allow/deny decision and/or additional conditions, limitations, and/or explanations. By executing the integration and applying the hierarchical resolution rule, at least one processor may output access decisions in a consistent, predictable manner that respects both the platform's core permissions and the specific needs of individual tenants.

In some disclosed embodiments, the hierarchical resolution rule includes comparing a numerical priority index assigned to native logic against a numerical priority index assigned to non-native logic. To compare refers to identify similarities and/or differences. Comparing may include analyzing, measuring, contrasting, juxtaposing, correlating, and/or balancing different values. A numerical priority index refers to a quantitative value and/or rank indicating a relative importance, strength, authority, and/or precedence. A numerical priority index might include one or more digits (e.g., an integer or floating-point number) where higher values indicate greater priority or authority in a decision-making process. To assign a priority index to logic refers to associate a rank and/or precedence with the logic. For example, assigning a priority index to native logic may set default values for standard (e.g., global) platform permissions based on importance and/or universality, and assigning a priority index to non-native logic may permit tenants to define how custom rules may interact with, override, and/or be overridden by platform defaults. At least one processor may assign a numerical priority index assigned to native logic based on factors such as criticality to core platform security, universal applicability across all tenants, regulatory and/or compliance requirements, and/or any other consideration. At least one processor may assign a numerical priority index assigned to non-native logic based on factors such as tenant-specified preferences and/or requirements, criticality and/or importance of the non-native logic within the tenant's operational context, compliance with tenant-specific policies and/or industry standards, a frequency and/or scope for applying a rule (e.g., if a rule applies broadly or to a limited set of resources), a potential impact on user experience or workflow efficiency, a need to address tenant-specific scenarios, risk assessment or security considerations specific to the tenant's environment, and/or any other consideration. For example, at least one processor may assign a relatively high priority index (e.g., 1000) to a native authentication requirements for the platform and may limit a priority index to a tenant-specific rule tenant (e.g., to 500) to ensure that tenant-specific custom logic cannot override the basic authentication requirements of the platform.

Some disclosed embodiments involve enforcing non-native logic only when a numerical priority index assigned to the non-native logic exceeds a numerical priority index assigned to native logic. To enforce refers to applying, requiring, imposing, and/or executing. Enforcing non-native logic may cause a tenant-specific permission rule to take precedence over and/or override a conflicting native rule when determining access to a resource. Only refers to exclusively and/or restricted to specific circumstances. To Exceeds refers to greater than, dominating, and/or surpassing. When a numerical priority index assigned to non-native logic exceeds a numerical priority index assigned to native logic refers to a situation where the non-native (e.g., tenant-specific) logic is ranked more important than the native logic. Consequently, when a portion of the native logic assigned a lower priority conflicts with a portion of the non-native logic assigned a higher priority, at least one processor may apply the non-native logic, and override the native logic, and the reverse. Use of numerical priority indices may permit application of hierarchical resolution rules that balance platform-wide consistency with tenant-specific customization in a flexible and precise manner without overriding essential platform rules. Such an approach may permit granular control over the interaction between tenant-specific logic and platform-wide logic and provide a deterministic method for resolving conflicts. Critical platform security rules may be assigned sufficiently high priorities to protect platform integrity, while providing flexibility to balance tenant customizations.

For example, native platform logic may include a first native rule assigned a priority index of 100 allowing all members of a workspace to view documents, and a second native rule assigned a priority index of 1000 enforcing encryption on sensitive data. A tenant may introduce a non-native rule restricting access to sensitive documents to mangers, and assign the non-native rule a priority index of 200. When evaluating permissions to access sensitive documents, at least one processor may override the first native rule and enforce the non-native rule to restrict access only to managers, and enforce the second native rule, requiring encryption. Such an approach may permit sequential evaluation of native and non-native rules (e.g., cascading priorities), combining of rules with non-conflicting effects and differing priorities (e.g., additive effects), and/or dynamic adjustment of priorities based on context.

By way of a non-limiting example, in FIG. 11, at least one processor (e.g., processor 102 in FIG. 1) may execute the integration to generate a customized permission output by applying a hierarchical resolution rule to the aggregated permission effects. The hierarchical resolution rule may define a prevalence between the native logic and the non-native logic. In some embodiments, the hierarchical resolution rule includes comparing a numerical priority index assigned to native logic against a numerical priority index assigned to non-native logic. For instance, at least one processor may collect a native permission effect "Allow" from native permission repository 1108 and a non-native permission effect "Deny" from tenant-specific registry 1110. The native permission effect may be assigned a priority index of "1" and the non-native permission effect may be assigned a priority index of "5." At least one processor may compare the priority indices and enforce the non-native logic only when the numerical priority index assigned to the non-native logic exceeds a numerical priority index assigned to native logic, e.g., since "5" is greater than "1" at least one processor may enforce the non-native logic (e.g., "Deny access to resource 1104").

Some disclosed embodiments involve structuring the customized permission output to conform to the permission response structure defined by the schema. Structuring refers to organizing, arranging, and/or formatting data into a specific layout or format. For example, structuring may include organizing data into fields and/or predefined templates, conversion of data from one type to another, and/or adding dummy fields to ensure consistency and compatibility with the schema response structure. To conform refers to obey, satisfy, comply, and/or respect. At least one processor may format a customized permission output to ensure adherence to a predefined format and/or content requirements specified in the API schema for permission responses. Conformity may ensure that the output of the permission evaluation process is presented in a standardized, predictable format that for consumption, processing, and/or interpretation by differing components of the platform.

For example, at least one processor may take raw results of a permission evaluation for a tenant-specific resource, including decisions made by applying the hierarchical resolution rule to the aggregated permission effects, and organize this information into a format that matches the schema definition. This may include mapping internal data representations to specific fields in the response structure, ensuring that all required elements are present, and formatting additional metadata to adhere to the defined schema. The structured output may enable seamless integration between the platform's core permissions and tenant-specific extensions or third-party applications, permitting developers to extend the platform's capabilities while ensuring that permission decisions are reliable. Structuring the output according to the defined schema may facilitate error handling, logging, and/or auditing when resolving access to tenant-specific resources. It may ensure that permission-related responses are processed and analyzed using the same tools and methodologies.

Some disclosed embodiments involve determining if access to the resource is granted based on the customized permission output. Determining refers to arriving at an outcome, decision, conclusion, and/or judgment based on available information or data. For example, determining may include evaluating conditions, applying rules, and/or analyzing results to reach a specific outcome and/or decision. If access to the resource is granted refers to an outcome in which a party (e.g., a user, tenant) is authorized and/or permitted to interact with, use, and/or manipulate the resource. For example, granting access may include allowing a user to view, edit, and delete data, execute a program, and/or utilize a particular feature of a software platform. Based on a customized permission output refers to using a tailored result of a permission evaluation process considering baseline platform rules and tenant-specific modifications, as a foundation for making an access decision. The customized output may serve as a basis for determining if a user or system may interact with a tenant-specific resource. At least one processor may interpret a structured permission output, generated by integrating native platform logic with tenant-specific customizations, to make a definitive decision whether to allow or deny access to a resource. At least one processor may evaluate a Boolean outcome (allow/deny) included in the customized permission output, as well additional factors or conditions, such as time-based restrictions, quotas, and/or contextual requirements and/or conditions. Such a comprehensive evaluation may ensure that the final access decision accurately reflects both the platform's baseline permissions and tenant-specific requirements.

For example, at least one processor may examine a customized permission output to determine access to a custom CRM module within a tenant-specific extension. If the output indicates "allow" with a high confidence score and no additional restrictions, access may be granted. If the output indicates "allow" under a condition "only during business hours," at least one processor may evaluate the current time before granting access. At least one processor may ensure that all relevant factors—including native platform rules, tenant-specific customizations, and any contextual conditions—are taken into account when determine a final decision. In some disclosed embodiments, at least one processor may additionally log a decision and its rationale for auditing purposes, potentially triggering additional actions or workflows based on the outcome. For instance, if access is denied, at least one processor may send a notification to the owner or suggest alternative resources.

By way of a non-limiting example, in FIG. 11, at least one processor (e.g., processor 102 in FIG. 1) may structure the customized permission output to conform to the permission response structure defined by the schema. At least one processor may determine if access to resource 1104 is granted based on the customized permission output. For example, at least one processor may determine that since the priority index of "5" for the non-native permission effect is greater than the priority index of "1" for the native permission effect, the non-native permission effect ("Deny") supersedes the native permission effect ("Allow"). At least one processor may calculate the decision on-the-fly (i.e., in response to the request) based on a current state of native permission repository 1108 and tenant-specific logic registry 1110, and may avoid storing the result in memory (e.g., the decision may be stateless). The decision may be deterministic, i.e., for a given state or set of input conditions, the outcome may be the same. At least one processor may isolate tenant-specific logic registry 1110 from other tenants.

In some disclosed embodiments, the permission repository comprises a global graph data structure defining baseline relationships between platform entities. A data structure may be understood as described elsewhere herein. A graph data structure refers to an organized collection of data including a set of vertices (nodes) and edges connecting differing pairs of nodes. The nodes may represent data points (e.g., platform entities) and the edges may represent relationships and/or associations between differing pairs of data points. The edges may be directed (one-way) to indicate a directionality and/or dependency between differing pairs of nodes, or undirected (two-way). In some embodiments, a graph data structure may include one or more loops where an edge connects a node to itself (e.g., a source and destination are the same node). A graph data structure may include multiple edges between the same nodes (e.g., a multigraph) to represent differing types and/or instances of relationships between the nodes (e.g., parallel relationships). At least some edges in a graph data structure may be associated with weights, attributes, and/or labels to incorporate additional information into the graph data structure. Such additional information may include, for example, a cost, a distance (e.g., an information and/or probabilistic distance), a type of relationship, a permission type, a weight (e.g., relative rank), metadata, and/or any other type of information. The additional information may include complex associations and/or interactions. For example, multiple edges between a user node and a resource node may represent different access rights granted through differing roles and/or policies. In some instances, a graph data structure may be represented using an adjacency list and/or an adjacency matrices, e.g., to support efficient traversal and analysis.

Thus, a permissions logic may be representing as a graph of nodes connected via edges. Each node may represent a logical entity persisting in the collaborative platform and each edge connecting two nodes may represent a permission relationship between the two connected nodes. Absence of a path connecting two nodes may indicate a lack of permission. Some examples of logical entities that may be represented using nodes may include users, roles, accounts, tenants, resources, projects, files, documents, transactions, devices, teams, workspaces, actions, and/or any other logical entity of a multi-tenant collaborative platform. An edge connecting two nodes may represent, for example, a permission assignment (e.g., "can_view," "can_edit," or "can_delete," indicating what actions a user or role may perform on a resource); a role hierarchy (e.g., "inherits_permissions_from" indicating inheritance from higher-level nodes to lower-level nodes); ownership or association links (e.g., "owns" or "belongs_to" indicating ownership between users or tenants and resources); conditional access rules (e.g., time-based or location-based constraints); delegation or approval relationships indicating which users may act on behalf of others or approve certain actions; custom tenant-specific rules (e.g., an edge that allows only members of a certain team to access sensitive documents); audit or logging triggers (e.g., indicating actions requiring additional oversight or record-keeping); and/or any other type of permission relationship. Information about nodes and edges may be stored as associated metadata. To determine a permission relationship between two nodes (e.g., if a user may access a resource), at least one processor may search the graph to identify the nodes, trace a path connecting the identified nodes, collect metadata associated with the path and the nodes, and analyze the metadata to determine the permission relationship between the two nodes.

A global graph data structure refers to a platform-wide representation of data and relationships using nodes and edges. In some embodiments, a global graph data structure may be immutable (i.e., non-modifiable). For example, a global graph data structure may model the interconnections between users, resources, and permissions across the entire collaborative software platform. A baseline relationship refers to a fundamental, default correspondence, link, and/or association between core entities within a system. Such core entities may include, for example, users, roles, and/or resources, and baseline relationships may define standard and/or default access rules, hierarchies, and/or dependencies. Baseline relationships may serve as a foundational layer governing permissions in a multi-tenant collaborative platform, ensuring that universal policies and/or inheritance patterns are consistently applied across all tenants on the platform. A platform entity refers to a distinct identifiable conceptual and/or real-world object and/or resource that exist within the collaborative software environment. For example, platform entities may include users, roles, accounts, tenants, resources, projects, files, documents, transactions, devices, teams, workspaces, actions, and/or any other element of a collaborative software platform that may be abstracted as a logical entity. A platform entity may be associated with a defined identity, one or more attributes, a behavior and/or relationships with other entities, and/or any other type of information. For instance, each platform entity may be associated with an identifier, (e.g., user and/or order ID), attributes (e.g., name, status, timestamp), relationships to other entities (e.g., a user owns a resource, and an order belongs to a customer), and/or a lifecycle (e.g., time of inception, modifications, deletion, and/or state changes).

In some disclosed embodiments, a tenant-specific logic registry includes a local graph data structure defining extension relationships specific to the tenant. A local graph data structure refers to a tenant-specific representation of data and relationships using nodes and edges. In some embodiments, a local graph data structure may be mutable (i.e., modifiable). A local graph data structure may be tailored to particular needs and customizations of an individual tenant within a multi-tenant platform and may differ that a global graph structure. For instance, a local graph data structure may include some edges between nodes absent from a global graph data structure or the reverse, representing customizations and/or extensions by a tenant. An extension relationship refers to an additional and/or modified connection between entities specific to a particular tenant. An extension relationship may represent a connection between entities absent in addition to baseline relationships, and/or a modified version of an existing relationship tailored for a tenant. For example, extension relationships may include custom role hierarchies, specialized access rules, and/or unique resource dependencies defined by a tenant. Thus, a global graph data structure in a permission repository may serve as a foundation defining standard relationships and access rules applicable across an entire platform. A local graph data structure in a tenant-specific logic registry may allow for granular customization at the tenant level and may include additional nodes, edges, and/or properties. For example, a tenant may introduce a new type of resource node with custom attributes, or define new edges representing specialized access rules that apply only within the tenant's organization. When resolving permissions, at least one processor may traverse both the global and local graphs.

For instance, a global graph may define a baseline "can_edit" relationship between two nodes (e.g., a "Member" role and a "Document" resource). A local graph for a tenant may extend this relationship by introducing a "Sensitivity_Level" property on documents and a new "Senior_Member" role, with an edge specifying that only "Senior_Members" may edit documents with high sensitivity levels. Such an extension may be seamlessly integrated into a permission resolution process for the tenant, while maintaining the global graph for other tenants.

Some disclosed embodiments involve retrieving native logic and non-native logic by performing a runtime hydration process that logically overlays a local graph data structure onto a global graph data structure to form a composite decision graph. Runtime refers to an execution phase for a computer program. It may include a time period during which at least one processor actively executes instructions to complete a task for a computer program. A hydration process refers to a procedure and/or mechanism for populating a target data structure using data from one or more data sources (e.g., a database, an API, and/or file system). Prior to a hydration process, a target data structure may be empty and/or newly instantiated. In some embodiments, a hydration process may include combining and/or merging two or more data structures (e.g., graphs). For instance, a hydration process may include merging a portion of a global graph for a collaborative platform with at least a portion of a local graph for a specific tenant to permit resolving a permission to access a resource. A runtime hydration process refers to a process for populating a data structure during runtime, and/or in response to a runtime event. Runtime hydration may permit dynamic, real-time integration of data and/or structures during program execution, on-the-fly as requests are processed and may improve efficiency by enabling an object to exist in memory (e.g., as metadata) empty or partially empty of data until the data is needed (e.g., "lazy-loading"). In some embodiments, a runtime hydration process may include combining and/or merging two or more data structures (e.g., a global graph with a local graph) in real-time, in response to a runtime event. For instance, in response to a request to delete an email integrated with a board hosted on a collaborative platform while editing the board, at least one processor may perform a runtime hydration process that integrates baseline permissions for the collaborative platform with tenant-specific permissions for the email account in real-time.

Composite refers to hybrid, blended, aggregated, and/or made of several parts. A composite decision graph refers to a unified graph structure that incorporates information from multiple sources to facilitate decision-making processes. A composite decision graph may include nodes, edges, and/or attributes from differing graphs. To logically overlay refers to virtually and/or conceptually superimpose, combine, and/or merge. Logically overlaying two or more first data structures may generate a virtual representation of a second data structure combining elements from the first data structures under a single, common schema and may include definitions, relationships, and/or properties absent from the first data structures. Logically overlaying two or more first graph data structures may include merging two or more nodes (vertices) and associated attributes included in the first graphs to form a single node with associated attributes in the second graph, including edges (e.g., edge augmentation) in the second graph defining relationships absent from the first graphs, injecting properties and/or metadata from the first graphs into associated nodes and/or edges in the second graph, and/or resolving conflicts between the first graphs (e.g., using rules to determine precedence and overriding).

Logically overlaying a local, tenant-specific graph data structure onto a global, platform-wide graph data structure may produce a composite decision graph combining baseline platform rules with tenant-specific customizations for evaluating tenant-specific permissions in a multi-tenant platform. The composite decision graph may include a unified set of rules (effects) derived from both platform-wide and tenant-specific repositories to produce a decision based on one or more hierarchical resolution rules (strength). In some embodiments, a runtime hydration process may populate the composite decision graph with data required for real-time, context-aware permission assessment for a specific request, tenant, and/or resource at a given point in time, while maintaining separation between core platform logic and tenant-specific extensions. Representing native and non-native logic as graph data structures may permit at least one processor to analyze permissions using graph operations, procedures for systematic exploration, analysis, and/or manipulation of data. Such graph operations may include, for example determining a shortest and/or least-cost path between nodes, finding a specific node and/or determining how often a node is visited (e.g., using a depth-first search (DFS) and/or breadth-first search (BFS), evaluating relationships between nodes (e.g., to measure relationship strength), and/or any other graph operation.

In some embodiments, in response to a request to resolve a permission, at least one processor may load a tenant-specific graph and a platform-wide graph in memory and logically link associated nodes included in both graphs to form a composite graph that may be traversed and/or navigated in real-time as a single data structure. In some embodiments, in response to a request to resolve a permission, at least one processor may first traverse a local, tenant-specific graph to identify contextual data (e.g., roles and/or overrides), and use the contextual data to query a global, platform-wide graph for associated nodes and/or edges in a multi-step process. For instance, in a first step, at least one processor may query a local graph for a specific context and/or account (e.g., "Alice is a Member of Team A" and "Alice has the custom role 'Junior Sales'") and output contextual data (e.g., specific Roles and Resource Archetypes) for checking against a global graph. In a second step, at least one processor may use the contextual data to perform a targeted traversal of the global graph, and retrieve only baseline rules relevant to the contextual data (e.g., "What permissions does the 'Member' role have on 'Boards'?"). In an additional step, at least one processor may combine effects determined in the first step (e.g., "Deny Delete") with effects determined in the second step (e.g., "Allow Edit") into a list of options. In another additional step, at least one processor may apply one or more rules (e.g., based on strength) to the list of options to determine a conclusive outcome. The above described steps are merely exemplary. Some embodiments may include different or additional steps. It is also contemplated that in some embodiments, one or more of these steps may be eliminated or combined.

Forming a composite graph at runtime may improve flexibility in incorporating tenant-specific logic into a multi-tenant platform, avoid having to maintain a persistent copy of a tenant-specific permissions in memory, and may ensure that the most recent version of the tenant-specific logic and core platform logic is used when evaluating permission decisions. Maintaining separation between the global and the local graph data structures may ensure customizations for one tenant do not affect customizations of other tenants thereby maintaining isolation between tenants and integrity of the multi-tenant environment, while permitting scalability for handling additional tenants.

By way of a non-limiting example, a global permission graph may include a "can_access" edge between a role node and a resource node to represent a rule permitting a user in the associated role to access the associated resource. A local graph for a specific tenant may include custom "time-based access" rules for certain resources, represented by additional nodes for specific time periods and additional edges that modify the "can_access" relationship between the role node and the resource node based on a current time. During the runtime hydration process, at least one processor may overlay the local graph with the global graph, such that the resulting composite graph seamlessly incorporates the additional nodes and edges for the tenant-specific "time-based access" feature into the baseline "can_access" rule for the platform, without altering the underlying global graph.

In some disclosed embodiments, aggregating of permission effects includes traversing a composite decision graph to identify all valid paths connecting a subject entity to a resource. Traversing refers to a systematic exploration and/or navigation through a graph data structure to visit associated nodes and/or edges in a specific order. Traversing may include following connections between nodes to explore relationships and/or gather information from a graph. Traversing may include a breadth first traversal to explore neighboring nodes before moving to a further nodes, a depth first traversal to explore a path before considering neighboring nodes, a cycle detection traversal to identify cycles and/or loops, a shortest path traversal, a topological sort traversal, a weighted traversal and/or any other type of systematic graph traversal. To identify refers to recognizing, ascertaining, and/or discovering. Identifying may include recognizing, determining, and/or distinguishing specific elements, features, or characteristics within a set of data. For example, identifying may involve pattern matching, classification, and/or selection of relevant components from a larger dataset, determining a match (e.g., within a threshold) between two or more items, and/or associating an item with an (e.g., uniquely) identifying code and/or index. A valid path refer to sequence of connected nodes and edges within a graph that satisfies one or more criteria and/or rules. For example, a valid path in a permission graph may include a series of edges connecting a user node to a resource node indicating the user is permitted to access the resource. A subject entity refers to a party for which permissions are being evaluated. A subject entity may include a user, an agent, a group, and/or a process attempting to access a resource. For example, a subject entity may include an individual user account, a service account, and/or an automated process within a collaborative platform. All valid paths connecting a subject entity to a resource refers to each and/or every path capable of linking a node representing a subject entity with a node representing a resource in a permissions graph. Each path discovered during the traversal may represent a potential permission chain for granting or restricting access to a resource. At least one processor may systematically explore the composite decision graph to find all paths that lead from a source node for the subject entity to a target node for the resource to determine a comprehensive set of permissions. During the exploration, at least one processor may collect permission data associated with the edges and nodes, such as global permission grants or restrictions associated with specific roles, groups, or entities within the platform (i.e., explicit platform-wide allows and denies), access rights that propagate through hierarchical relationships (i.e., inherited permissions), permissions dependent on context, such as time, location, or resource state (i.e., conditional effects), and/or tenant-specific rules represented by nodes and/or edge properties incorporated from the local graph structure (i.e., custom or tenant-specific logic). At least one processor may employ processes to handle graph cycles, multiple paths between nodes, differing edge types, and/or additional graph complexities.

For example, in response to an attempt by a user to access a sensitive document within a tenant-specific CRM extension, at least one processor may traverse a composite decision graph determine multiple valid paths governing the user's ability to access the sensitive document: Path A: User→Department Member→CRM User→Document Viewer; Path B: User→Project Team→Document Collaborator; Path C: User→Senior Manager→All Resources Access. Each path may contribute different permission effects. Path A may grant basic read access, Path B may allow edit permissions, while Path C may override other restrictions and grant full control. At least one processor may aggregate these permission effects from the multiple paths to determine if and/or how the user may access the sensitive document. The comprehensive nature of the traversal may ensure that a potential permission source is not overlooked. By identifying all valid paths, at least one processor may apply resolution rules to determine a final access decision accounting for specific rules, rank and/or priority of different permission sources, and/or conflicts between the native and non-native permission logic. Consequently, at least one processor may provide justifications and/or explanations for access decisions referencing specific paths and/or rules. This may permit administrators to analyze a full set of paths that grant access to sensitive resources to identify potential security risks or overly broad permissions (e.g., permission auditing). Additionally, by understanding all the ways access may be granted, at least one processor may determine optimization opportunities and suggest more efficient and/or secure permission structures.

In some disclosed embodiments, aggregating permission effects includes traversing a composite decision graph to identify at least one valid path (i.e., less than all the valid paths) connecting a subject entity to a resource from a plurality of possible paths. The identification of the at least one valid path may be based on one or more criterion, such as a path length (e.g., minimum or maximum), a path location within the graph, inclusion and/or exclusion of particular nodes and/or edges in a path (e.g., based on a weight, an attribute, connection to other nodes and/or edges), and/or any other criteria.

Figure 12:
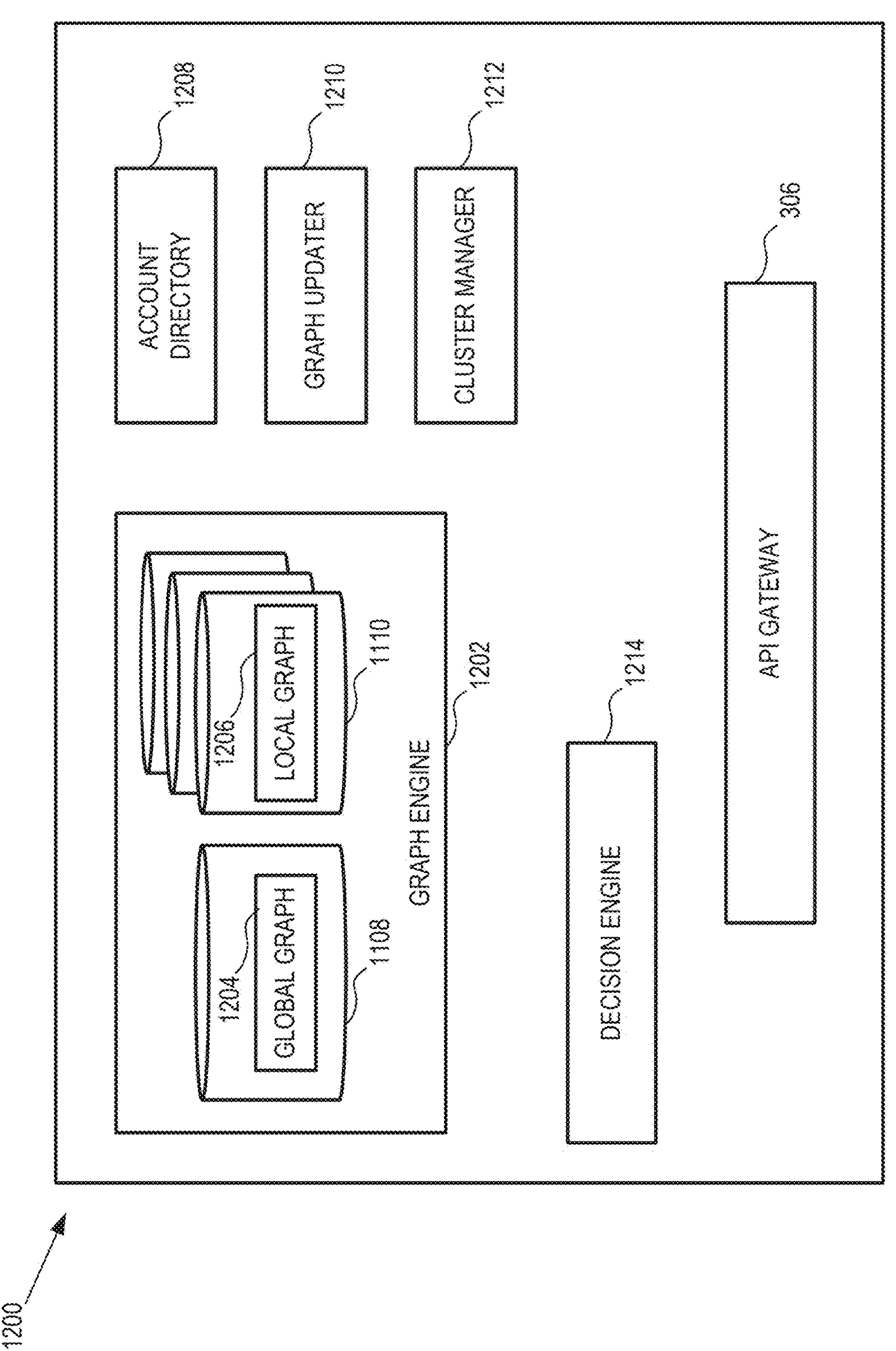
FIG. 12 is an exemplary block diagram of a system for producing a composite graph from a global graph defining baseline platform-wide relationships and a local graph defining tenant-specific relationships for resolving a permission request at runtime, consistent with some disclosed embodiments.

By way of a non-limiting example, reference is made to FIG. 12 which is an exemplary block diagram of a system 1200 for producing a composite graph from a global graph defining baseline platform-wide relationships and a local graph defining tenant-specific relationships for resolving a permission request at runtime, consistent with some disclosed embodiments. System 1200 may include a graph engine 1202 including native permission repository 1108 and multiple instances of tenant-specific logic registry 1110, each associated with a differing tenant (see FIG. 11). Native permission repository 1108 may include a global graph data structure 1204 defining baseline relationships between entities within platform 1102. Each instance of tenant-specific logic registry 1110 may include a local graph data structure 1206 defining extension relationships specific to a respective tenant (e.g., including tenant-specific overrides and/or changes). Graph engine 1202 may include a library of graph operations for performing on global graph data structure 1204 and/or any instances of local graph data structures 1206. System 1200 may include an account directory 1208 storing a list of active account instances, a graph updater 1210 for detecting changes and/or applying updates to global graph data structure 1204 and/or any of plurality of local graph data structures 1206 (e.g., via account directory 1208), a cluster manager 1212 to collaborate between different instances of permission services provided to differing tenants. System 1200 may additionally include a decision engine 1214 to perform decision-making operations, and API gateway 306. API gateway 306 may orchestrate and/or handle calls to one or more permission APIs, route messages for different permission requests (e.g., for differing tenants and/or users), call graph updater 1210 to update global graph data structure 1204 and/or any of plurality of local graph data structures 1206, and/or invoke decision engine 1214.

In response to receiving a request to resolve access to a resource associated with tenant-specific extension 1106, at least one processor (e.g., processor 102 in FIG. 1) may retrieve native logic and non-native logic by performing a runtime hydration process that logically overlays local graph data structure 1110 onto global graph data structure 1108 to form a composite decision graph. In some disclosed embodiments, at least one processor may aggregate permission effects by traversing the composite decision graph to identify all valid paths connecting a subject entity (e.g., a user of app 302) to resource 1104. In some disclosed embodiments, decision engine 1214 may aggregate relevant effects and/or reasonings associated with global graph data structure 1204 and tenant-specific logic registry 1110 at runtime.

In some disclosed embodiments, a custom permission definition defines a virtual inheritance entity configured to logically intervene between a parent node and a child node in a native hierarchy of the collaborative software platform. A virtual inheritance entity refers to a logical construct and/or object for modifying and/or extend existing hierarchical relationships. A virtual inheritance entity may include a node inserted into an existing hierarchy without altering an underlying data structure. To logically intervene refers to interfere, intercede, and/or affect a flow of information and/or decision making between two entities. It may include adding, removing, and/or modifying logic and/or data. A native hierarchy refers to a baseline and/or default hierarchy defining priorities and/or ranks of different entities in a software platform. A parent node refers to a senior and/or higher-level entity within a hierarchy from which attributes may be passed to lower-level and/or subordinate (e.g., child) nodes. A child node refers to a lower ranking entity within a hierarchy that may acquire and/or assume attributes from one or more higher level (e.g., parent) nodes. For example, a parent node may represent a workspace, folder, and/or project that governs default permissions and rules for all associated child resources (e.g., specific documents or boards) located beneath the workspace in a hierarchy. A parent node may correspond to a source of baseline access rights and organizational logic for a child node. Thus a custom permission definition received via a permissions API may introduce a virtual inheritance entity (e.g., another node) along a path connecting the parent node with the child node. The virtual inheritance entity may introduce additional logic such that the child node acquires native logic from the parent node, as well as the additional logic that may intervene with (e.g., alter) the inherited native logic, e.g., by modifying, extending, overriding, adding, and/or restricting one or more inherited access rights.

Some disclosed embodiments involve modifying a permission inheritance path such that a child node inherits permission rules from a virtual inheritance entity in addition to native logic. Modifying refers to altering, changing, and/or adjusting. A permission inheritance path refers to a sequence and/or chain connecting two nodes via at least one edge through which access rights and permission rules may be passed from one entity to another within a hierarchical structure. A permission inheritance path may include a parent (e.g., source) node, a child (e.g., destination) node, and any edges and/or nodes included in a path connect the parent node with the child node to trace a flow of permissions inherited by the child node from the parent node and/or any intervening nodes. To inherit permission rules from a virtual inheritance entity in addition to native logic refers to acquiring permission rules (as described earlier) from a logical entity introduced along the path connecting a parent node to a child node, in addition to permission rules acquired from the parent node. This feature may permit tenants, administrators, and/or users to insert additional rules and/or constraints at specific points in a native hierarchy without altering a core platform structure. The additional rules may be inserted as intervening nodes along a path connecting a parent node to a child node. The intervening nodes may represent virtual entities as they may not map to real-world entities, but serve as injection points for custom logic that intercepts a native flow of permission inheritance. This interception may allow for the injection of additional rules, modifications, or conditions that affect how permissions are passed down to lower hierarchical levels.

For example, a native hierarchy may define that project items inherit permissions from a project level, which inherits permissions from a workspace level. At least one processor may introduce a virtual inheritance entity between a node for the project and nodes for project items to inject custom logic along the permission path for time-based access permissions. The custom logic may allow project items (e.g., child nodes) to inherit all permission from the workspace level and project level during business hours, but inherit only a subset of those permission outside business hours. Permitting targeted insertion of virtual inheritance entities along a permissions graph and chaining the corresponding permission logic may enable granular tenant-specific permission control without altering the native logic.

Figure 13:
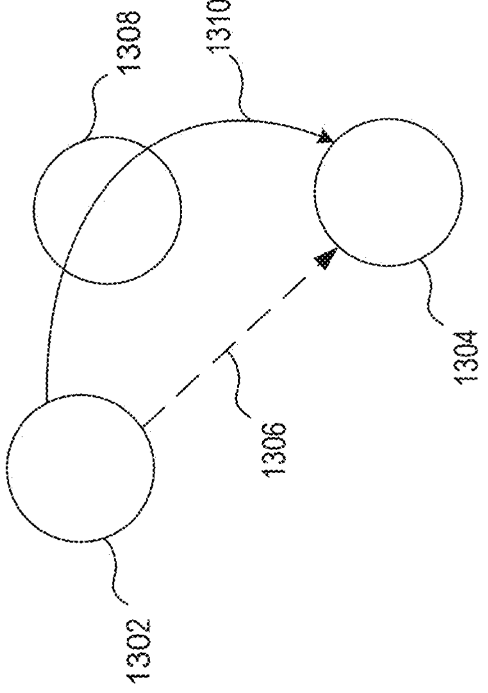
FIG. 13 is an exemplary schematic diagram of a graph data structure for implementing inheritance for a multi-tenant collaborative software platform, consistent with some disclosed embodiments.
Figure 13:
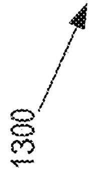

By way of a non-limiting example, reference is made to FIG. 13 which is an exemplary schematic diagram of a graph 1300 for implementing inheritance for a multi-tenant collaborative software platform, consistent with some disclosed embodiments. Native logic stored in native permission repository 1108 may define a native hierarchy for collaborative platform 1102 (e.g., hierarchy 400 in FIG. 4). Graph may include a parent node 1302 corresponding to workspace level 406 connected to a child node 1304 corresponding to board level 408. Path 1306 leading from parent node 1302 to child node 1304 may represent inheritance of permissions from workspace level 406 to board level 408. Thus, a user permitted to perform an action on resource 1104 at workspace level 406 may inherit that permission at board level 408, as indicated by path 1306. At least one processor (e.g., processor 102 in FIG. 1 associated with platform 1102) may receive a custom permission definition from tenant-specific extension 1106. The custom permission definition may define a virtual inheritance entity 1308 that logically intervenes between parent node 1302 and child node 1304 in native hierarchy 400 of collaborative software platform 1102. Virtual inheritance entity 1308 may modify permission inheritance path 1306 (e.g., by introducing an alternate path 1310 between parent node 1302 and child node 1304) such that child node 1304 may inherit permission rules from virtual inheritance entity 1308 in addition to the native logic inherited from the parent node 1302. For instance, at runtime, when at least one processor (e.g., processor 102 in FIG. 1) navigates graph 1300 in response to a request to resolve a permission to access resource 1104 and/or resource 1114, at least one processor may navigate to child node 1304 via path 1306 and via alternative path 1310 and apply permission rules inherited from parent node 1302 and from virtual inheritance entity 1308, as defined in the custom permission definition. By way of example, child node 1304 may inherit from parent node 1302 a permission of strength "−1" allowing a user to access resource 1104. Child node 1304 may additionally inherit from virtual inheritance entity 1308 a restriction of strength "1" denying the user to access resource 1104. At least one processor may compare the strength of the permission inherited from parent node 1302 with the strength of the restriction inherited from virtual inheritance entity 1308 to determine if access may be granted. Since the strength for the restriction ("1") is greater than the strength for the permission ("−1"), at least one processor may block the user from accessing resource 1104. Virtual inheritance entity 1308 may thus serve as a logical filter and modify the topology of graph 1300 to enforce tenant-specific permission policies.

In some disclosed embodiments, a custom permission definition includes conditional applicability metadata. Metadata refers to information about and/or auxiliary to other data (i.e., primary data) and may provide descriptive characteristics, context, and/or conditions related to the primary data for organization, management, and/or interpretation. At least one processor may use metadata to determine how to process primary data. Conditional applicability metadata refers to additional information and/or parameters specifying conditions under which a custom permission definition may be applied and/or considered. It may include additional requirements, restrictions, permissions, and/or clauses for considering when analyzing and/or processing the custom permission definition. For example, conditional applicability metadata may include time-based restrictions, user attributes, user preferences, resource states, and/or environmental factors for considering when applying a custom access control rule and/or policy associated with a tenant-specific extension. A permission request structure may accommodate and/or accept conditional applicability metadata and/or a location storing conditional applicability metadata in a call to a permissions API. The permission endpoint may obtain and use conditional applicability metadata to resolve access to a resource.

Some disclosed embodiments involve aggregating a permission effect from a custom permission definition only if a context of an access request matches conditional applicability metadata. Aggregating refers to collecting, merging, and/or combining as described elsewhere herein. A context of an access request refers to surrounding and/or environmental circumstances, conditions, and/or attributes associated an attempt to access a resource associated with a tenant-specific extension from the collaborative platform. For example, a context of an access request may include information about a user, the time, a location, a resource, and/or a device associated with the request. A custom permission definition may be associated with one or more permission effects resulting from applying tailored access control rules. At least one processor may incorporate the permission effects only (i.e., exclusively) when a context of the access request complies with the conditional metadata. For example, a tenant may define a custom permission rule with conditional applicability metadata specifying time-based conditions (e.g., the rule is only applicable during non-business hours), user attribute conditions (e.g., the rule applies only to non-members), resource state conditions (e.g., the rule is relevant only when the resource is labeled "confidential). When an access request is received, at least one processor may check the conditions against the current context. For instance, if a non-member attempts to access a confidential resource at 8 PM, at least one processor may aggregate custom permission effects based on the conditional metadata into the overall permission evaluation. If the same request were made at 2 PM or by a member, any custom permission effects may be excluded from the permission evaluation, thus providing tenants with additional opportunities to tailor access permissions and increasing the granularity of access privileges.

In some disclosed embodiments, conditional applicability metadata includes a dynamic resource quota. A dynamic resource quota refers to a limit and/or threshold associated with the usage or consumption of a resource. For example, a dynamic resource quota may specify a maximum number of files a user may create, a total storage space allocated to a project, or a number of API calls allowed within a given timeframe. Some disclosed embodiments involve ignoring a custom permission definition until a dynamic resource quota is exceeded. Ignoring refers to disregarding, bypassing, and/or omitting. At least one processor may ignore a custom permission definition by omitting and/or excluding the custom permission definition from a set of considerations used during the permission evaluation process for accessing a resource. Exceeded refers to surpassed, or having gone beyond a boundary or limit. Until a dynamic resource quota is exceeded refers to a period during which usage or consumption of a resource has not yet surpassed a limit or threshold defined by the quota. Thus, at least one processor may monitor usage metrics associated with the requested resource. While usage remains within the quota, at least one processor may determine if access to the resource is to be granted without applying the custom permission definition. In other words, access control rules associated with the custom permission definition may remain dormant as long as usage of the resource stays within allowed boundaries. Once the resource quota is passed, at least one processor may activate the additional access control rules associated with the custom permission definition into the permission evaluation process for the resource. Inclusion of a resource quota may allow tenants to trigger rules when certain resource utilization thresholds are crossed. Some examples of dynamic resource quotas may include a storage quota (e.g., apply the rule when total storage usage exceeds 10 GB), an API call quota (e.g., apply the rule when a user makes more than 1000 API calls within a 24-hour period), a concurrent user quota (e.g., activate the rule when the number of simultaneous active users surpasses 50). This may permit tiered or graduated access control policies. For instance, a tenant may use a quota to implement stricter data access controls as a project grows in size.

By way of a non-limiting example, in FIG. 11, the custom permission definition may include conditional applicability metadata. For instance, during configuration, at least one processor (e.g., an instance of processor 102 in FIG. 1 associated with tenant-specific extension 1106) may provide conditional applicability metadata with the custom permission definition to platform 1102 via the permissions API (e.g., to fine-tune access rights). At least one processor (e.g., an instance of processor 102 in FIG. 1 associated with platform 1102) may store the conditional applicability metadata in tenant-specific logic registry 1110 alongside any tenant-specific logic. Subsequently during runtime, when a user of software application 302 attempts to delete from board 802 (see FIG. 8) an item associated with resource 1104, at least one processor may send a request to software platform 1102 via API gateway 306 to resolve access to resource 1104 for the user. In response to the request, at least one processor may aggregate a permission effect from the custom permission definition only if a context of the access request matches the conditional applicability metadata. For instance, the conditional applicability metadata may stipulate that deletions are permitted only during working hours. If the user of software application 302 attempts to delete an item from board 802 during working hours, since the context of the access request (working hours) matches the conditional applicability metadata (permit deletions during working hours), at least one processor may aggregate the permission effect from the custom permission definition (e.g., permit the deletion) with the native logic to determine if access is granted. If the delete attempt is made outside working hours, at least one processor may avoid the aggregation and simply deny the request. In some embodiments, the conditional applicability metadata includes a dynamic resource quota (e.g., deny access to resource 1104 once more than 100 accesses have been made within an hour). At least one processor may ignore the custom permission definition until the dynamic resource quota is exceeded.

Some disclosed embodiments involve automatically generating and rendering a visual configuration element within a native administrative console of a collaborative software platform based on a schema of a received custom permission definition. A visual configuration element refers to a graphical user interface component or widget that allows users to view, modify, or interact with system settings and/or parameters. For example, a visual configuration element may include toggle switches, dropdown menus, sliders, or form fields that represent configurable options within a software application. Automatically refers initiating actions and/or processes without requiring a direct or explicit request from a user. Automatically may additionally include operations occurring in the background, triggered by predefined conditions or events, ensuring seamless functionality without manual intervention. To generate a visual configuration element refers to creating and/or defining the visual configuration element. It may include defining attributes of the element and/or allocating memory for the element. To render refers to generating and displaying a visual representation of data and/or interface elements on a screen or output device. For example, rendering may involve creating and positioning graphical components, applying styles, and populating fields with relevant data to produce a coherent and interactive user interface. A native administrative console refers to a built-in, platform-provided interface and/or dashboard for use by administrators to manage, configure, and/or monitor various aspects of a software system. For example, a native administrative console may include sections for user management, security settings, resource allocation, and system monitoring within the collaborative platform. Based on a schema of a received custom permission definition refers to using and/or applying a defined structure, data types, and/or rules for the custom permission definition. At least one processor may use the schema as a blueprint for visually presenting the custom permission definition to an administrator, allowing the administrator to ingest and/or consume the custom permission definition visually. This may permit an administrator to visualize permission effects of the custom permission definition. For instance, the visual configuration element may visually indicate custom access rules using a different color and/or style than native rules for the platform, permitting an administrator to distinguish between effects of the native logic versus effects of the non-native logic.

Figure 14:
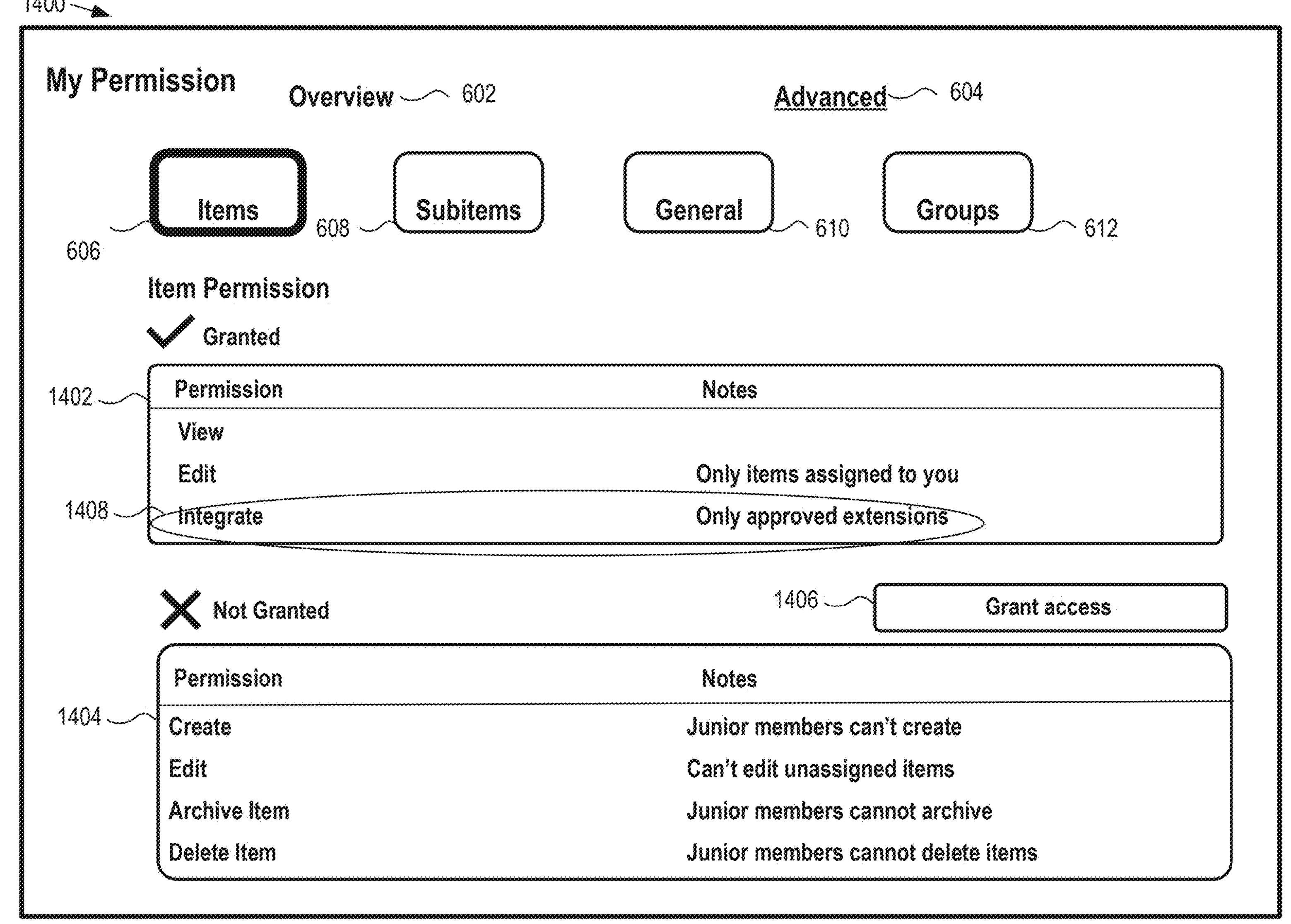
FIG. 14 is an exemplary screen shot of a native administrative console implemented on collaborative software platform, consistent with some disclosed embodiments.

By way of a non-limiting example, reference is made to FIG. 14 which is an exemplary screen shot of a native administrative console 1400 implemented on collaborative software platform 1102, consistent with some disclosed embodiments. Native administrative console 1400 may be substantially similar to user interface 600 and may include a set of permitted actions 1402, a set of denied actions 1404, and a CTA button 1406 to grant access for one or more denied actions. Native administrative console 1400 may present permissions for an extension associated with an existing resource that is not defined in the native logic for platform 1102. At least one processor (e.g., processor 102 in FIG. 1) may receive a schema for a custom permission definition for resource 1104, e.g., "name": "Integration Access",
"type": "multi-select",
"options": ["Facebook", "Gmail", "Asana" ],
"target_archetype": "Account"

At least one processor may automatically generate and render a visual configuration element 1408 within native administrative console 1400 of collaborative software platform 1102 based on the schema of the received custom permission definition. Visual configuration element 1408 may indicate that a specific tenant (e.g., a user) is permitted to integrate extensions from an approved list of existing resources. Visual configuration element 1408 may be associated with non-native logic stored in tenant-specific logic registry 1110, and may be absent from native permission repository 1108. A tenant may add a capability associated with visual configuration element 1408, for instance using a developer tool, code, and/or using an application purchased from a third party vendor. At least one processor may automatically add visual configuration element 1408 to native administrative console 1400 to reflect the added capability.

Figure 15:
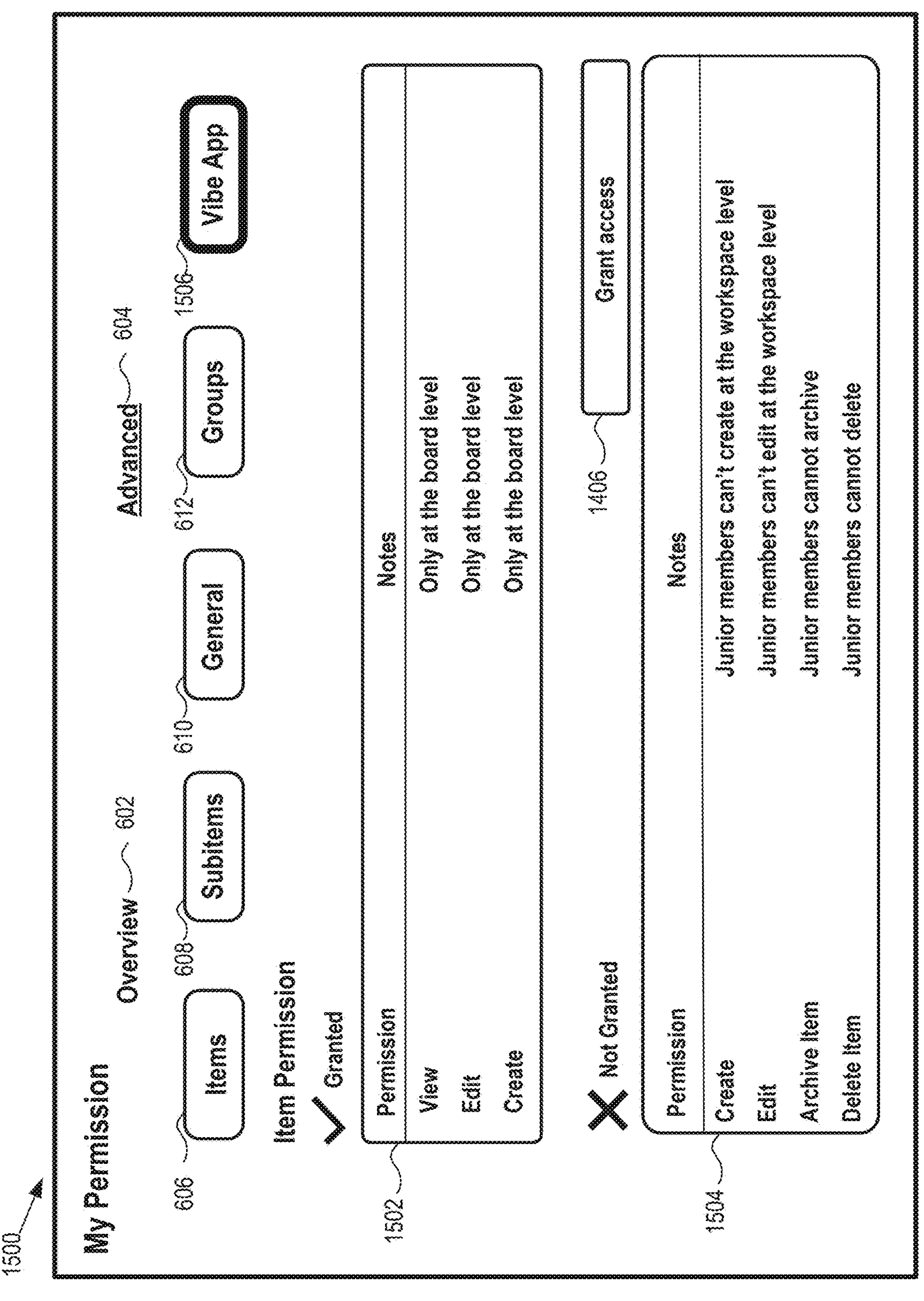
FIG. 15 is an exemplary screen shot of another native administrative console implemented on collaborative software platform, consistent with some disclosed embodiments.

By way of a non-limiting example, reference is made to FIG. 15 which is an exemplary screen shot of another native administrative console 1500 implemented on collaborative software platform 1102, consistent with some disclosed embodiments. Native administrative console 1500 may be substantially similar to native administrative console 1400 in FIG. 14 and may include a set of permitted actions 1502 and a set of denied actions 1504. Native administrative console 1500 may present new permissions for a newly added resource. Native administrative console 1500 may include a Vibe App tab 1506 for new resources generated using vibe coding (e.g., AI assisted coding that generates executable code from a natural language input). At least one processor may present permitted actions associated with the newly created resource in permitted actions 1502, and present denied actions associated with the newly created resource in denied actions 1504. At least one processor may automatically determine at which level a newly created resource resides within hierarchy 400 and/or hierarchy 500 of FIGS. 4 and 5, respectively, and may populate native administrative console 1500 with associated permissions and restrictions. For instance, at least one processor may indicate that a user assigned a Junior Member role may add, edit, and create new extensions associated with a hierarchical level no higher than board level 408.

Some disclosed embodiments involve deploying an AI agent to monitor operational conditions of the collaborative software platform, and dynamically modify permission conditions defined within the non-native logic based on the monitored operational conditions. An AI agent refers to a software component that utilizes artificial intelligence techniques, such as machine learning and/or natural language processing, to perform tasks, make decisions, and/or provide insights autonomously, as described elsewhere herein. Deploying refers to installing, placing, and/or activating a software component into a live environment so that the software component may operate and perform its intended functions. To monitor refers to observe, measure, track, and/or record. In some instances, monitoring may including controlling, managing, and/or overseeing. Operational conditions refers to states, metrics, and/or circumstances characterizing how a software component functions and/or performs. For example, operational conditions may include system load, user activity levels, resource utilization, error rates, and/or security-related events within the collaborative environment, system performance metrics (e.g., CPU usage, memory consumption, network traffic), user behavior patterns (e.g., login frequencies, resource access patterns, collaboration trends), security-related events (e.g., failed login attempts, unusual access patterns, data transfer volumes, and/or temporal factors (e.g., time of day, day of week, seasonal variations). To dynamically modify refers to change, adjust, and/or update something in real-time and/or in response to changing conditions without requiring manual intervention. For example, dynamically modifying permissions may involve automatically adjusting access rules in response to receiving signals indicative of a current system state and/or user behavior. Permission conditions defined within the non-native logic refers to requirements, restrictions, permissions, and/or clauses included in the non-native logic. Based on monitored operational conditions refers to using and/or applying the monitored operational conditions to modify the permission conditions. For example, an AI agent may temporarily lower a threshold for triggering additional authentication steps during periods of heightened security risk, expand or restrict access to certain resources based on current system load and/or user activity patterns, adapt permitted access hours based on observed work patterns and/or detected anomalies, dynamically adjust permissions associated with specific roles based on evolving usage patterns and/or security needs. During certain hours, an AI agent may observe an increased frequency of unauthorized access attempts and dynamically modify permission conditions in response (e.g., by requiring additional authentication).

By way of a non-limiting example, in FIG. 11, at least one processor (e.g., processor 102 in FIG. 1) may deploy an AI agent (e.g., see AI module 312 in FIG. 3) to monitor operational conditions of collaborative software platform 1102. The AI agent may dynamically modify permission conditions defined within the non-native logic (e.g., stored in tenant-specific registry 1110) based on the monitored operational conditions.

In some disclosed embodiments, at least one permissions API is exposed as a callable action within a workflow automation engine of a collaborative software platform. A callable action refers to an operation and/unction that invoked and/executed programmatically. For example, a callable action may include a method, procedure, and/or API endpoint invoked by other software components to perform a specific task or retrieve information. A workflow automation engine of a collaborative software platform refers to a software component for orchestrating, managing, and/or executing one or more tasks and/or processes based on predefined rules and/or conditions. A workflow automation engine may be used to automate repetitive processes, tasks, and/or workflows within minimal human intervention, and may respond to events occurring on boards and/or other platform objects. A workflow automation engine may monitor trigger events (e.g., changes to items, fields, status updates, user actions), evaluate rules, and execute actions (e.g., update other fields, modify items, send notifications, and/or invoke integrations with external services and may operate continuously across multiple boards and/or tenants. Exposing a permissions API as a callable action refers to making a permissions API available, accessible, and/or executable within a workflow automation. This may permit the permissions API to be integrated into automated processes and triggered as part of larger workflows within the collaborative platform. For example, a workflow may automatically adjust user permissions when a project moves from a planning phase to an execution phase by calling a permissions API to update access rights. A callable action may be associated with a call-to-action (CTA) element for resolving one or more restrictions, as described elsewhere herein. When a user selects a CTA button to resolve a restriction, at least one processor may automatically invoke a permissions API to handle the restriction.

Some disclosed embodiments involve triggering a callable action in response to a signal indicative of a state change in a platform element of a collaborative platform. To trigger refers to initiate, prompt, provoke, and/or activate. A signal refers to any detectable transmission of information, as described elsewhere herein. A platform element refers to a component, resource, and/or entity that exists within a collaborative software environment. For example, a platform element may include a workspace, a board, an item, a group, a column, a document, a dashboard, an automation, an integration, a user, a team, a tenant, a file, a notification, a permission, and/or any other element that exists within a collaborative platform. user account, a document, a project workspace, a team, or any other object or construct that is part of the collaborative system. A state change refers to a modification and/or transition in a condition, status, and/or properties of an entity. For example, a state change for a platform element may include a transition of a document from "draft" to "published," an update for a user role, and a transition of a project from "planning" to "execution." Such a state change may require adjusting and/or modifying permissions for a resource. Occurrence of a state change may trigger a signal causing at least one processor to automatically issue a callable action to check and/or update associated permissions within the workflow automation engine without human intervention. For example, moving a document from a "private" to a "shared" folder may cause a state triggering a callable action to update the document's permissions to allow access to a broader group of users, and changing a user's role from "contributor" to "reviewer" may trigger a callable action to automatically adjust permissions for the user across multiple resources.

Some disclosed embodiments involve monitoring a collaborative software platform for a signal and, upon detecting the signal, dynamically injecting a custom permission definition into a tenant-specific logic registry, thereby enforcing a new permission rule without requiring a manual configuration update. Monitoring refers to observing, measuring, tracking, and/or recording. For example, monitoring may include regularly checking and/or polling a status of various components, analyzing data streams, and/or waiting for a (e.g., event-driven) signal (as described elsewhere herein). Detecting a signal refers to sensing, perceiving, discovering, recognizing, and/or identifying a signal. Dynamically injecting refers to inserting, adding, and/or incorporating new elements, data, and/or logic in real-time and/or during runtime, without interrupting ongoing operations. To enforce a new permission rule refers to require, necessitate, and/or apply a permission rule that was previously absent. Without requiring a manual configuration update refers to implementing changes automatically, with no need for an administrator or user to adjust settings and/or parameters. It may include at least one processor invoking an automated process that injects a new rule into a tenant-specific logic registry without requiring an action by a human. For example, upon detecting a signal indicative of a state change to a resource, at least one processor may automatically invoke a callable action to inject a revised custom permission definition into a tenant-specific logic registry to update the tenant-specific registry. This may introduce a new rule when determining if access to the resource should be granted. For example, at least one processor may detect a signal indicating that a sensitive project has been created (i.e., a state change) and automatically inject a custom permission definition to restrict access to resources associated with the new project. This new rule would be enforced in real-time, without requiring an administrator to manually update the permission configurations for the resources.

In some disclosed embodiments, a callable action accepts dynamic input parameters from the workflow automation engine to populate a priority parameter of the custom permission definition. A dynamic input parameter refers to data and/or values provided to a function, method, and/or process at the time of execution. For example, dynamic input parameters may include user-specific information, current system states, and/or calculated values that influence how an operation is performed. To populate a priority parameter refers to assigning and/or setting a value to a specific field and/or attribute that determines an importance, precedence, and/or order of execution for a particular item and/or rule. For example, populating a priority parameter may include setting a value that indicates how a custom permission rule should be ranked relative to other rules. A priority parameter may be applied to a hierarchical resolution rule defining a prevalence between the native logic and the non-native logic. When a permissions API is called, relevant contextual information may be passed as dynamic input parameters for setting priorities to one or more rules. At least one processor may apply the priorities to determine which rules to apply and how they should be applied when making a decision to grant access to a resource. By way of example, a workflow handling sensitive financial data may pass a higher priority for a custom permission rule, ensuring that this rule overrides more general permissions. Conversely, a workflow for a public collaboration project may assign a lower priority to its permission rules, allowing them to be superseded by stricter, platform-wide policies if necessary.

By way of a non-limiting example, in FIG. 11, at least one permissions API (e.g., associated with API gateway 306) may be exposed as a callable action within a workflow automation engine 1112 of collaborative software platform 1102. At least one processor (e.g., processor 102 in FIG. 1) may trigger the callable action in response to a signal indicative of a state change in board 802 (see FIG. 8) of collaborative software platform 1102. At least one processor may monitor collaborative software platform 1102 for the signal and, upon detecting the signal, dynamically inject a custom permission definition into tenant-specific logic registry 1110, thereby enforcing a new permission rule without requiring a manual configuration update (e.g., by an administrator and/or user of application 302). In some embodiments, the callable action accepts dynamic input parameters from a workflow automation engine 1112 to populate a priority parameter of the custom permission definition.

Figure 16:
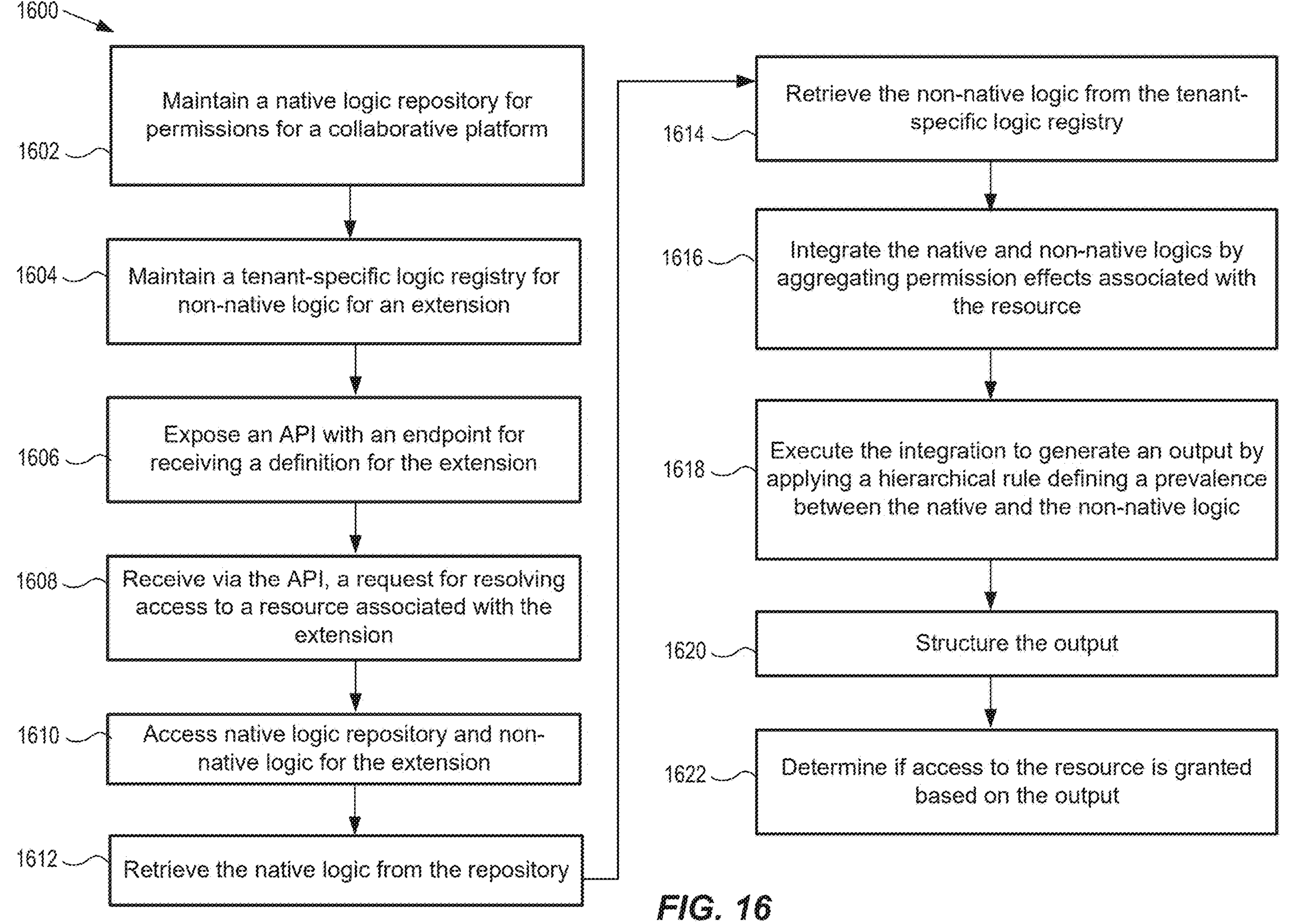
FIG. 16 is a flowchart of example process for managing extensible permissions in a multi-tenant native collaborative software platform, consistent with embodiments of the present disclosure.

FIG. 16 is a flowchart of example process 1600 for managing extensible permissions in a multi-tenant native collaborative software platform, consistent with embodiments of the present disclosure. In some embodiments, process 1600 may be performed by at least one processor (e.g., processor 102 in FIG. 1) to perform operations or functions described herein. In some embodiments, some aspects of process 1600 may be implemented as software (e.g., program codes or instructions) that are stored in a memory (e.g., memory 104) or a non-transitory computer readable medium. In some embodiments, some aspects of process 1600 may be implemented as hardware (e.g., a specific-purpose circuit). In some embodiments, process 1600 may be implemented as a combination of software and hardware. It should be understood that the steps of process 1600 may be performed in any suitable order and may be carried out by one or more processors or other relevant entities within the collaborative software platform.

Process 1600 may include a step 1602 of maintaining a permission repository for the native collaborative software platform, the permission repository including native logic for handling native permissions. By way of a non-limiting example, in FIG. 11, at least one processor (e.g., processor 102 in FIG. 1) may maintain native permission repository 1108 for software platform 1102. Native permission repository 1108 may include native logic for handling native permissions for platform 1102.

Process 1600 may include a step 1604 of maintaining a tenant-specific logic registry configured to store non-native logic associated with a tenant-specific extension. By way of a non-limiting example, in FIG. 11, at least one processor (e.g., processor 102 in FIG. 1) may maintain a tenant-specific logic registry 1110 for storing non-native logic associated with tenant-specific extension 1106.

Process 1600 may include a step 1606 of exposing, within the native platform, at least one permissions API including at least one permission endpoint for receiving a custom permission definition associated with the tenant-specific extension, the at least one permission endpoint having a schema defining a permission request structure and a permission response structure. By way of a non-limiting example, in FIG. 11, at least one processor (e.g., processor 102 in FIG. 1) may expose, within native platform 1102, a permissions API (e.g., included in API gateway 306). The permissions API may include a permission endpoint (e.g., a Uniform Resource Locator, or URL) for receiving a custom permission definition associated with the tenant-specific extension 1106. The permission endpoint may have a schema defining a permission request structure and a permission response structure.

Process 1600 may include a step 1608 of receiving via the at least one permissions API, a request conforming with the permission request structure for resolving access to a resource associated with the tenant-specific extension. By way of a non-limiting example, in FIG. 11, at least one processor (e.g., processor 102 in FIG. 1) may receive via the permissions API (e.g., via API gateway 306), a request conforming with a permission request structure for resolving access to resource 1104 associated with tenant-specific extension 1106.

Process 1600 may include a step 1610 of satisfying the request by identifying that fulfilling the request requires accessing native logic from the permission repository and non-native logic associated with the tenant-specific extension. By way of a non-limiting example, in FIG. 11, at least one processor (e.g., processor 102 in FIG. 1) may satisfy the request by identifying that fulfilling the request requires accessing native logic from native permission repository 1108 and non-native logic associated with the tenant-specific extension 1106.

Process 1600 may include a step 1612 of retrieving the native logic from the permission repository. By way of a non-limiting example, in FIG. 11, at least one processor (e.g., processor 102 in FIG. 1) may retrieve the native logic from native permission repository 1108.

Process 1600 may include a step 1614 of retrieving the non-native logic from the tenant-specific logic registry. By way of a non-limiting example, in FIG. 11, at least one processor (e.g., processor 102 in FIG. 1) may retrieve the non-native logic from tenant-specific logic registry 1110.

Process 1600 may include a step 1616 of integrating the retrieved native logic with the retrieved non-native logic by aggregating permission effects defined by the native logic and the non-native logic associated with the resource. By way of a non-limiting example, in FIG. 11, at least one processor (e.g., processor 102 in FIG. 1) may integrate the retrieved native logic (e.g., from native permission repository 1108) with the retrieved non-native logic (e.g., from tenant-specific registry 1110) by aggregating permission effects defined by the native logic and the non-native logic associated with resource 1104.

Process 1600 may include a step 1618 of executing the integration to generate a customized permission output by applying a hierarchical resolution rule to the aggregated permission effects, wherein the hierarchical resolution rule defines a prevalence between the native logic and the non-native logic. By way of a non-limiting example, in FIG. 11, at least one processor (e.g., processor 102 in FIG. 1) may execute the integration to generate a customized permission output by applying a hierarchical resolution rule to the aggregated permission effects. The hierarchical resolution rule may define a prevalence between the native logic and the non-native logic.

In some embodiments, one or more rule sets may be employed for resolving a tie between the native and non-native logics. For example, in the event of equivalent relative and/or local priorities or prevalences between the native and non-native logics (i.e., a tie), a rule may cause at least one processor to generate a permission output based on the logic having a greater strength and/or a higher absolute (e.g., global) priority over the other logic. As another non-limiting example, a rule may cause a permission output indicating a denial when the native and non-native logics are associated with the same prevalence (i.e., in the case of a tie, deny access). As yet another example, one or more rule sets may be associated with overriding a denial based on information such as a specificity of the rule to the associated resource, e.g., a more specific rule may override a more general rule, or the reverse.

For instance, according to native logic, a status change may trigger a default automation, whereas according to non-native tenant-specific logic governing a board, a similar status change may invoke a different automation based on a tenant-specific rule, where the native and non-native logics associated with the status change may be assigned similar priorities (i.e., prevalence). To resolve such a tie, at least one processor may invoke a rule to execute the tenant-specific logic on the board, and the native logic everywhere else (e.g., an explicit override).

As another non-limiting example, a rule may specify that when both tenant-specific logic and native logic apply, the logic with the highest contextual specificity takes precedence (e.g., a rule for specificity-based tie breaking). For instance, a rule may include a specificity order from highest specificity to lowest specificity: Item-level tenant logic→Board-level tenant logic→Workspace-level tenant logic→Account-level tenant logic→Native platform logic. According to the native logic, validation may run on all items. According to the tenant-specific non-native logic, an Account-level rule modifies validation, and a Board-level rule further refines the validation. At least one processor may apply a rule for resolving a tie, causing the Board-level tenant rule to win the tie for validations associated with the board, apply the Account-level tenant rule elsewhere, and apply native logic only in contexts that are not governed by the tenant-specific non-native logic.

Process 1600 may include a step 1620 of structuring the customized permission output to conform to the permission response structure defined by the schema. By way of a non-limiting example, in FIG. 11, at least one processor (e.g., processor 102 in FIG. 1) may structure the customized permission output to conform to the permission response structure defined by the schema.

Process 1600 may include a step 1622 of determining if access to the resource is granted based on the customized permission output. By way of a non-limiting example, in FIG. 11, at least one processor (e.g., processor 102 in FIG. 1) may determine if access to resource 1104 is granted based on the customized permission output.

Various example embodiments for permission auditing and management are articulated below in the form of clauses. It is to be understood the term "technology" refers equally to systems (e.g., computing devices, processors, non-transitory computer readable media), and methods for operating these systems.

Clause 1. A system for providing an interactive graphical user interface (GUI) to enable presentation of multi-layered permissions in a collaborative software platform, the system comprising: at least one processor configured to: receive a signal to access permission data associated with performance of at least one action by a user of the collaborative software platform; access a multi-layered permission hierarchy associated with the user and the at least one action, wherein the multi-layered permission hierarchy is linked to a centralized authorization manager of the software platform; traverse the multi-layered permission hierarchy to identify a plurality of permission levels in the multi-layered permission hierarchy associated with the performance of at least one action by the user; collect the permission data from the identified permission levels associated with the performance of at least one action by the user in the multi-layered permission hierarchy; use the permission data to identify at least one restriction associated with performance of the at least one action; and in a first mode of operation, visually indicate which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicate which of the identified permission levels permit the user to perform the particular action, and which of the identified permission levels restrict the user from performing the particular action.

Clause 2. The technology of clause 1, wherein the at least one processor is further configured to display at least one call-to-action (CTA) for resolving the at least one restriction.

Clause 3. The technology of each preceding clause alone or in combination, wherein the at least one CTA is a single CTA for resolving all the restrictions associated with the action via a single input.

Clause 4. The technology of each preceding clause alone or in combination, wherein the at least one CTA is a single CTA for resolving a single identified permission level restricting the user from performing the particular action.

Clause 5. The technology of each preceding clause alone or in combination, wherein the collaborative software platform is a SaaS platform.

Clause 6. The technology of each preceding clause alone or in combination, wherein the signal is received in a context of a software application implemented on the collaborative platform.

Clause 7. The technology of each preceding clause alone or in combination, wherein the software application includes a board presenting data accessible via the collaborative software platform.

Clause 8. The technology of each preceding clause alone or in combination, wherein the at least one processor is further configured to: identify an additional software application on the collaborative platform associated with the at least one action, and communicate with the additional software application, detect an association between the software application and the additional software application, retrieve data associated with the additional software application, and visually indicate the additional software application.

Clause 9. The technology of each preceding clause alone or in combination, wherein the at least one action includes a collection of actions.

Clause 10. The technology of each preceding clause alone or in combination, wherein the signal is indicative of a request to view available actions for performance by the user.

Clause 11. The technology of each preceding clause alone or in combination, wherein the signal is received following receipt of a prior signal indicative of a selection of the user from a plurality of available users.

Clause 12. The technology of each preceding clause alone or in combination, wherein the at least one action is a single action.

Clause 13. The technology of each preceding clause alone or in combination, wherein the signal is received following receipt of a prior signal indicative of a selection of the single action from a plurality of available actions.

Clause 14. The technology of each preceding clause alone or in combination, wherein the at least one processor is further configured to implement at least one AI agent for: analyzing the multi-layered permission hierarchy to identify a current role for the user, the current role being associated with at least one of the permission levels in the multi-layered permission hierarchy attributable to restricting the at least one action, and generate a natural language explanation for the at least one restriction associated with performance of the at least one action by the user as a consequence of the current role.

Clause 15. The technology of each preceding clause alone or in combination, wherein the interactive GUI includes a natural language interface, and wherein the signal is indicative of a natural language query, and wherein the at least one AI agent is configured to process the natural language query to generate the natural language explanation for the at least one restriction associated with performance of the at least one action. Clause 16. The technology of each preceding clause alone or in combination, wherein the at least one AI agent is further configured to determine a resolution for the at least one restriction associated with performance of the at least one action, and present the resolution as a recommendation.

Clause 17. The technology of each preceding clause alone or in combination, wherein the resolution includes an assignment of a new role for the user to replace the current role.

Clause 18. The technology of each preceding clause alone or in combination, wherein the new role resolves at least two of the identified permission levels in the multi-layered permission hierarchy attributable to restricting at least one action.

Clause 19. The technology of each preceding clause alone or in combination, wherein determining the resolution includes evaluating a plurality of candidate resolutions using scoring model in accordance with a least privilege policy.

Clause 20. The technology of each preceding clause alone or in combination, wherein visually indicating which of the at least one action is associated with the at least one restriction or which of the identified permission levels restrict the user from performing the particular action prevents an attempt by the user to perform the at least one action, thereby conserving processing power.

Clause 21. The technology of each preceding clause alone or in combination, wherein the at least one processor is further configured to enable transitioning between the first mode of operation and the second mode of operation in response to receiving an additional signal via the interactive graphical user interface.

Clause 22. A computer readable medium containing instructions that when executed by at least one processor cause the at least one processor to perform operations for implementing an interactive graphical user interface (GUI) to enable presentation of multi-layered permissions in a collaborative software platform, the operations comprising: receiving a signal to access permission data associated with performance of at least one action by a user of the collaborative software platform; accessing a multi-layered permission hierarchy associated with the user and the at least one action, wherein the multi-layered permission hierarchy is linked to a centralized authorization manager of the software platform; traversing the multi-layered permission hierarchy to identify a plurality of permission levels in the multi-layered permission hierarchy associated with the performance of at least one action by the user; collecting the permission data from the identified permission levels associated with the performance of at least one action by the user in the multi-layered permission hierarchy; use the permission data to identify at least one restriction associated with performance of the at least one action; and in a first mode of operation, visually indicating which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicating which of the identified permission levels permit the user to perform the particular action, and which of the identified permission levels restrict the user from performing the particular action.

Clause 23. A method for implementing an interactive graphical user interface (GUI) to enable presentation of multi-layered permissions in a collaborative software platform, the method comprising: receiving a signal to access permission data associated with performance of at least one action by a user of the collaborative software platform; accessing a multi-layered permission hierarchy associated with the user and the at least one action, wherein the multi-layered permission hierarchy is linked to a centralized authorization manager of the software platform; traversing the multi-layered permission hierarchy to identify a plurality of permission levels in the multi-layered permission hierarchy associated with the performance of at least one action by the user; collecting the permission data from the identified permission levels associated with the performance of at least one action by the user in the multi-layered permission hierarchy; using the permission data to identify at least one restriction associated with performance of the at least one action; and in a first mode of operation, visually indicating which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicating which of the identified permission levels permit the user to perform the particular action, and which of the identified permission levels restrict the user from performing the particular action.

Clause 24. A system for managing extensible permissions in a multi-tenant native collaborative software platform, including at least one processor configured to: maintain a permission repository for the native collaborative software platform, the permission repository including native logic for handling native permissions; maintain a tenant-specific logic registry configured to store non-native logic associated with a tenant-specific extension; expose, within the native platform, at least one permissions API including at least one permission endpoint for receiving a custom permission definition associated with the tenant-specific extension, the at least one permission endpoint having a schema defining a permission request structure and a permission response structure; receive via the at least one permissions API, a request conforming with the permission request structure for resolving access to a resource associated with the tenant-specific extension; satisfy the request by: identifying that fulfilling the request requires accessing native logic from the permission repository and non-native logic associated with the tenant-specific extension; retrieving the native logic from the permission repository; retrieving the non-native logic from the tenant-specific logic registry; integrating the retrieved native logic with the retrieved non-native logic by aggregating permission effects defined by the native logic and the non-native logic associated with the resource; executing the integration to generate a customized permission output by applying a hierarchical resolution rule to the aggregated permission effects, wherein the hierarchical resolution rule defines a prevalence between the native logic and the non-native logic; structuring the customized permission output to conform to the permission response structure defined by the schema; and determining if access to the resource is granted based on the customized permission output.

Clause 25. The technology of each preceding clause alone or in combination, wherein the permission repository comprises a global graph data structure defining baseline relationships between platform entities, and wherein the tenant-specific logic registry comprises a local graph data structure defining extension relationships specific to the tenant.

Clause 26. The technology of each preceding clause alone or in combination, wherein the at least one processor is configured to retrieve the native logic and the non-native logic by performing a runtime hydration process that logically overlays the local graph data structure onto the global graph data structure to form a composite decision graph.

Clause 27. The technology of each preceding clause alone or in combination, wherein the aggregating of permission effects comprises traversing the composite decision graph to identify all valid paths connecting a subject entity to the resource.

Clause 28. The technology of each preceding clause alone or in combination, wherein the hierarchical resolution rule comprises comparing a numerical priority index assigned to the native logic against a numerical priority index assigned to the non-native logic, and wherein the at least one processor is configured to enforce the non-native logic only when its numerical priority index exceeds the numerical priority index of the native logic.

Clause 29. The technology of each preceding clause alone or in combination, wherein the custom permission definition defines a virtual inheritance entity configured to logically intervene between a parent node and a child node in a native hierarchy of the collaborative software platform, thereby modifying a permission inheritance path such that the child node inherits permission rules from the virtual inheritance entity in addition to the native logic.

Clause 30. The technology of each preceding clause alone or in combination, wherein the custom permission definition further includes conditional applicability metadata, and wherein the at least one processor is configured to aggregate a permission effect from the custom permission definition only if a context of the access request matches the conditional applicability metadata.

Clause 31. The technology of each preceding clause alone or in combination, wherein the conditional applicability metadata includes a dynamic resource quota, and wherein the at least one processor ignores the custom permission definition until the dynamic resource quota is exceeded.

Clause 32. The technology of each preceding clause alone or in combination, wherein the at least one processor is configured to automatically generate and render a visual configuration element within a native administrative console of the collaborative software platform based on the schema of the received custom permission definition.

Clause 33. The technology of each preceding clause alone or in combination, wherein the at least one processor is configured to deploy an AI agent to monitor operational conditions of the collaborative software platform, and dynamically modify permission conditions defined within the non-native logic based on the monitored operational conditions.

Clause 34. The technology of each preceding clause alone or in combination, wherein the at least one permissions API is exposed as a callable action within a workflow automation engine of the collaborative software platform.

Clause 35. The technology of each preceding clause alone or in combination, wherein the at least one processor is configured to trigger the callable action in response to a signal indicative of a state change in a platform element of the collaborative platform.

Clause 36. The technology of each preceding clause alone or in combination, wherein the at least one processor is configured to monitor the collaborative software platform for the signal and, upon detecting the signal, dynamically inject the custom permission definition into the tenant-specific logic registry, thereby enforcing a new permission rule without requiring a manual configuration update.

Clause 37. The technology of each preceding clause alone or in combination, wherein the callable action accepts dynamic input parameters from the workflow automation engine to populate a priority parameter of the custom permission definition.

Clause 38. A method for managing extensible permissions in a multi-tenant native collaborative software platform, the method comprising: maintaining a permission repository for the native collaborative software platform, the permission repository including native logic for handling native permissions; maintaining a tenant-specific logic registry configured to store non-native logic associated with a tenant-specific extension; exposing, within the native platform, at least one permissions API including at least one permission endpoint for receiving a custom permission definition associated with the tenant-specific extension, the at least one permission endpoint having a schema defining a permission request structure and a permission response structure; receiving via the at least one permissions API, a request conforming with the permission request structure for resolving access to a resource associated with the tenant-specific extension; satisfying the request by: identifying that fulfilling the request requires accessing native logic from the permission repository and non-native logic associated with the tenant-specific extension; retrieving the native logic from the permission repository; retrieving the non-native logic from the tenant-specific logic registry; integrating the retrieved native logic with the retrieved non-native logic by aggregating permission effects defined by the native logic and the non-native logic associated with the resource; executing the integration to generate a customized permission output by applying a hierarchical resolution rule to the aggregated permission effects, wherein the hierarchical resolution rule defines a prevalence between the native logic and the non-native logic; structuring the customized permission output to conform to the permission response structure defined by the schema; and determining if access to the resource is granted based on the customized permission output.

Clause 39. A non-transitory computer readable medium containing instructions that when executed by at least one processor cause the at least one processor to perform operations for managing extensible permissions in a multi-tenant native collaborative software platform, the operations comprising: maintaining a permission repository for the native collaborative software platform, the permission repository including native logic for handling native permissions; maintaining a tenant-specific logic registry configured to store non-native logic associated with a tenant-specific extension; exposing, within the native platform, at least one permissions API including at least one permission endpoint for receiving a custom permission definition associated with the tenant-specific extension, the at least one permission endpoint having a schema defining a permission request structure and a permission response structure; receiving via the at least one permissions API, a request conforming with the permission request structure for resolving access to a resource associated with the tenant-specific extension; satisfying the request by: identifying that fulfilling the request requires accessing native logic from the permission repository and non-native logic associated with the tenant-specific extension; retrieving the native logic from the permission repository; retrieving the non-native logic from the tenant-specific logic registry; integrating the retrieved native logic with the retrieved non-native logic by aggregating permission effects defined by the native logic and the non-native logic associated with the resource; executing the integration to generate a customized permission output by applying a hierarchical resolution rule to the aggregated permission effects, wherein the hierarchical resolution rule defines a prevalence between the native logic and the non-native logic; structuring the customized permission output to conform to the permission response structure defined by the schema; an determining if access to the resource is granted based on the customized permission output.

Disclosed embodiments may include any one of the following bullet-pointed features alone or in combination with one or more other bullet-pointed features, whether implemented as and/or method, by at least one processor or circuitry, and/or stored as executable instructions on non-transitory computer readable media or computer readable media.

- providing an interactive graphical user interface (GUI) to enable presentation of multi-layered permissions in a collaborative software platform;
- receiving a signal to access permission data associated with performance of at least one action by a user of a collaborative software platform;
- accessing a multi-layered permission hierarchy associated with a user and at least one action;
- a multi-layered permission hierarchy linked to a centralized authorization manager of a software platform;
- traversing a multi-layered permission hierarchy to identify a plurality of permission levels in a multi-layered permission hierarchy associated with a performance of at least one action by a user;
- collecting permission data from identified permission levels associated with a performance of at least one action by a user in a multi-layered permission hierarchy;
- using permission data to identify at least one restriction associated with performance of at least one action;
- in a first mode of operation, visually indicating which of at least one action is associated with at least one restriction thereby being restricted for performance by a user, and which of the at least one action is unassociated with the at least one restriction thereby being permitted for performance by the user;
- in a second mode of operation, for a particular action of at least one action, visually indicate which of identified permission levels permit a user to perform a particular action, and which of the identified permission levels restrict the user from performing the particular action;
- displaying at least one call-to-action (CTA) for resolving at least one restriction;
- at least one CTA is a single CTA for resolving all restrictions associated with an action via a single input;
- at least one CTA is a single CTA for resolving a single identified permission level restricting a user from performing a particular action;
- a collaborative software platform is a SaaS platform;
- a signal is received in a context of a software application implemented on a collaborative platform;
- a software application includes a board presenting data accessible via a collaborative software platform;
- identifying an additional software application on a collaborative platform associated with at least one action;
- communicating with an additional software application;
- detecting an association between a software application and an additional software application;
- retrieving data associated with an additional software application;
- visually indicating an additional software application;
- at least one action includes a collection of actions;
- a signal indicative of a request to view available actions for performance by a user;
- a signal received following receipt of a prior signal indicative of a selection of a user from a plurality of available users;
- at least one action is a single action;
- a signal received following receipt of a prior signal indicative of a selection of a single action from a plurality of available actions;
- implementing at least one AI agent;
- analyzing a multi-layered permission hierarchy to identify a current role for a user;
- a current role being associated with at least one of a plurality of permission levels in a multi-layered permission hierarchy attributable to restricting at least one action;
- generating a natural language explanation for at least one restriction associated with performance of at least one action by a user as a consequence of a current role;
- an interactive GUI includes a natural language interface;
- a signal is indicative of a natural language query;
- at least one AI agent configured to process a natural language query to generate a natural language explanation for at least one restriction associated with performance of at least one action;
- at least one AI agent is configured to determine a resolution for at least one restriction associated with performance of at least one action, and present the resolution as a recommendation;
- a resolution includes an assignment of a new role for a user to replace a current role;
- a new role resolves at least two of identified permission levels in multi-layered permission hierarchy attributable to restricting at least one action;

determining a resolution includes evaluating a plurality of candidate resolutions using scoring model in accordance with a least privilege policy;

visually indicating which of at least one action is associated with at least one restriction or which identified permission levels restrict a user from performing a particular action prevents an attempt by the user to perform the at least one action, thereby conserving processing power;

enabling transitioning between a first mode of operation and a second mode of operation in response to receiving a signal via an interactive graphical user interface;

managing extensible permissions in a multi-tenant native collaborative software platform;

maintaining a permission repository for a native collaborative software platform;

a permission repository including native logic for handling native permissions;

maintaining a tenant-specific logic registry configured to store non-native logic associated with a tenant-specific extension;

exposing, within a native platform, at least one permissions API including at least one permission endpoint for receiving a custom permission definition associated with a tenant-specific extension;

at least one permission endpoint having a schema defining a permission request structure and a permission response structure;

receiving via the at least one permissions API, a request conforming with a permission request structure for resolving access to a resource associated with a tenant-specific extension;

satisfying the request;

identifying that fulfilling a request requires accessing native logic from a permission repository and non-native logic associated with a tenant-specific extension;

retrieving native logic from a permission repository;

retrieving non-native logic from a tenant-specific logic registry;

integrating retrieved native logic with retrieved non-native logic by aggregating permission effects defined by the native logic and the non-native logic associated with a resource;

executing an integration to generate a customized permission output by applying a hierarchical resolution rule to aggregated permission effects;

a hierarchical resolution rule defines a prevalence between native logic and non-native logic;

structuring a customized permission output to conform to a permission response structure defined by a schema;

determining if access to a resource is granted based on a customized permission output;

a permission repository comprises a global graph data structure defining baseline relationships between platform entities;

a tenant-specific logic registry comprises a local graph data structure defining extension relationships specific to a tenant;

retrieving native logic and non-native logic by performing a runtime hydration process that logically overlays a local graph data structure onto a global graph data structure to form a composite decision graph;

aggregating of permission effects comprises traversing a composite decision graph to identify all valid paths connecting a subject entity to a resource;

a hierarchical resolution rule comprises comparing a numerical priority index assigned to native logic against a numerical priority index assigned to non-native logic;

enforcing non-native logic only when its numerical priority index exceeds a numerical priority index of native logic;

a custom permission definition defines a virtual inheritance entity configured to logically intervene between a parent node and a child node in a native hierarchy of a collaborative software platform;

modifying a permission inheritance path such that a child node inherits permission rules from a virtual inheritance entity in addition to native logic;

a custom permission definition includes conditional applicability metadata;

aggregating a permission effect from a custom permission definition only if a context of an access request matches conditional applicability metadata;

conditional applicability metadata includes a dynamic resource quota;

ignoring a custom permission definition until a dynamic resource quota is exceeded;

automatically generating and rendering a visual configuration element within a native administrative console of a collaborative software platform based on a schema of a received custom permission definition;

deploying an AI agent to monitor operational conditions of a collaborative software platform;

dynamically modifying permission conditions defined within non-native logic based on monitored operational conditions;

at least one permissions API is exposed as a callable action within a workflow automation engine of a collaborative software platform;

triggering a callable action in response to a signal indicative of a state change in a platform element of a collaborative platform;

monitoring a collaborative software platform for a signal;

upon detecting a signal, dynamically injecting a custom permission definition into a tenant-specific logic registry;

enforcing a new permission rule without requiring a manual configuration update;

a callable action accepts dynamic input parameters from a workflow automation engine to populate a priority parameter of a custom permission definition.

The invention claimed is:

1. A system for providing an interactive graphical user interface (GUI) to enable presentation of multi-layered permissions in a collaborative software platform, the system comprising:

at least one processor configured to:

receive a signal to access permission data associated with performance of at least one action by a user of the collaborative software platform;

access a multi-layered permission hierarchy associated with the user and the at least one action, wherein the multi-layered permission hierarchy is linked to a centralized authorization manager of the software platform;

traverse the multi-layered permission hierarchy to identify a plurality of permission levels in the multi-layered permission hierarchy associated with the performance of at least one action by the user;

collect the permission data from the identified permission levels associated with the performance of at least one action by the user in the multi-layered permission hierarchy;

use the permission data to identify at least one restriction associated with performance of the at least one action; and in a first mode of operation, visually indicate which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicate which of the identified permission levels permit the user to perform the particular action, and which of the identified permission levels restrict the user from performing the particular action.

2. The system of claim 1, wherein the at least one processor is further configured to display at least one call-to-action (CTA) for resolving the at least one restriction.

3. The system of claim 2, wherein the at least one CTA is a single CTA for resolving all the restrictions associated with the action via a single input.

4. The system of claim 2, wherein the at least one CTA is a single CTA for resolving a single identified permission level restricting the user from performing the particular action.

5. The system of claim 1, wherein the collaborative software platform is a SaaS platform.

6. The system of claim 1, wherein the signal is received in a context of a software application implemented on the collaborative platform.

7. The system of claim 6, wherein the software application includes a board presenting data accessible via the collaborative software platform.

8. The system of claim 6, wherein the at least one processor is further configured to: identify an additional software application on the collaborative platform associated with the at least one action, and communicate with the additional software application, detect an association between the software application and the additional software application, retrieve data associated with the additional software application, and visually indicate the additional software application.

9. The system of claim 1, wherein the at least one action includes a collection of actions.

10. The system of claim 1, wherein the signal is indicative of a request to view available actions for performance by the user.

11. The system of claim 10, wherein the signal is received following receipt of a prior signal indicative of a selection of the user from a plurality of available users.

12. The system of claim 1, wherein the at least one action is a single action.

13. The system of claim 12, wherein the signal is received following receipt of a prior signal indicative of a selection of the single action from a plurality of available actions.

14. The system of claim 1, wherein the at least one processor is further configured to implement at least one AI agent for:

analyzing the multi-layered permission hierarchy to identify a current role for the user, the current role being associated with at least one of the permission levels in the multi-layered permission hierarchy attributable to restricting the at least one action, and generate a natural language explanation for the at least one restriction associated with performance of the at least one action by the user as a consequence of the current role.

15. The system of claim 14, wherein the interactive GUI includes a natural language interface, and wherein the signal is indicative of a natural language query, and wherein the at least one AI agent is configured to process the natural language query to generate the natural language explanation for the at least one restriction associated with performance of the at least one action.

16. The system of claim 15, wherein the at least one AI agent is further configured to determine a resolution for the at least one restriction associated with performance of the at least one action, and present the resolution as a recommendation.

17. The system of claim 16, wherein the resolution includes an assignment of a new role for the user to replace the current role.

18. The system of claim 17, wherein the new role resolves at least two of the identified permission levels in the multi-layered permission hierarchy attributable to restricting at least one action.

19. The system of claim 16, wherein determining the resolution includes evaluating a plurality of candidate resolutions using scoring model in accordance with a least privilege policy.

20. The system of claim 1, wherein visually indicating which of the at least one action is associated with the at least one restriction or which of the identified permission levels restrict the user from performing the particular action prevents an attempt by the user to perform the at least one action, thereby conserving processing power.

21. The system of claim 1, wherein the at least one processor is further configured to enable transitioning between the first mode of operation and the second mode of operation in response to receiving an additional signal via the interactive graphical user interface.

22. A computer readable medium containing instructions that when executed by at least one processor cause the at least one processor to perform operations for implementing an interactive graphical user interface (GUI) to enable presentation of multi-layered permissions in a collaborative software platform, the operations comprising:

receiving a signal to access permission data associated with performance of at least one action by a user of the collaborative software platform;

accessing a multi-layered permission hierarchy associated with the user and the at least one action, wherein the multi-layered permission hierarchy is linked to a centralized authorization manager of the software platform;

traversing the multi-layered permission hierarchy to identify a plurality of permission levels in the multi-layered permission hierarchy associated with the performance of at least one action by the user;

collecting the permission data from the identified permission levels associated with the performance of at least one action by the user in the multi-layered permission hierarchy;

using the permission data to identify at least one restriction associated with performance of the at least one action; and in a first mode of operation, visually indicating which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicating which of the identified permission levels permit the user to perform the particular action, and which of the identified permission levels restrict the user from performing the particular action.

23. A method for implementing an interactive graphical user interface (GUI) to enable presentation of multi-layered permissions in a collaborative software platform, the method comprising:

receiving a signal to access permission data associated with performance of at least one action by a user of the collaborative software platform;

accessing a multi-layered permission hierarchy associated with the user and the at least one action, wherein the multi-layered permission hierarchy is linked to a centralized authorization manager of the software platform;

traversing the multi-layered permission hierarchy to identify a plurality of permission levels in the multi-layered permission hierarchy associated with the performance of at least one action by the user;

collecting the permission data from the identified permission levels associated with the performance of at least one action by the user in the multi-layered permission hierarchy;

using the permission data to identify at least one restriction associated with performance of the at least one action; and in a first mode of operation, visually indicating which of the at least one action is associated with the at least one restriction thereby being restricted for performance by the user, and which of the at least one action is unassociated with the at least one restriction thereby being permitted for performance by the user; and in a second mode of operation, for a particular action of the at least one action, visually indicating which of the identified permission levels permit the user to perform the particular action, and which of the identified permission levels restrict the user from performing the particular action.

* * * * *